US012624755B1

(12) United States Patent

Kim

(10) Patent No.: US 12,624,755 B1

(45) Date of Patent: May 12, 2026

(54) ELECTRONIC SHIFT OPERATION APPARATUS

(71) Applicants: Hyundai Motor Company, Seoul (KR); Kia Corporation, Seoul (KR)

(72) Inventor: Deok Ki Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/948,179

(22) Filed: Nov. 14, 2024

(30) Foreign Application Priority Data

Jul. 17, 2024 (KR) ........................ 10-2024-0094637

(51) Int. Cl.
*F16H 59/02* (2006.01)
*F16H 61/02* (2006.01)
(52) U.S. Cl.
CPC ..... *F16H 59/0204* (2013.01); *F16H 61/0204* (2013.01); *F16H 2059/0221* (2013.01)
(58) Field of Classification Search
CPC ............. F16H 59/0204; F16H 61/0204; F16H 2059/0221
See application file for complete search history.

(56) References Cited

U.S. PATENT DOCUMENTS

| | | | |
|---|---|---|---|
| 6,904,823 B2 * | 6/2005 | Levin ..................... | F16H 59/044 74/471 XY |
| 11,906,040 B2 * | 2/2024 | Isami ..................... | F16H 59/044 |
| 2017/0335959 A1 * | 11/2017 | Cho ......................... | F16H 61/24 |

FOREIGN PATENT DOCUMENTS

| | | | | |
|---|---|---|---|---|
| DE | 4419212 A1 * | 12/1995 | ........ | F16H 59/0204 |
| JP | H07119825 A * | 5/1995 | ........ | F16H 59/0204 |
| KR | 10-2026-0012076 | 1/2026 | | |
| KR | 10-2026-0012077 | 1/2026 | | |

* cited by examiner

*Primary Examiner* — Tisha D Lewis
(74) *Attorney, Agent, or Firm* — MORGAN, LEWIS & BOCKIUS LLP

(57) ABSTRACT

An electronic shift operation apparatus switches a mode of a shift operation to an automatic shift and a manual shift based on a driver's intention and differently restricts shift direction strokes of a shift rod in accordance with an automatic shift mode and a manual shift mode, thereby improving the convenience of a shift operation and improving recognition performance during the shift operation.

18 Claims, 42 Drawing Sheets

FIG. 17

FIRST SHIFT POSITION,
THIRD SHIFT POSITION,
FIFTH SHIFT POSITION,
R SHIFT POSITION

FIG. 42

ELECTRONIC SHIFT OPERATION APPARATUS

CROSS-REFERENCE TO RELATED APPLICATION

The present application claims priority to Korean Patent Application No. 10-2024-0094637, filed on Jul. 17, 2024, the entire contents of which is incorporated herein for all purposes by this reference.

BACKGROUND OF THE PRESENT DISCLOSURE

Field of the Present Disclosure

The present disclosure relates to an electronic shift operation apparatus, and more particularly, to a technology related to an electronic shift operation apparatus capable of switching a mode of a shift operation to a manual shift and an automatic shift depending on a driver's intention and differently restricting shift direction strokes of a shift rod in accordance with an automatic shift mode and a manual shift mode.

Description of Related Art

In general, a vehicle provided with an automatic transmission allows shift gears to automatically operate within a target shift position range by controlling hydraulic pressure within a shifting range set in accordance with a traveling speed of the vehicle.

The automatic transmission generates a gear ratio by use of a hydraulic circuit, a planetary gear, and friction elements to perform a shift operation, and a transmission control unit (TCU) controls the constituent components.

A shift-by-wire (SBW) system, which is an electronic transmission system for a vehicle, refers to an electronic transmission system having no mechanical connection structure, such as a cable, between a transmission and a shift lever, unlike a mechanical transmission system in the related art. When a sensor value, which is generated when a transmission mechanism (a shift lever, a shift button, or a shift dial) is manipulated, is transmitted to the transmission control unit (TCU), the TCU performs electronic shift control in response to an instructed signal.

Therefore, the automatic transmission, which operates based on the SBW, transmits a driver's shift intention, as an electrical signal, to the TCU by simply operating the electronic transmission mechanism so that the shift operation to a Driving (D) stage, a Reverse (R) stage, Neutral (N) stage, and the like may be smoothly performed. Furthermore, the transmission mechanism may be miniaturized, which may ensure a large space between a driver seat and a passenger seat.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an electronic shift operation apparatus configured for switching a mode of a shift operation to an automatic shift and a manual shift based on a driver's intention and differently restricting shift direction strokes of a shift rod in accordance with an automatic shift mode and a manual shift mode, improving performance in recognizing a shift operation in the automatic shift mode or the manual shift mode, and improving marketability.

To achieve the above-mentioned object, the present disclosure provides an electronic shift operation apparatus including: a shift rod configured to be operable in a selection direction along a selection rail and operable in a shift direction along a plurality of shift rails connected to the selection rail; and a mode selection portion configured for selecting an automatic shift mode or a manual shift mode, in which a mode is switched to the automatic shift mode in which an automatic shift manipulation is enabled or the manual shift mode in which a manual shift manipulation is enabled in accordance with the input of the mode selection portion, in which when the shift rod is manipulated in the selection direction along the selection rail, a movable route of the shift rod varies depending on the automatic shift mode and the manual shift mode, and in which when the shift rod is manipulated in the shift direction along the shift rail, a shift direction stroke of the shift rod varies depending on the automatic shift mode and the manual shift mode.

The electronic shift operation apparatus may further include: a mode switching solenoid configured to operate to switch the mode to the automatic shift mode or the manual shift mode; and a shifter controller operatively connected to the mode selection portion and the mode switching solenoid and configured to control an operation of the mode switching solenoid by receiving a signal of the mode selection portion.

The shifter controller is configured to control the operation of the mode switching solenoid so that movement of the shift rod in the selection direction is restricted to the selection position positioned at an edge portion of the selection rail in the automatic shift mode.

In the automatic shift mode, when the shift rod is manipulated in the selection direction, the selection movement of the shift rod is restricted to a 5/6 stage selection position and an R stage selection position in the manual shift mode.

A shift solenoid operatively connected to the shifter controller and configured to be operated by being controlled by the shifter controller and operate to differently restrict shift direction strokes of the shift rod in accordance with the automatic shift mode and the manual shift mode.

The shifter controller is configured to control the operation of the shift solenoid so that the shift direction stroke of the shift rod in the automatic shift mode is relatively shorter than the shift direction stroke of the shift rod in the manual shift mode.

In the manual shift mode, an end portion of the shift rail is defined as a fixed end portion, the shift rod is manipulated in the shift direction, and then an operating force is eliminated so that the shift rod is fixed at any one shift position among a first stage, a second stage, a third stage, a fourth stage, a fifth stage, a sixth stage, and an R stage.

The shifter controller is configured to receive an operating signal of a clutch pedal, and in which when the automatic shift mode signal is inputted by the manipulation of the mode selection portion, the shifter controller is configured to control the operation of the shift solenoid so that the movement of the shift rod in the shift direction is allowed to a target shift position regardless of the operating signal of the clutch pedal.

The shifter controller is configured to receive an operating signal of a clutch pedal, and in which the shifter controller is configured to control the operation of the shift solenoid so that the movement of the shift rod in the shift direction is allowed to a target shift position only in a state in which both a manual shift mode signal by a manipulation of the mode selection portion and the operating signal of the clutch pedal are inputted.

The shifter controller is configured to receive an operating signal of a clutch pedal, and in which when a manual shift mode signal is inputted to the shifter controller in accordance with a manipulation of the mode selection portion and the operating signal of the clutch pedal is not inputted, the shifter controller is configured to control the operation of the shift solenoid to restrict the movement of the shift rod in the shift direction to prevent the shift rod from moving to a target shift position.

The electronic shift operation apparatus may further include: a printed circuit board (PCB), configured to detect and output a shift position selected in accordance with the manipulation of the shift rod in the selection direction and in the shift direction, in which the shifter controller transmits a shift position signal, which is outputted from the PCB, to the vehicle controller, and a drive portion is operated by receiving the signal of the vehicle controller.

The shifter controller is configured to control the operation of the mode switching solenoid in the manual shift mode so that the shift rod moves to a plurality of selection positions positioned along the selection rail in accordance with the manipulation of the shift rod in the selection direction, and in which in the automatic shift mode, the shifter controller is configured to control the operation of the mode switching solenoid to restrict the movement of the shift rod to any at least one of the plurality of selection positions positioned along the selection rail.

In the automatic shift mode, a route along which the shift rod is movable along the selection rail by operation of the mode switching solenoid is restricted to be relatively shorter than a route along which the shift rod is movable along the selection rail in the manual shift mode.

In the manual shift mode, the plurality of selection positions includes: an initial position at which the shift rod is returned by a spring force when an operating force of the shift rod in the selection direction is released; a 5/6 stage selection position positioned in a first direction along the selection rail from the initial position so that a fifth stage or a sixth stage is selected in accordance with the manipulation of the shift rod in the shift direction; a 1/2 stage selection position positioned in a second direction along the selection rail from the initial position so that a first stage or a second stage is selected in accordance with the manipulation of the shift rod in the shift direction; and an R stage selection position positioned at an edge portion in the other direction along the selection rail from the initial position so that an R stage is selected in accordance with the manipulation of the shift rod in the shift direction, and in which the initial position is a 3/4 stage selection position at which a third stage or a fourth stage is selected in accordance with the manipulation of the shift rod in the shift direction.

In the manual shift mode, the shift rod performs a selection manipulation to the 5/6 stage selection position, the 1/2 stage selection position, or the R stage selection position, and then the operating force is eliminated so that the shift rod is returned to the initial position.

In the automatic shift mode, one of two selection positions is alternatively selected in accordance with the manipulation of the shift rod in the selection direction, and in which the two selection positions include: an initial position at which an R stage or a D stage is selected in accordance with the manipulation of the shift rod in the shift direction; and an M position positioned in the second direction along the selection rail from the initial position so that a (+) stage or a (−) stage is selected in accordance with the manipulation of the shift rod in the shift direction.

The initial position in the automatic shift mode is a selection position identical to the initial position in the manual shift mode, and the M position in the automatic shift mode is a selection position identical to the 1/2 stage selection position in the manual shift mode.

The selection position of the shift rod is fixed so that a motion in the selection direction is stopped at the M position, and the shift rod does not return to the initial position even though an operating force is eliminated at the M position.

In the automatic shift mode, an end portion of the shift rail is defined as a non-fixed end portion, the shift rod positioned at the initial position or the M position is manipulated in the shift direction, and then an operating force is eliminated so that the shift rod is returned to the initial position or the M position.

The shifter controller is configured to control the operation of the mode switching solenoid so that a selection operating force when the shift rod is manipulated in the selection direction in the automatic shift mode is higher than a selection operating force when the shift rod is manipulated in the selection direction in the manual shift mode.

The electronic shift operation apparatus according to an exemplary embodiment of the present disclosure may switch the mode of the shift operation to the automatic shift or the manual shift based on a driver's intention. Therefore, it is possible to eliminate simplicity of the shift operation, which may provide enjoyment to the driver and improve marketability.

Furthermore, the electronic shift operation apparatus according to an exemplary embodiment of the present disclosure may restrict the shift direction strokes of the shift rod to different lengths in accordance with the automatic shift mode and the manual shift mode, improving the convenience of the manipulation and improve the recognition performance during the shift operation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

Figure 17:
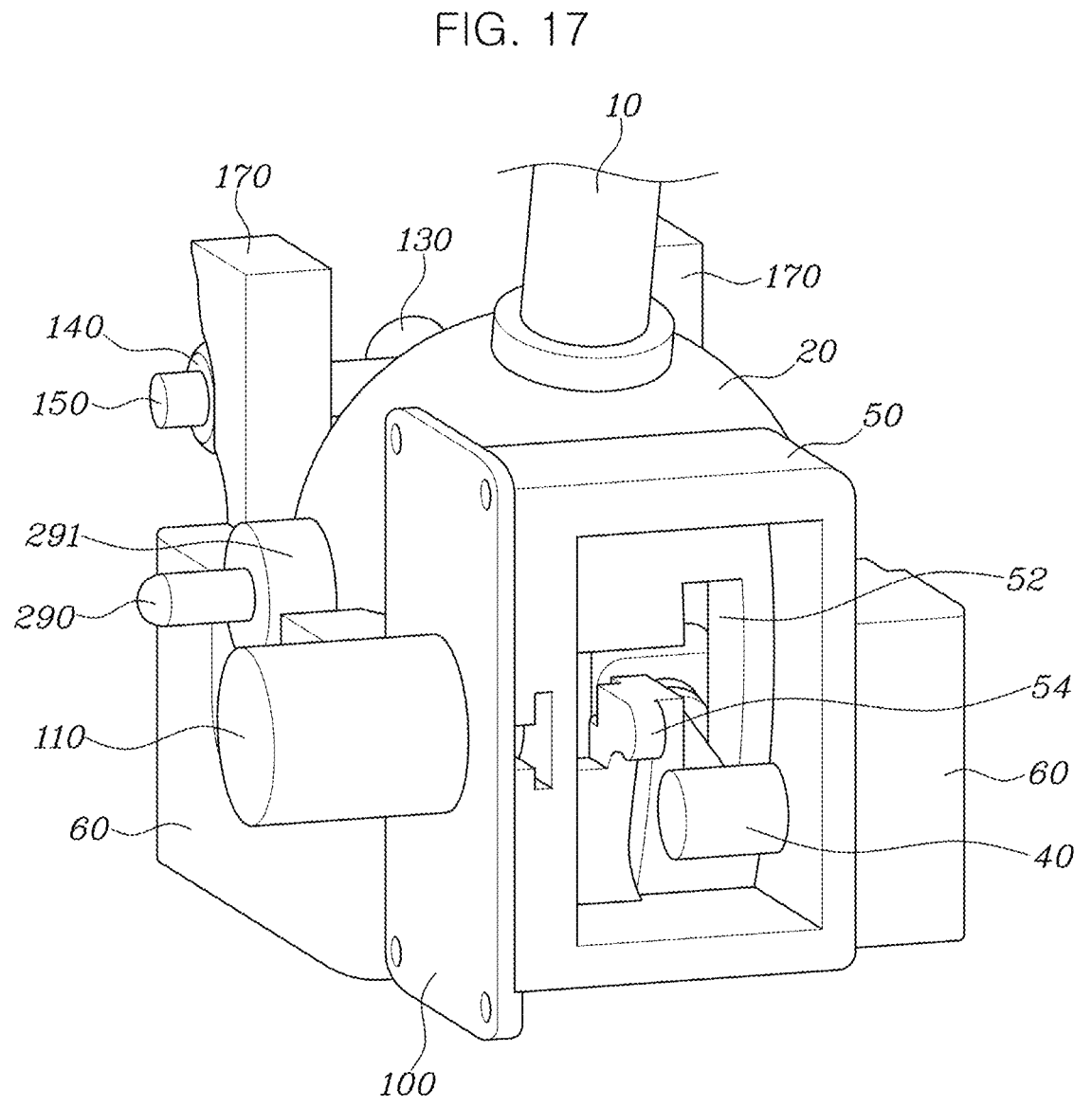

FIG. 15, FIG. 16A and FIG. 16B, FIG. 17, FIG. 18A and FIG. 18B and FIG. 19 are views for explaining situations in which the mode switching rod moves along a second selection groove in a manual shift mode.

FIG. 42 is a schematic configuration view for explaining a system of the electronic shift operation apparatus according to an exemplary embodiment of the present disclosure.

Figure 1:
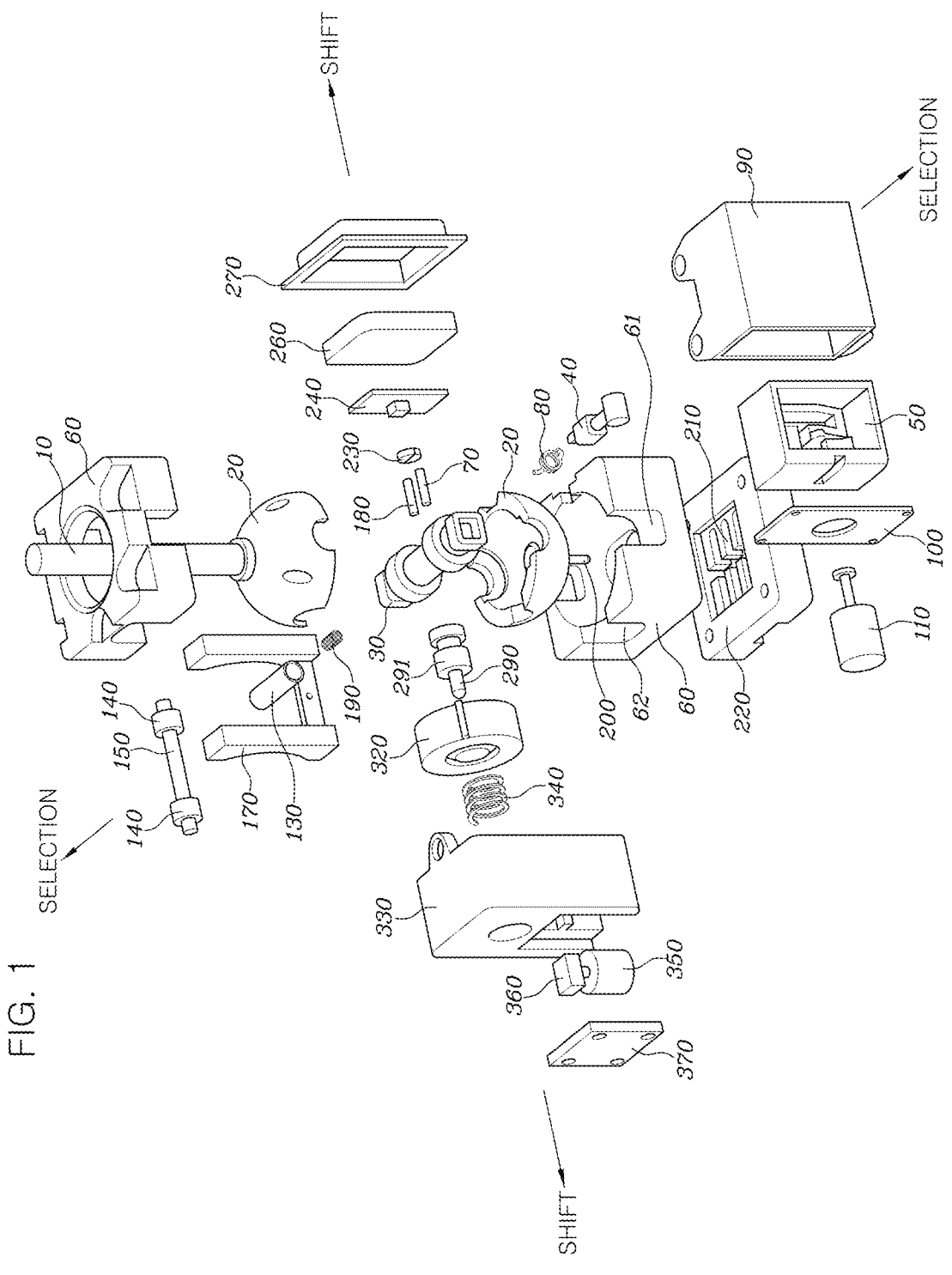
FIG. 1 is an exploded view of an electronic shift operation apparatus according to an exemplary embodiment of the present disclosure.
Figure 2:
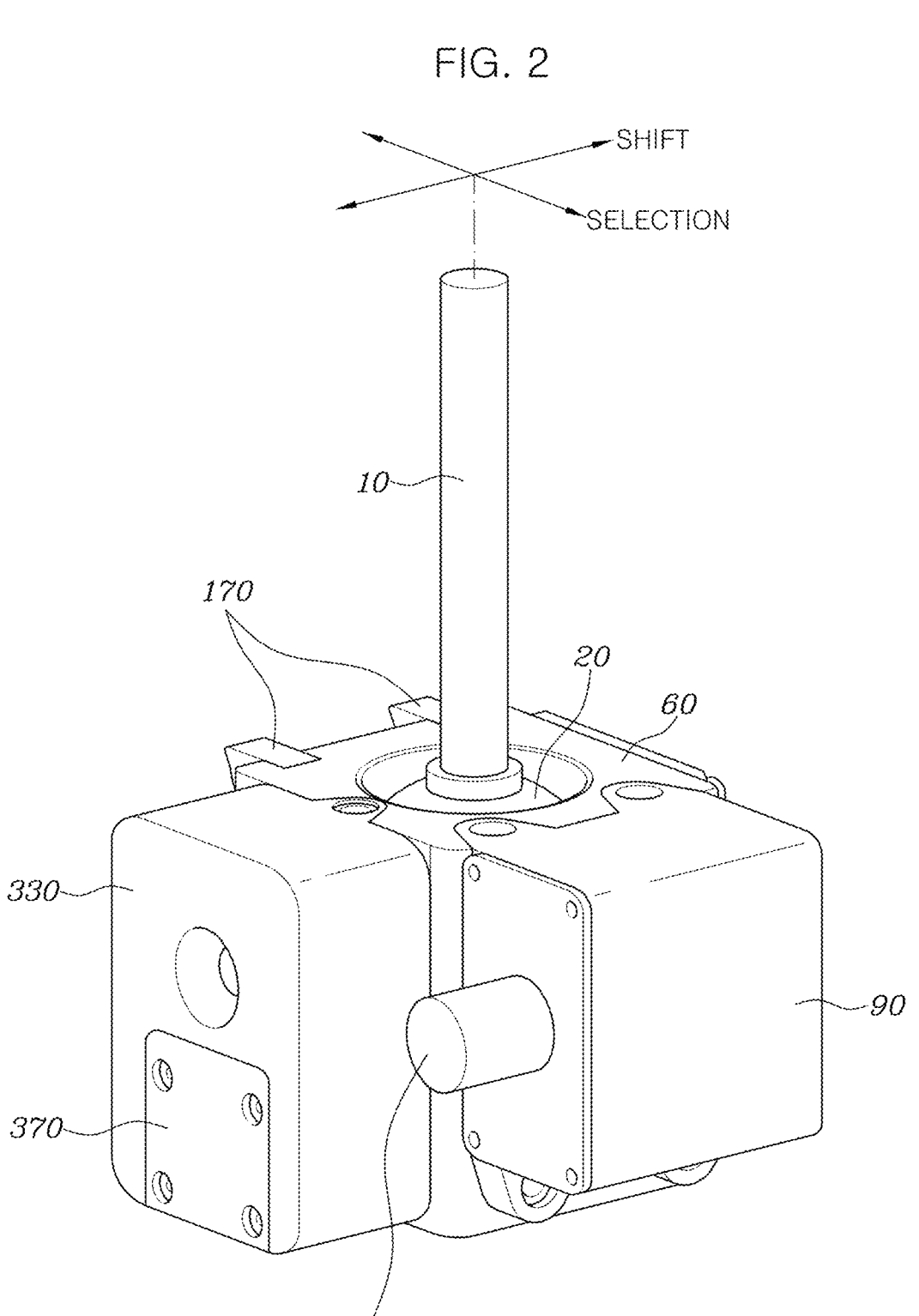
FIG. 2 is a perspective view exemplarily illustrating a coupled state of FIG. 1.
Figure 3:
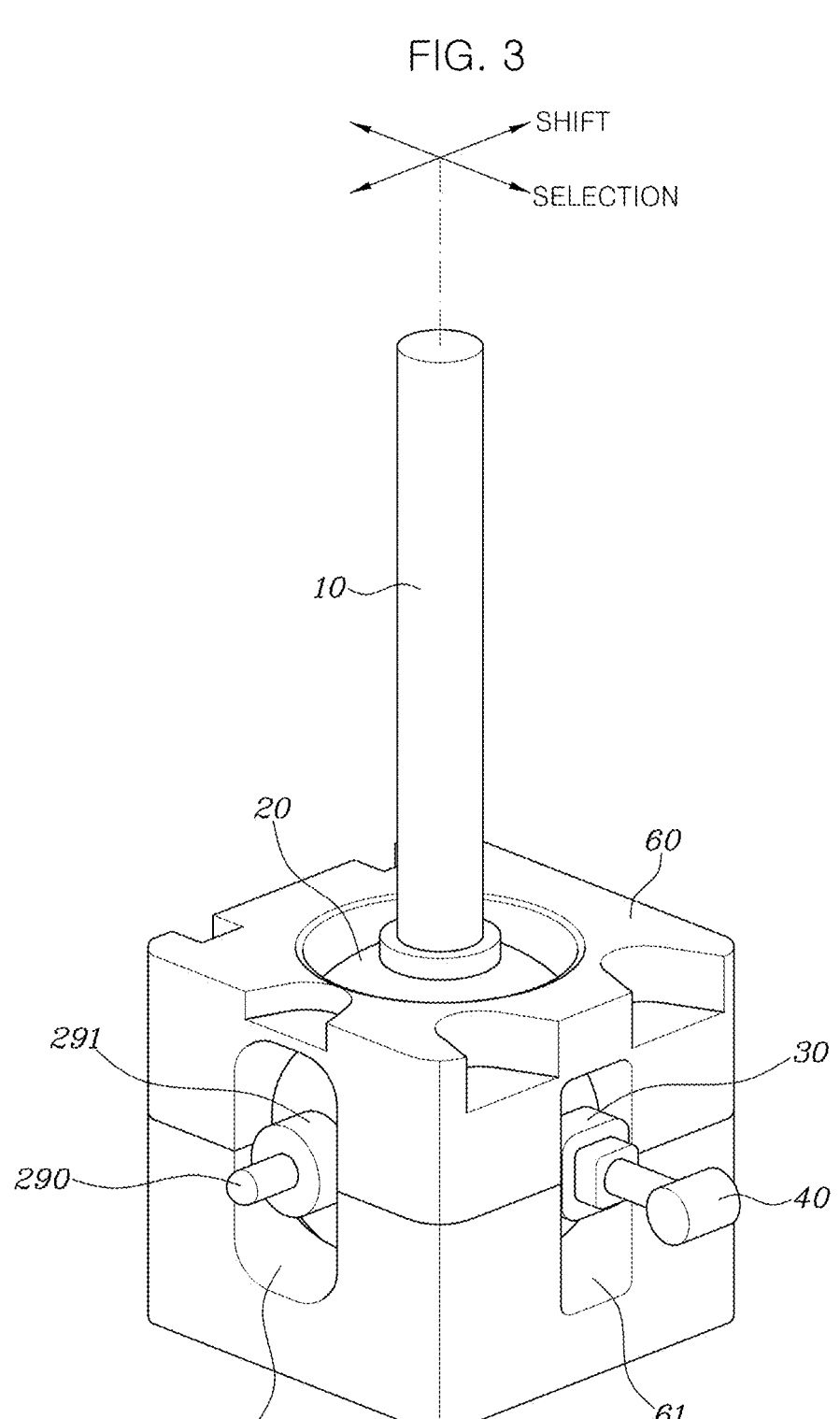
FIG. 3, FIG. 4, FIG. 5, FIG. 6, FIG. 7 and FIG. 8 are views exemplarily illustrating a detailed configuration of the electronic shift operation apparatus.
Figure 4:
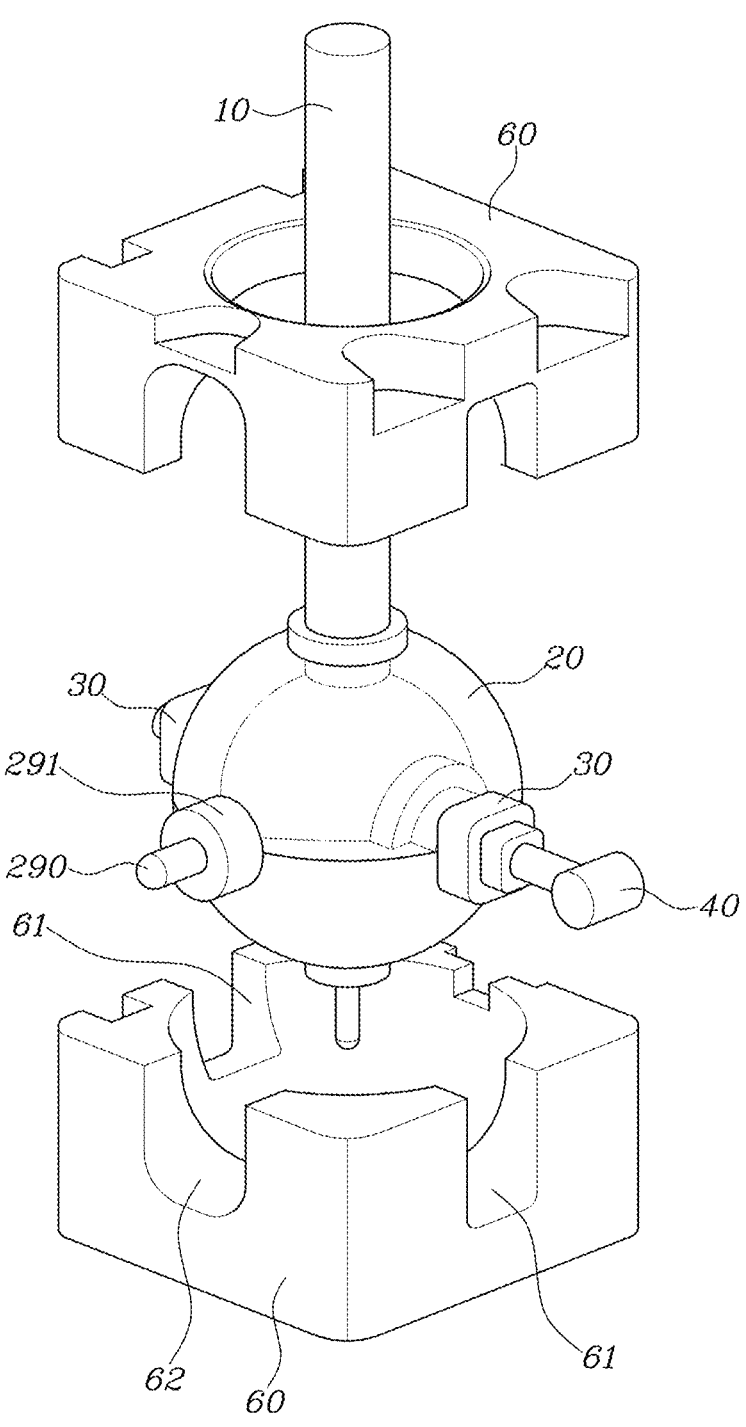
Figure 5:
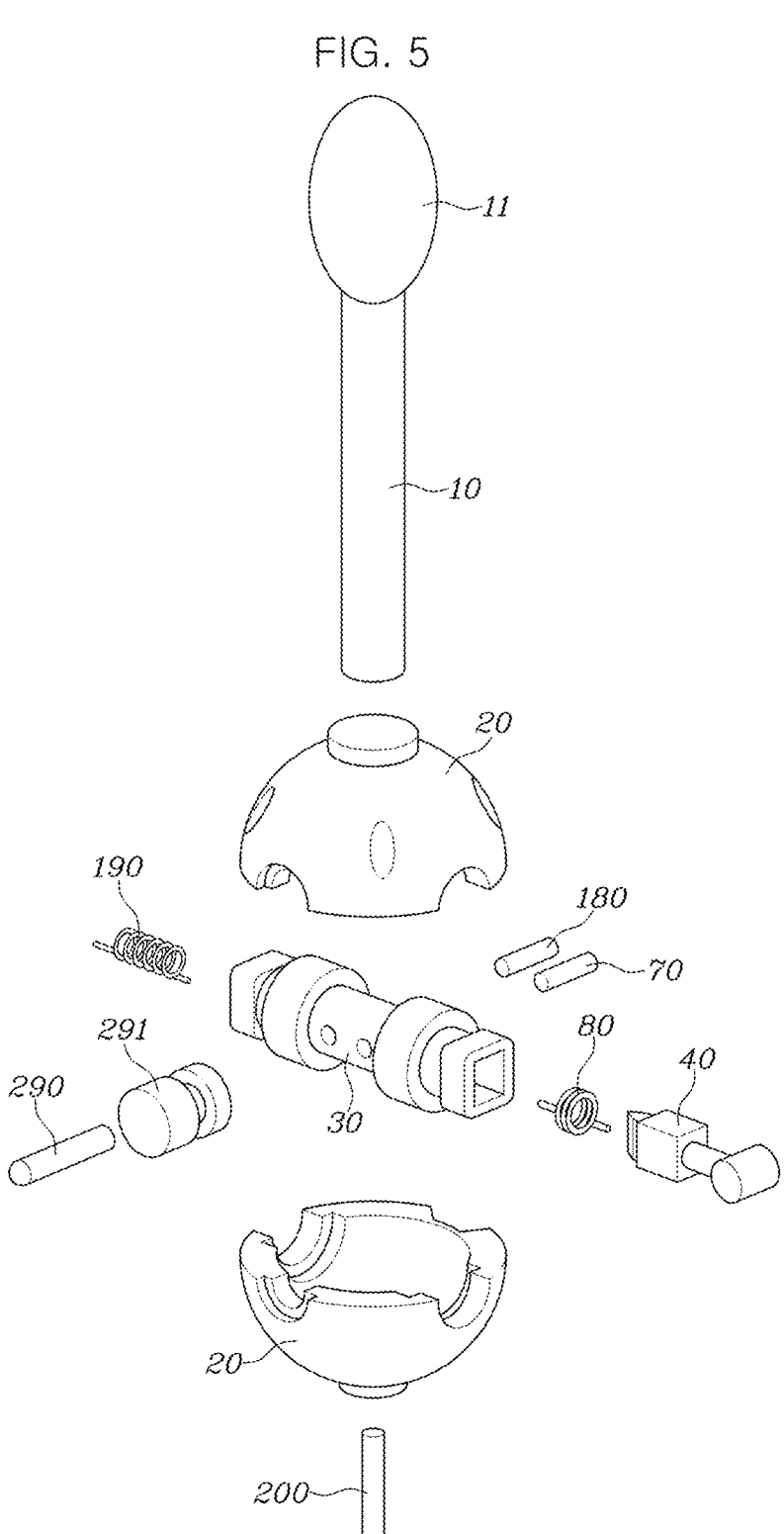
Figure 6:
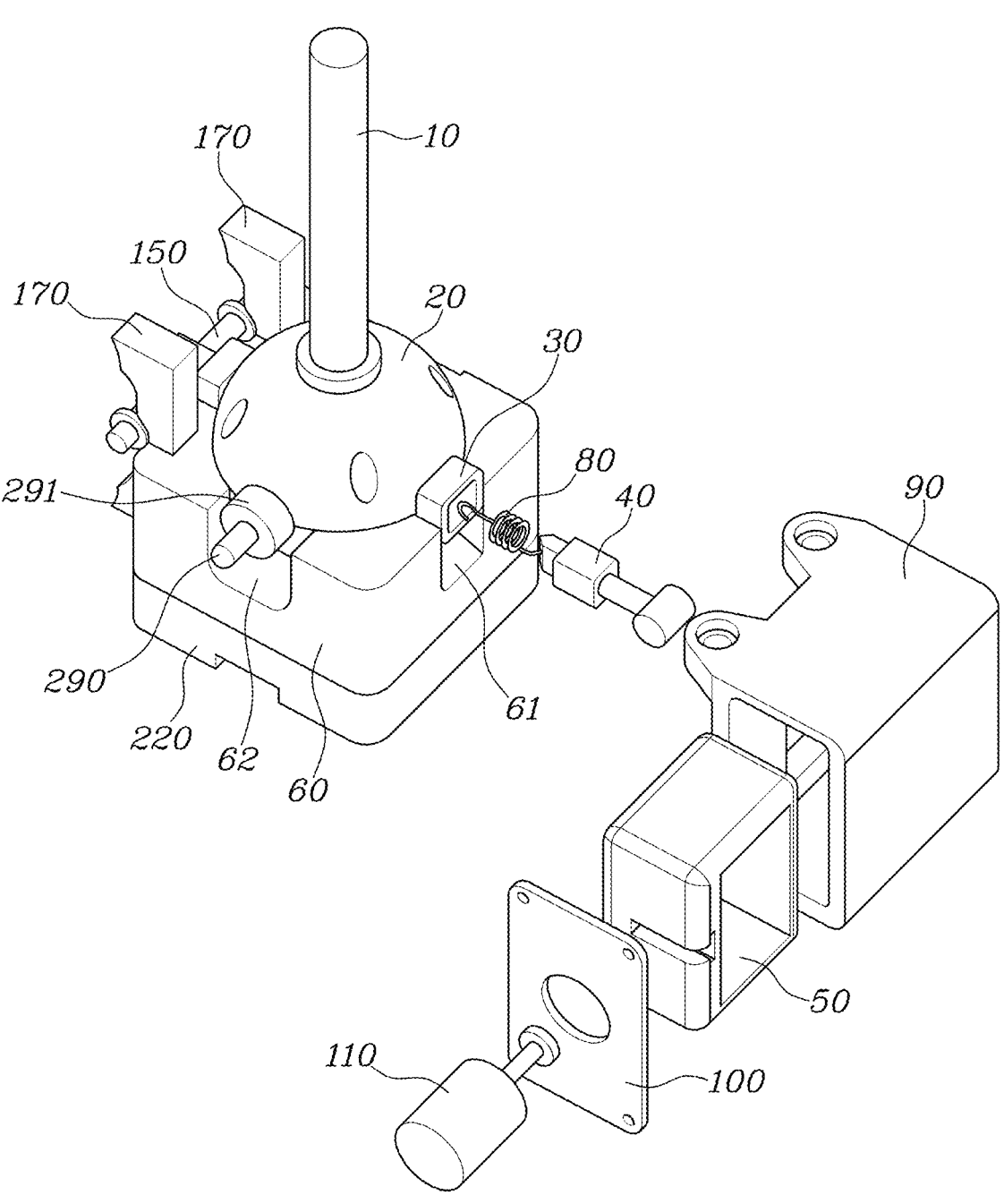
Figure 7:
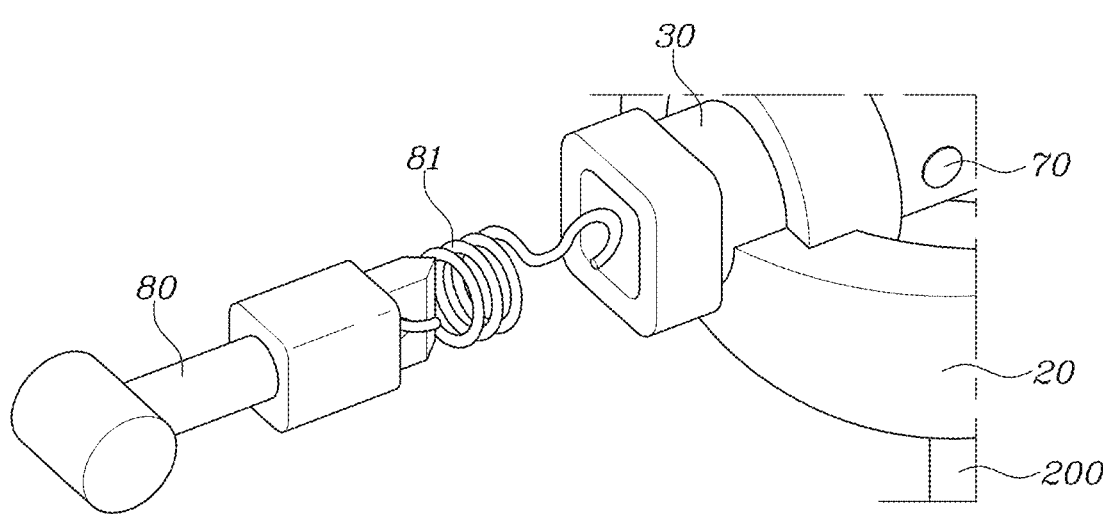
Figure 8:
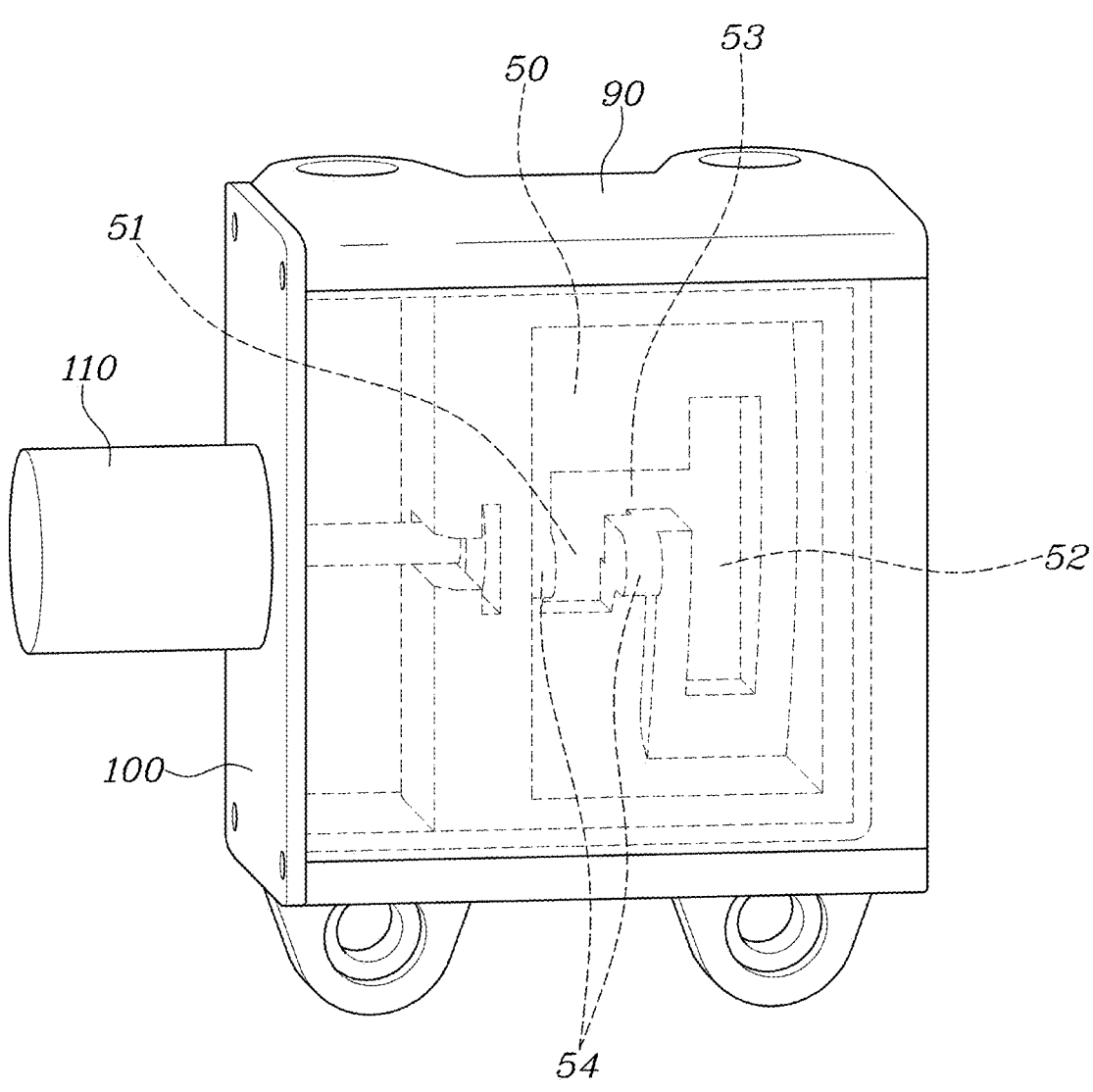
Figure 9:
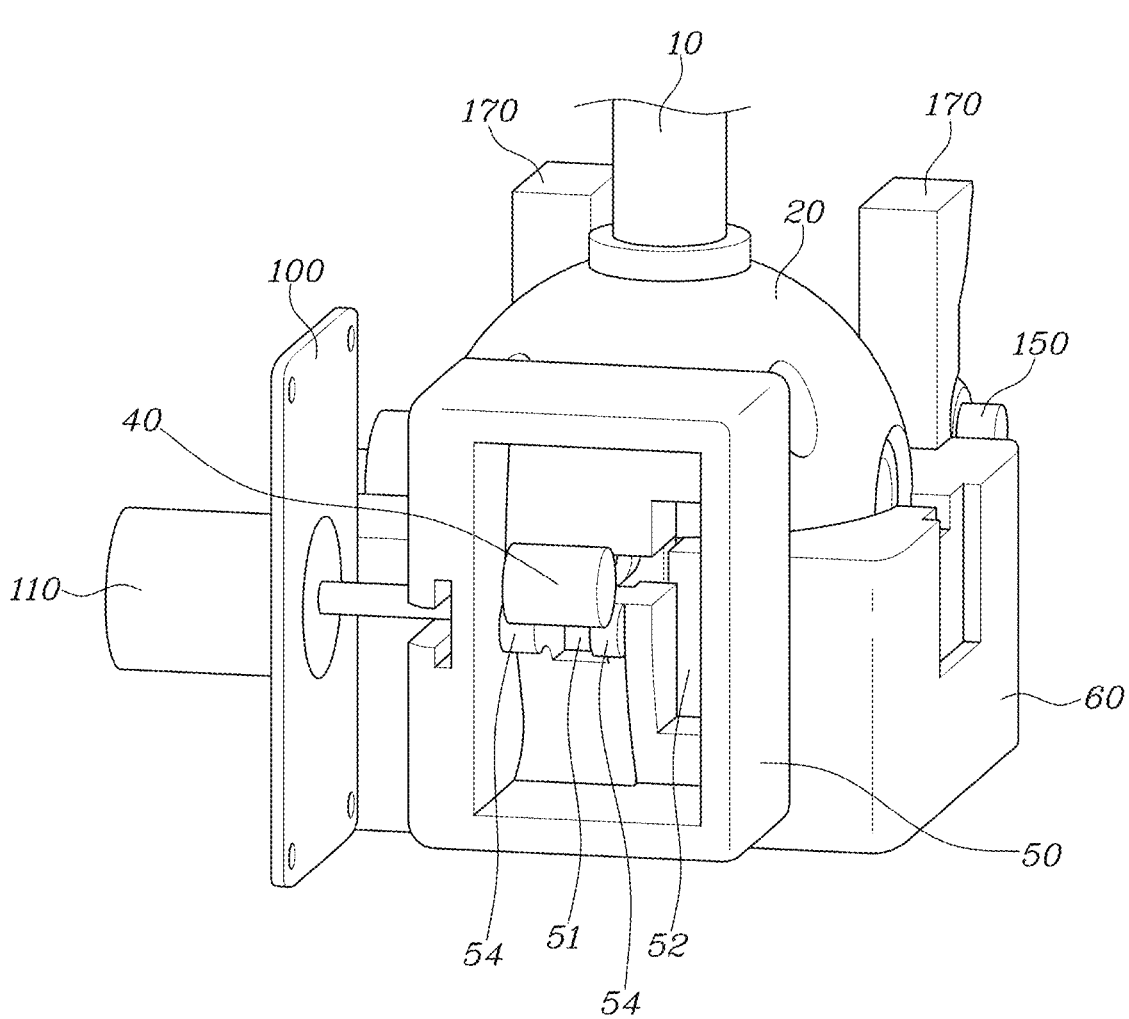
FIG. 9, FIG. 10, FIG. 11A and FIG. 11B, FIG. 12, FIG. 13 and FIG. 14A and FIG. 14B are views for explaining situations in which a mode switching rod moves along a first selection groove in an automatic shift mode.
Figure 10:
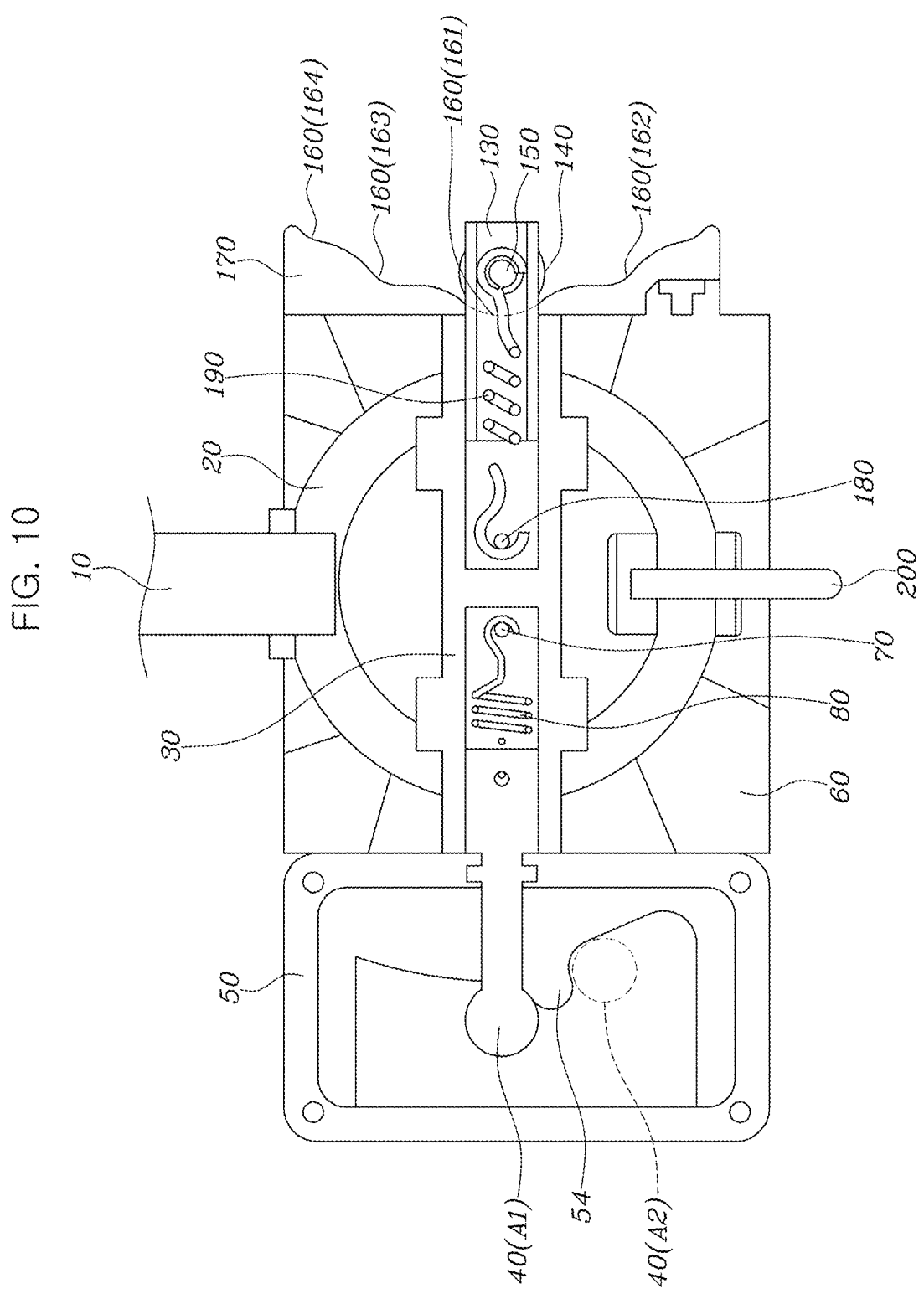

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is referred to as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly referred to as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" included in the name of "motor control unit (MCU)" or "hybrid control unit (HCU)" is merely a term widely used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an electronic shift operation apparatus according to an exemplary embodiment of the present disclosure will be described with reference to the accompanying drawings.

The electronic shift operation apparatus according to an exemplary embodiment of the present disclosure includes a mode switching device configured for switching a mode of a shift operation to an automatic shift or a manual shift based on a driver's intention. Therefore, it is possible to eliminate simplicity of the shift operation, which may provide enjoyment to the driver and improve marketability.

Furthermore, the electronic shift operation apparatus according to an exemplary embodiment of the present disclosure may include a stroke restriction device configured for differently restricting shift direction strokes of a shift rod in accordance with an automatic shift mode and a manual shift mode.

Typically, the shift direction stroke of the shift rod is relatively shorter in the automatic shift mode than in the manual shift mode, which may improve the operation convenience.

On the other hand, the shift direction stroke of the shift rod is relatively longer in the manual shift mode than in the automatic shift mode, which may improve the recognition performance during the shift operation.

Furthermore, the electronic shift operation apparatus according to an exemplary embodiment of the present disclosure may include a system that implements the mode switching device for the shift operation and the stroke restriction device for restricting the shift direction stroke of the shift rod.

First, the mode switching device configured for switching the mode to the automatic shift mode or the manual shift mode based on the driver's intention will be described.

The electronic shift operation apparatus according to an exemplary embodiment of the present disclosure may include a ball cover 20 coupled to a shift rod 10 and configured to rotate in a selection direction and a shift direction when a driver manipulates the shift rod 10, a hinge shaft 30 coupled to the ball cover 20 and configured to rotate together with the ball cover 20 when the ball cover 20 rotates in the selection direction and to serve as a rotation center portion of the ball cover 20 when the ball cover 20 rotates in the shift direction, a mode switching rod 40 coupled to one end portion of the hinge shaft 30 and configured to be movable in a longitudinal direction of the hinge shaft 30, and a mode switching guide 50 into which an end portion of the mode switching rod 40 is inserted, the mode switching guide 50 including a first selection groove 51 configured to guide the movement of the mode switching rod 40 in the selection direction in the automatic shift mode, and a second selection groove 52 configured to guide the movement of the mode switching rod 40 in the selection direction in the manual shift mode.

The shift rod 10 may include a knob 11 that the driver may grip with his or her hand to operate the shift rod 10.

The electronic shift operation apparatus according to an exemplary embodiment of the present disclosure may be positioned at a position at which the driver may easily manipulate the shift rod 10. For example, the electronic shift operation apparatus may be provided on a console, center fascia, or the like in a vehicle, or the electronic shift operation apparatus may be provided on a seat based on an autonomous driving situation.

The ball cover 20 may be provided in a form of a spherical body with an empty interior or configured as an assembly of hemispherical upper and lower covers.

The hinge shaft 30 may be configured as a hollow shaft with an empty interior and penetrate the ball cover 20 in the selection direction.

The ball cover 20 and the hinge shaft 30 may rotate together when the ball cover 20 rotates in the selection direction by being manipulated by the shift rod 10. When the ball cover 20 rotates in the shift direction, only the ball cover 20 rotates, and the hinge shaft 30 is configured as the rotation center portion of the ball cover 20 without rotating.

One end portion of the mode switching rod 40 may be inserted into one end portion of the hinge shaft 30. The mode switching rod 40 may be provided to be movable in the longitudinal direction of the hinge shaft 30.

The other end portion of the mode switching rod 40 is provided to be inserted into the first selection groove 51 or the second selection groove 52 formed in the mode switching guide 50. The first selection groove 51 and the second selection groove 52 are connected by a connection groove 53.

When the mode switching guide 50 moves in the shift direction, the mode switching guide 50 may move in the state in which the other end portion of the mode switching rod 40 is inserted into the connection groove 53, and the other end portion of the mode switching rod 40 may be positioned in the first selection groove 51 or positioned in the second selection groove 52 by the movement of the mode switching guide 50 in the shift direction.

The electronic shift operation apparatus according to an exemplary embodiment of the present disclosure may further include a ball cover bracket 60 configured to cover the ball cover 20 and guide the rotations of the ball cover 20 in the selection direction and the shift direction.

The ball cover bracket 60 may be formed in a hexahedral shape and configured as an assembly of upper and lower brackets.

The ball cover 20 may be positioned in the ball cover bracket 60. An internal surface of the ball cover bracket 60 may be formed in a spherical surface that facilitates the rotations of the ball cover 20 in the selection direction and the shift direction.

The hinge shaft 30 may penetrate the ball cover 20 in the selection direction. Two opposite end portions of the hinge shaft 30, which protrude to the outside of the ball cover 20, may be provided to be inserted into first side grooves 61 of the ball cover bracket 60.

The first side grooves 61 may be formed to extend upward and downward in two surfaces positioned in the ball cover bracket 60 based on the selection direction.

The two opposite end portions of the hinge shaft 30 and the first side grooves 61 have portions facing one another in the shift direction and configured to be in surface-contact with one another.

Therefore, when the ball cover 20 is rotated in the shift direction by the manipulation of the shift rod 10, the two opposite end portions of the hinge shaft 30 are restrained by the first side grooves 61 so that the rotation of the hinge shaft 30 in the shift direction may be restricted, and the ball cover 20 may rotate in the shift direction about the hinge shaft 30.

Furthermore, when the ball cover 20 is rotated in the selection direction by the manipulation of the shift rod 10, the ball cover 20 and the hinge shaft 30 rotate together in the selection direction, and the first side grooves 61 may extend upward and downward from a side surface of the ball cover bracket 60, in the illustrated state, to guide the rotation of the hinge shaft 30 in the selection direction.

The rotation in the selection direction may be restrained when an end portion of the hinge shaft 30 comes into contact with an upper or lower end portion of the first side groove 61 as the ball cover 20 rotates in the selection direction.

The hinge shaft 30 may be configured as a hollow shaft with an empty interior. One end portion of the mode switching rod 40 may be inserted into the hinge shaft 30 so that the mode switching rod 40 may move in the longitudinal direction of the hinge shaft 30, and the rotation of the mode switching rod 40 may be restrained and restricted by the hinge shaft 30.

One end portion of the hinge shaft 30 and one end portion of the mode switching rod 40 may be formed in quadrangular cross-sectional shapes corresponding to each other.

Therefore, in the state in which one end portion of the mode switching rod 40 is inserted into one end portion of the hinge shaft 30, the mode switching rod 40 may move only in the longitudinal direction of the hinge shaft 30, and the rotation of the mode switching rod 40 is restrained by the cross-sectional shape of the hinge shaft 30 and cannot be performed.

The electronic shift operation apparatus according to an exemplary embodiment of the present disclosure may further include a first spring fixing pin 70 coupled to penetrate a middle point of the hinge shaft 30 based on the longitudinal direction, and a mode switching spring 80 including two opposite end portions connected to one end portion of the first spring fixing pin 70 and one end portion of the mode switching rod 40 and configured to provide an elastic force to the mode switching rod 40.

The first spring fixing pin 70 is coupled to penetrate, in the shift direction, the middle point of the hinge shaft 30 in the longitudinal direction.

The mode switching spring 80 may be configured as a coil spring and provide a spring force that pulls the mode switching rod 40 toward the inside of the hinge shaft 30.

The electronic shift operation apparatus according to an exemplary embodiment of the present disclosure may further include a mode switching guide bracket 90 fixedly coupled to one side of the ball cover bracket 60, the mode switching guide 50 being inserted into the mode switching guide bracket 90 and provided to be movable in the shift direction, and a mode switching solenoid 110 fixedly coupled to a plate 100 coupled to the mode switching guide bracket 90, the mode switching solenoid 110 being connected to the mode switching guide 50, configured to move the mode switching guide 50 in the shift direction during the operation, and configured to operate by receiving an automatic shift mode signal or a manual shift mode signal.

The mode switching guide bracket 90 may be fixedly coupled to one side surface of the ball cover bracket 60 in which the first side groove 61 is formed.

The mode switching guide bracket 90 includes an empty interior, and the mode switching guide 50 is inserted and provided into the mode switching guide bracket 90. When a mode switching solenoid 110 operates, the mode switching guide 50 may move in the shift direction in the state in which the mode switching guide 50 is inserted into the mode switching guide bracket 90.

The plate 100 is fixedly coupled to the mode switching guide bracket 90, and the mode switching solenoid 110 is fixedly coupled to the plate 100.

The mode switching solenoid 110 may be connected to the mode switching guide 50. When the mode switching solenoid 110 may operate, the mode switching guide 50 may move in the shift direction in the state in which the mode switching guide 50 inserted into the mode switching guide bracket 90.

When the driver manipulates a mode selection portion 120, the automatic shift mode signal or the manual shift mode signal may be generated. The mode switching solenoid 110 may operate by receiving the automatic shift mode signal or the manual shift mode signal.

The mode switching guide 50 may include the first selection groove 51 and the second selection groove 52 into which the end portion of the mode switching rod 40 is inserted, and the connection groove 53 that connects the first selection groove 51 and the second selection groove 52.

With reference to FIG. 9, FIG. 10, FIG. 11A and FIG. 11B, FIG. 12, FIG. 13, and FIG. 14A and FIG. 14B, in the automatic shift mode, the end portion of the mode switching rod 40 is inserted into the first selection groove 51. In the instant state, when the ball cover 20 rotates in the selection direction, the end portion of the mode switching rod 40 moves along the first selection groove 51.

With reference to FIG. 15, FIG. 16A and FIG. 16B, FIG. 17, FIG. 18A and FIG. 18B, and FIG. 19, in the manual shift mode, the end portion of the mode switching rod 40 is inserted into the second selection groove 52. In the instant state, when the ball cover 20 rotates in the selection direction, the end portion of the mode switching rod 40 moves along the second selection groove 52.

When the mode switching guide 50 is moved in the shift direction by operation of the mode switching solenoid 110, the mode switching guide 50 may move in the state in which the other end portion of the mode switching rod 40 is inserted into the connection groove 53, and the other end portion of the mode switching rod 40 may be positioned in the first selection groove 51 or positioned in the second selection groove 52 by the movement of the mode switching guide 50 in the shift direction.

With reference to FIG. 9, FIG. 10, FIG. 11A and FIG. 11B, FIG. 12, FIG. 13, and FIG. 14A and FIG. 14B, in the automatic shift mode, the first selection groove 51, in which the mode switching rod 40 is positioned, may include an initial position (Null position) A1 connected to the connection groove 53, and an M (Manual) position A2 spaced apart from the initial position A1 in one direction. When the ball cover 20 rotates in the selection direction, the mode switching rod 40 may move between the initial position A1 and the M position A2 and be stopped at the initial position A1 or the M position A2.

That is, in the automatic shift mode, the initial position A1 and the M position A2 may be fixed end portions at which the mode switching rod 40 is fixed.

A catching projection 54 may protrude between the initial position A1 and the M position A2. When the mode switching rod 40 climbs over the catching projection 54, an operating force is generated. When the mode switching rod 40 is positioned at the initial position A1 or the M position A2, the movement of the mode switching rod 40 may be restrained by the catching projection 54, and the position of the mode switching rod 40 may be stopped.

With reference to FIG. 15, FIG. 16A and FIG. 16B, FIG. 17, FIG. 18A and FIG. 18B, and FIG. 19, in the manual shift mode, the second selection groove 52, in which the mode switching rod 40 is positioned, may include an initial position (an N stage, a neutral stage, a 3/4 stage selection position) B1 connected to the connection groove 53, a 5/6 stage selection position B2 spaced apart from the initial position B1 in one direction, and a 1/2 stage selection position B3 and an R stage selection position B4 spaced apart from the initial position B1 in the other direction.

When the ball cover 20 is rotated in the selection direction by operation of the shift rod 10, the mode switching rod 40 may move between the 5/6 stage selection position B2 and the R stage selection position B4. When the driver's operating force is released from the shift rod 10, the mode switching rod 40 may be returned to the initial position B1 by the spring force.

That is, in the manual shift mode, the 5/6 stage selection position B2, the 1/2 stage selection position B3, and the R stage selection position B4 are not fixed end portions at which the movement of the mode switching rod 40 is fixed so that when the driver's operating force is removed after the position B2, B3, or B4 is selected, the mode switching rod 40 is returned to the initial position B1 by the spring force.

The catching projection 54 is provided in the first selection groove 51. Therefore, in the automatic shift mode, when the mode switching rod 40 is moved from the initial position A1 to the M position A2 by the selection manipulation of the shift rod 10, a high operating force is generated as the mode switching rod 40 climbs over the catching projection 54.

In contrast, a protrusion, which is similar to the catching projection 54 of the first selection groove 51, is not provided in the second selection groove 52. Therefore, in the manual shift mode, when the shift rod 10 performs the selection manipulation, the mode switching rod 40 may easily move along the second selection groove 52 without any interference.

Therefore, with the catching projection 54, a selection operating force of the shift rod 10 in the automatic shift mode may be higher than a selection operating force of the shift rod 10 in the manual shift mode and thus easily recognized by the driver.

The electronic shift operation apparatus according to an exemplary embodiment of the present disclosure may include a guide pipe 130 coupled to the other end portion of the hinge shaft 30 and configured to be movable in the longitudinal direction of the hinge shaft 30, a roller shaft 150 coupled to the guide pipe 130 while penetrating an end portion of the guide pipe 130 in the shift direction and including two opposite end portions to which a selection roller 140 is rotatably coupled, and selection detent brackets 170 fixedly coupled to the other side of the ball cover bracket 60 and including selection detent grooves 160 each including one surface with which the selection roller 140 is in contact. When the ball cover 20 rotates in the selection direction, the selection roller 140 may move along the selection detent grooves 160.

The guide pipe 130 and the roller shaft 150 may be integrally coupled. Alternatively, the roller shaft 150 may include a structure coupled to be rotatable relative to the guide pipe 130.

The first side grooves 61 may be respectively formed in the two opposite surfaces of the ball cover bracket 60 directed in the selection direction. The mode switching guide bracket 90 and the selection detent bracket 170 may be respectively fixedly coupled to one side surface and the other side surface of the ball cover bracket 60 in which the first side grooves 61 are formed.

One end portion of the guide pipe 130 is inserted into the other end portion of the hinge shaft 30 so that the guide pipe 130 is provided and structured to be movable in the longitudinal direction of the hinge shaft 30. The roller shaft 150 is integrally coupled to the other end portion of the guide pipe 130 and is provided to penetrate the other end portion of the guide pipe 130 in the shift direction. The selection roller 140 is rotatably coupled to two opposite end portions of the roller shaft 150.

The selection roller 140 may be provided to be in contact with the selection detent grooves 160 formed in the selection detent brackets 170. When the ball cover 20 rotates in the selection direction, the selection roller 140 may move along the selection detent groove 160.

Figure 25:
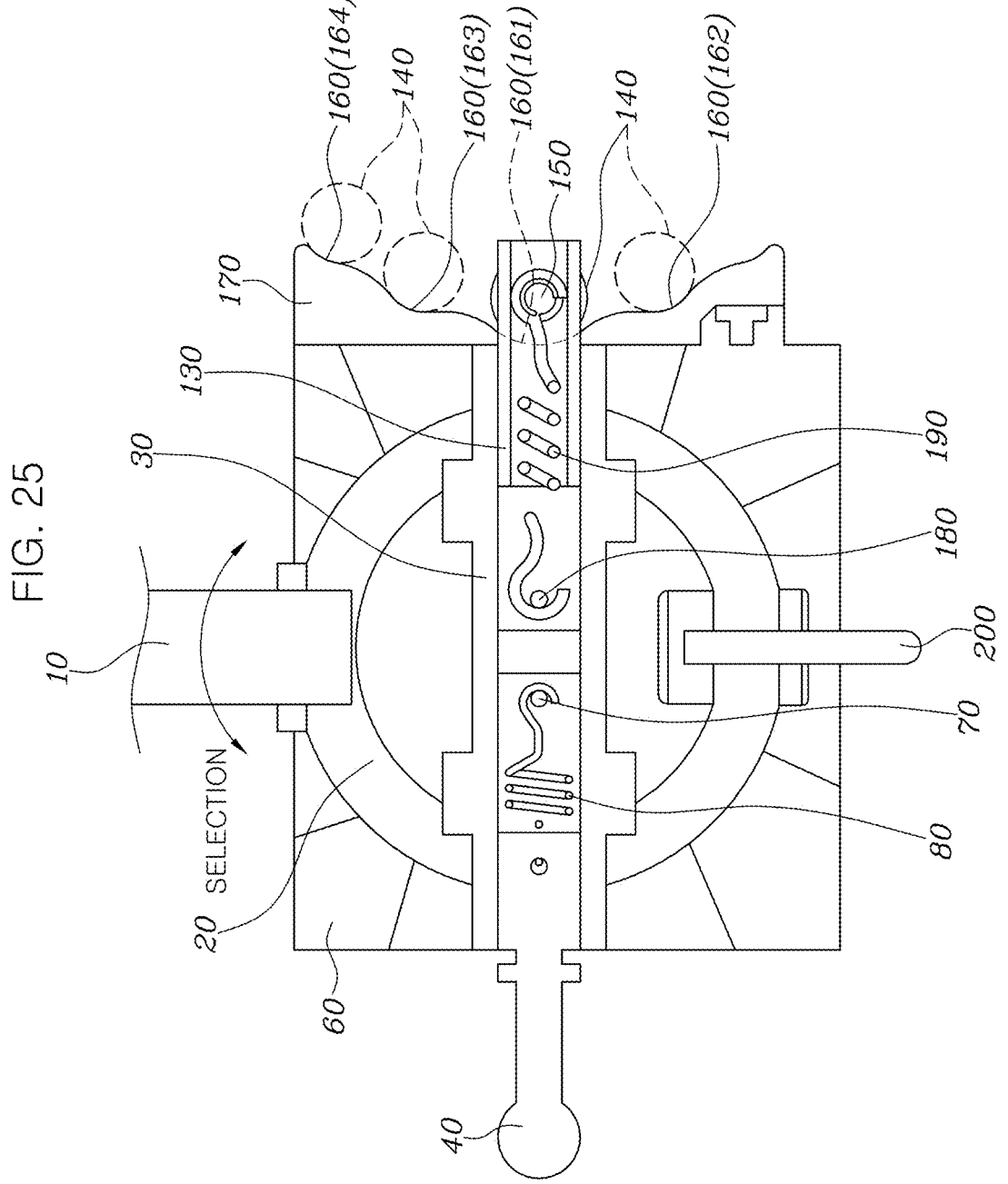
Figure 26:
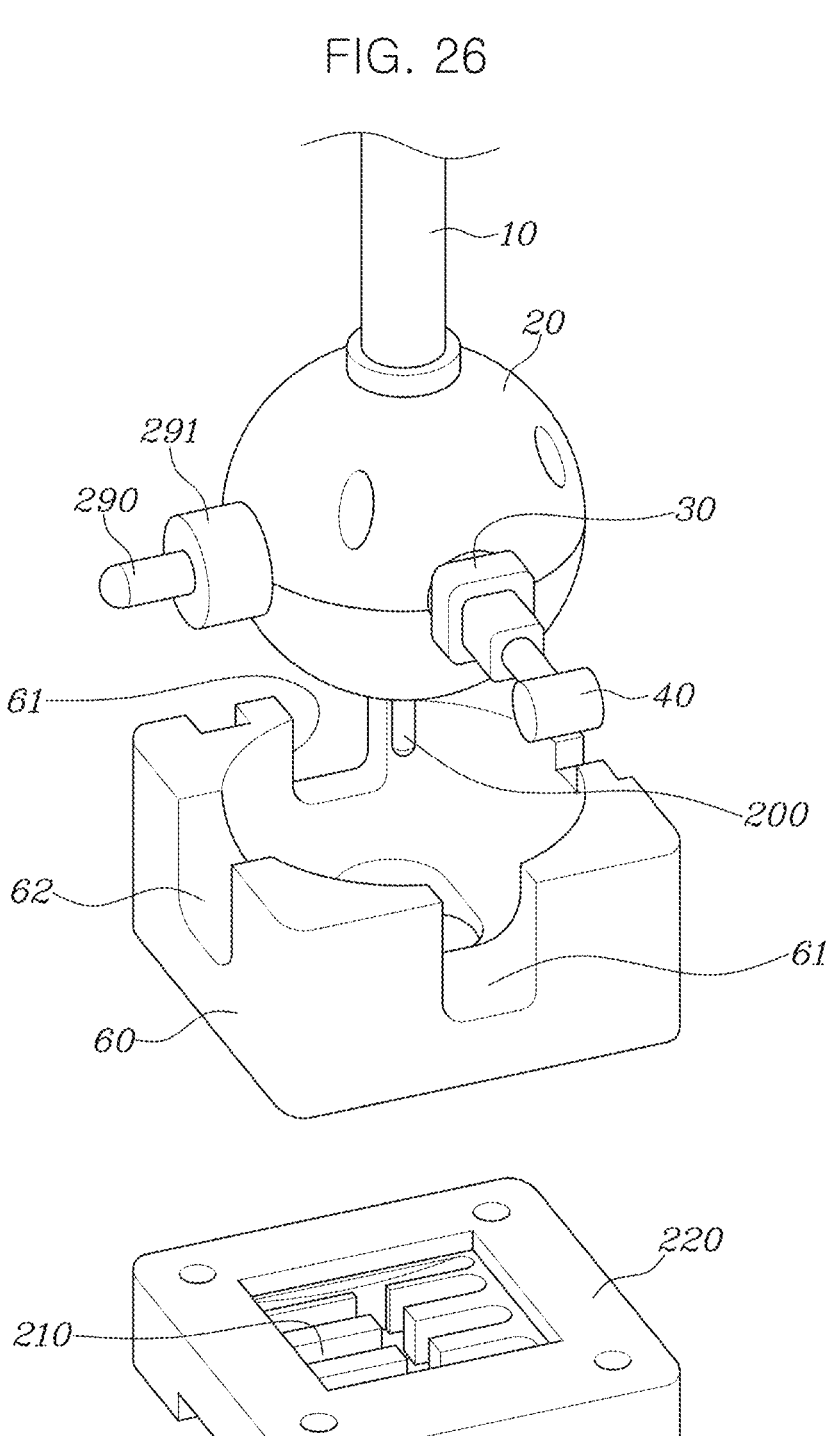
FIG. 26, FIG. 27A and FIG. 27B and FIG. 28A and FIG. 28B are views for explaining a pattern guide pin and a pattern guide rail.
Figure 27A:
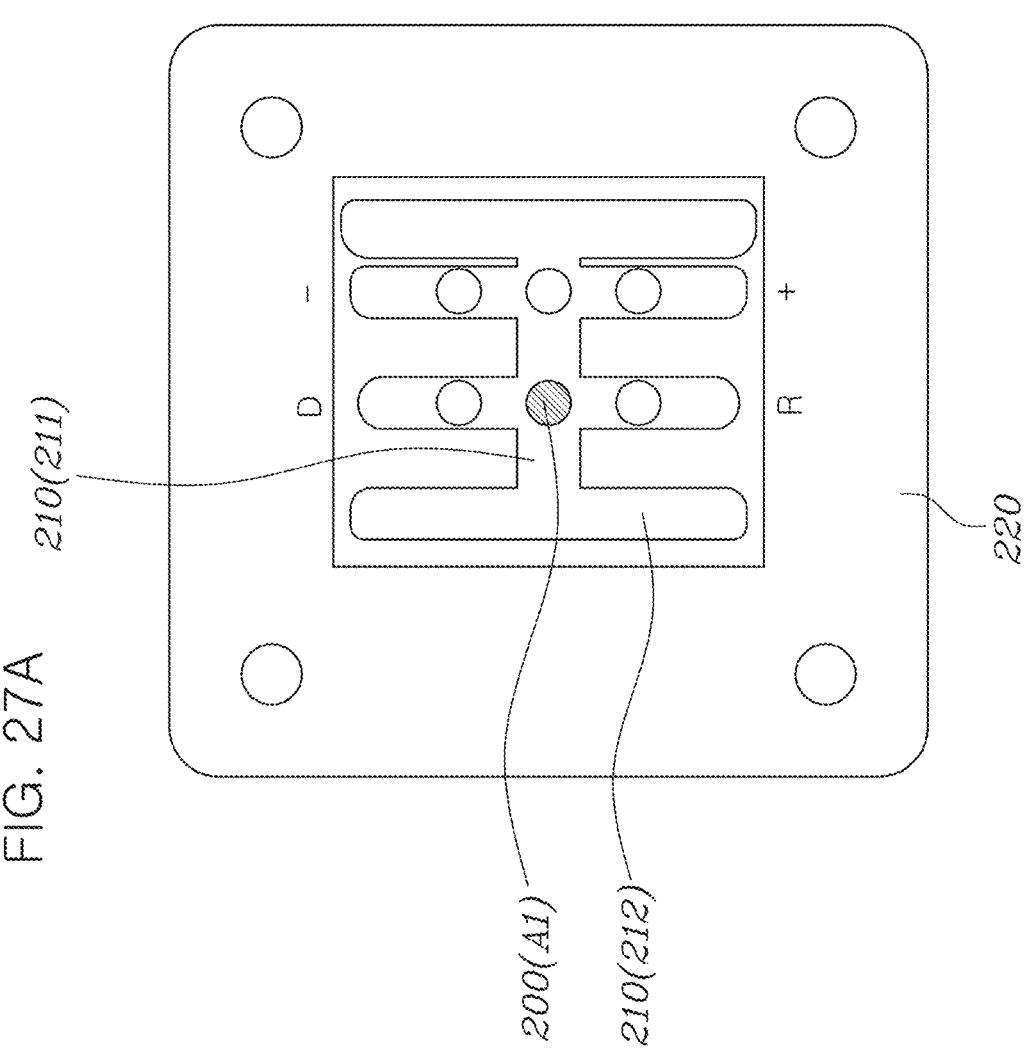
Figure 27B:
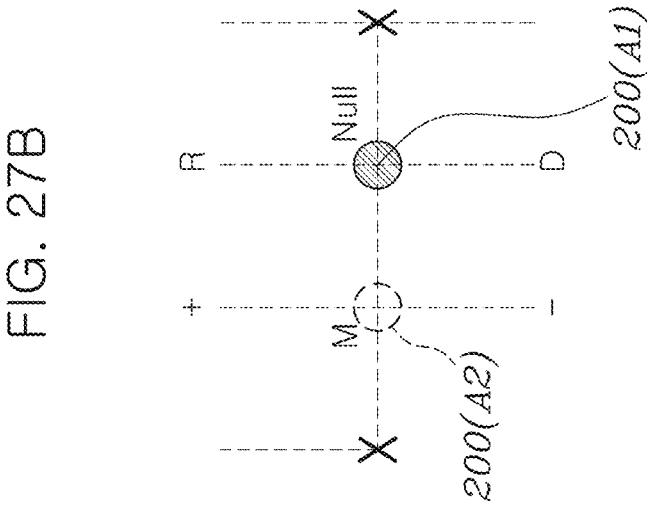
Figure 28A:
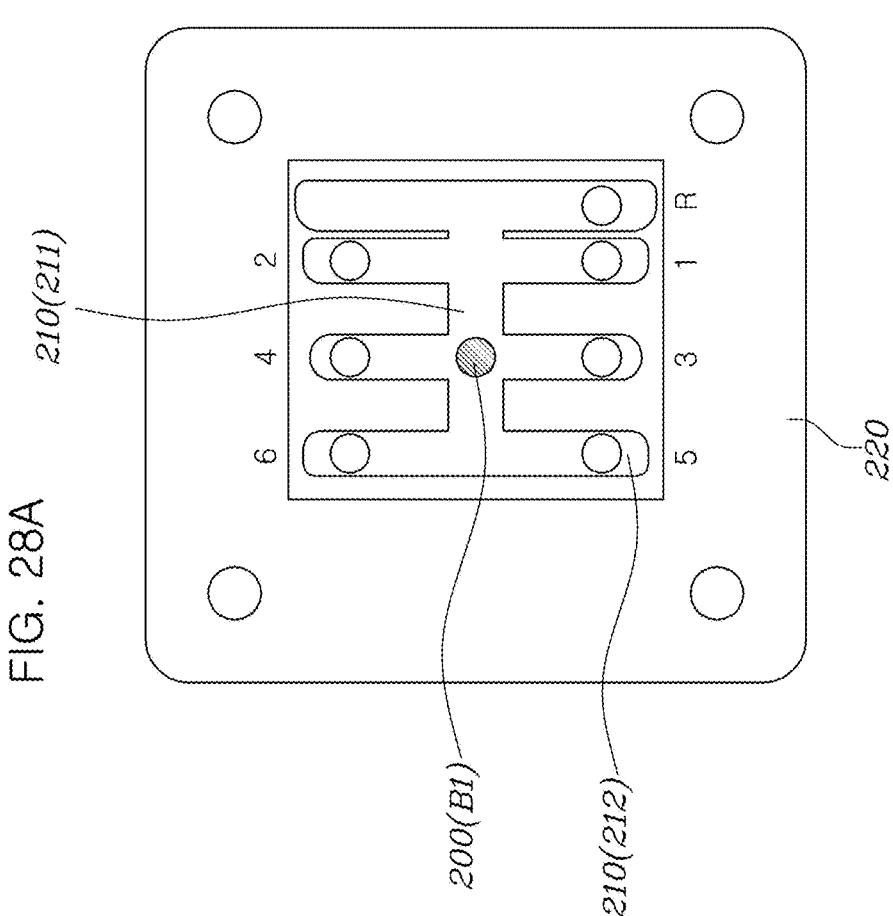
Figure 28B:
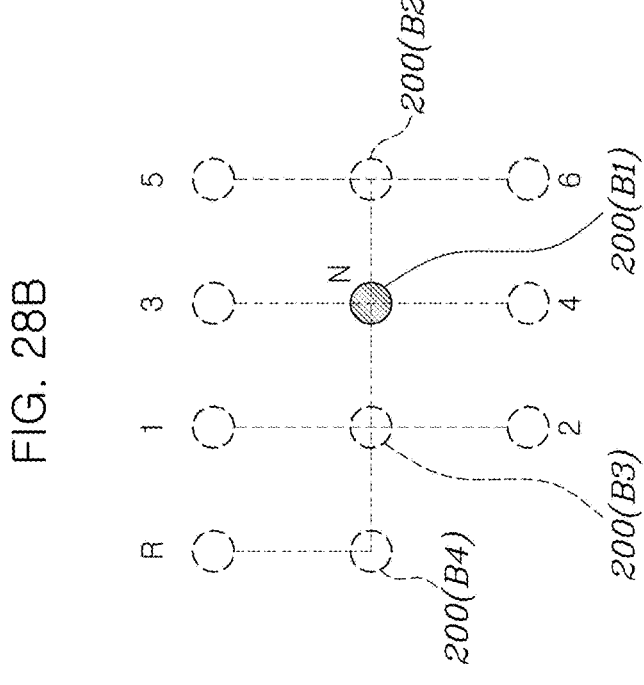
Figure 29:
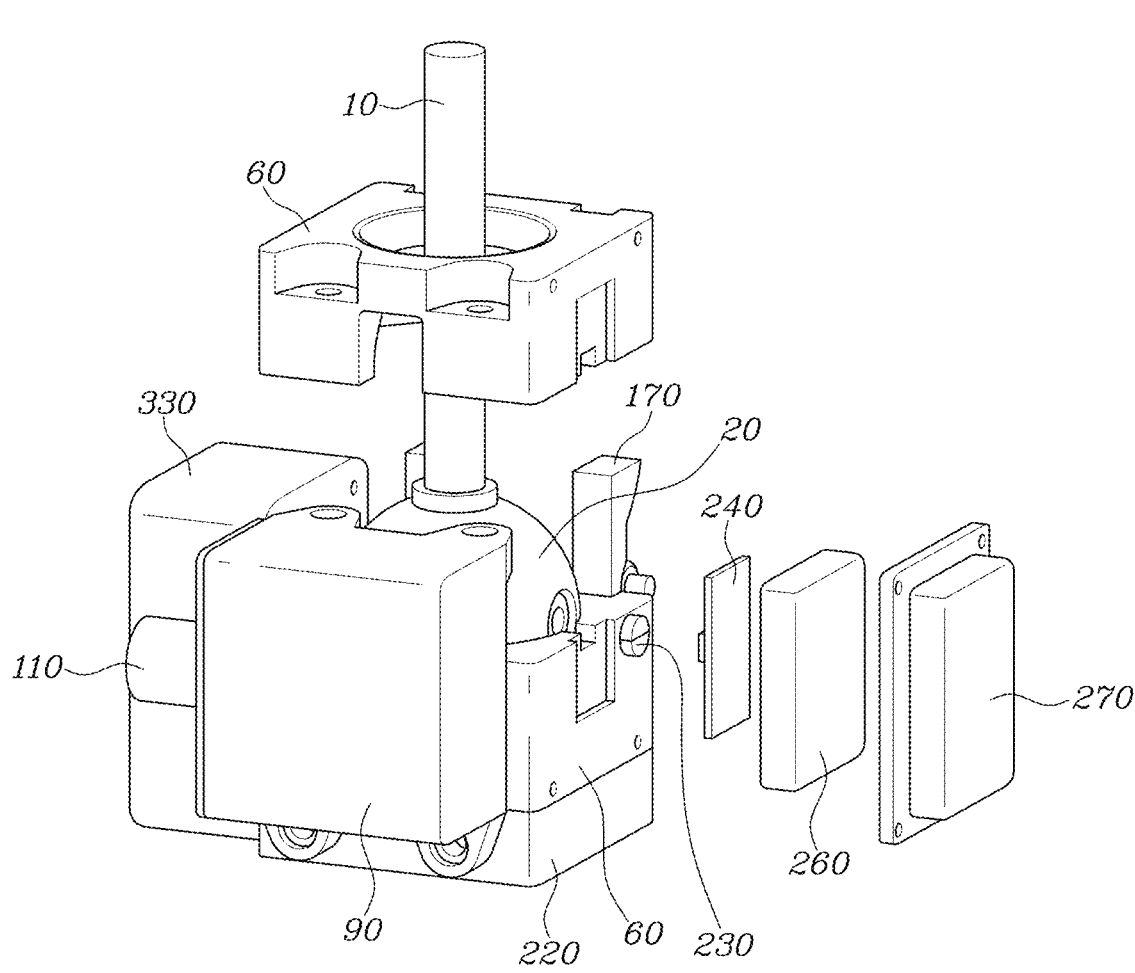
FIG. 29 and FIG. 30 are views for explaining a permanent magnet, a PCB, and a shifter controller.
Figure 30:
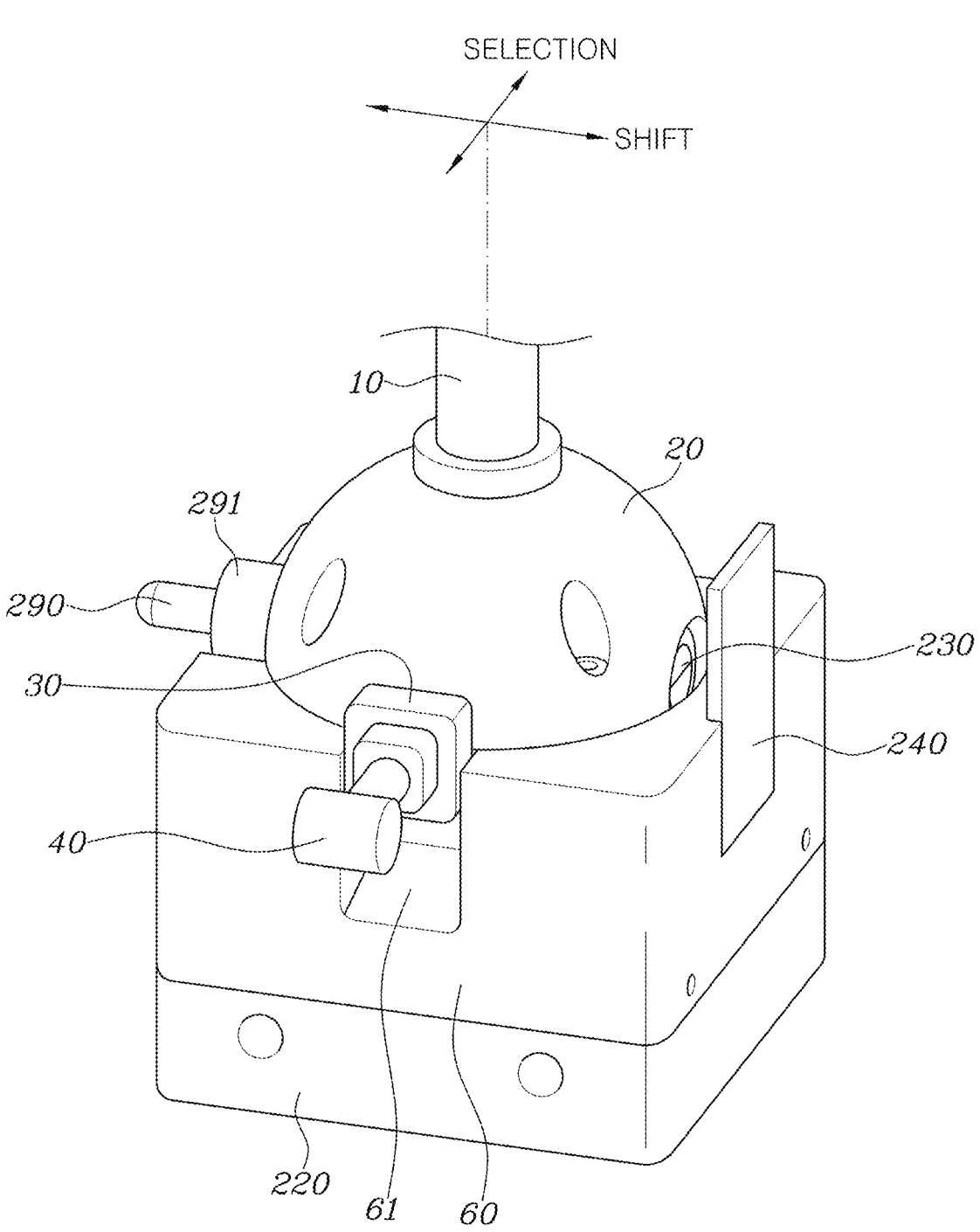
Figure 31:
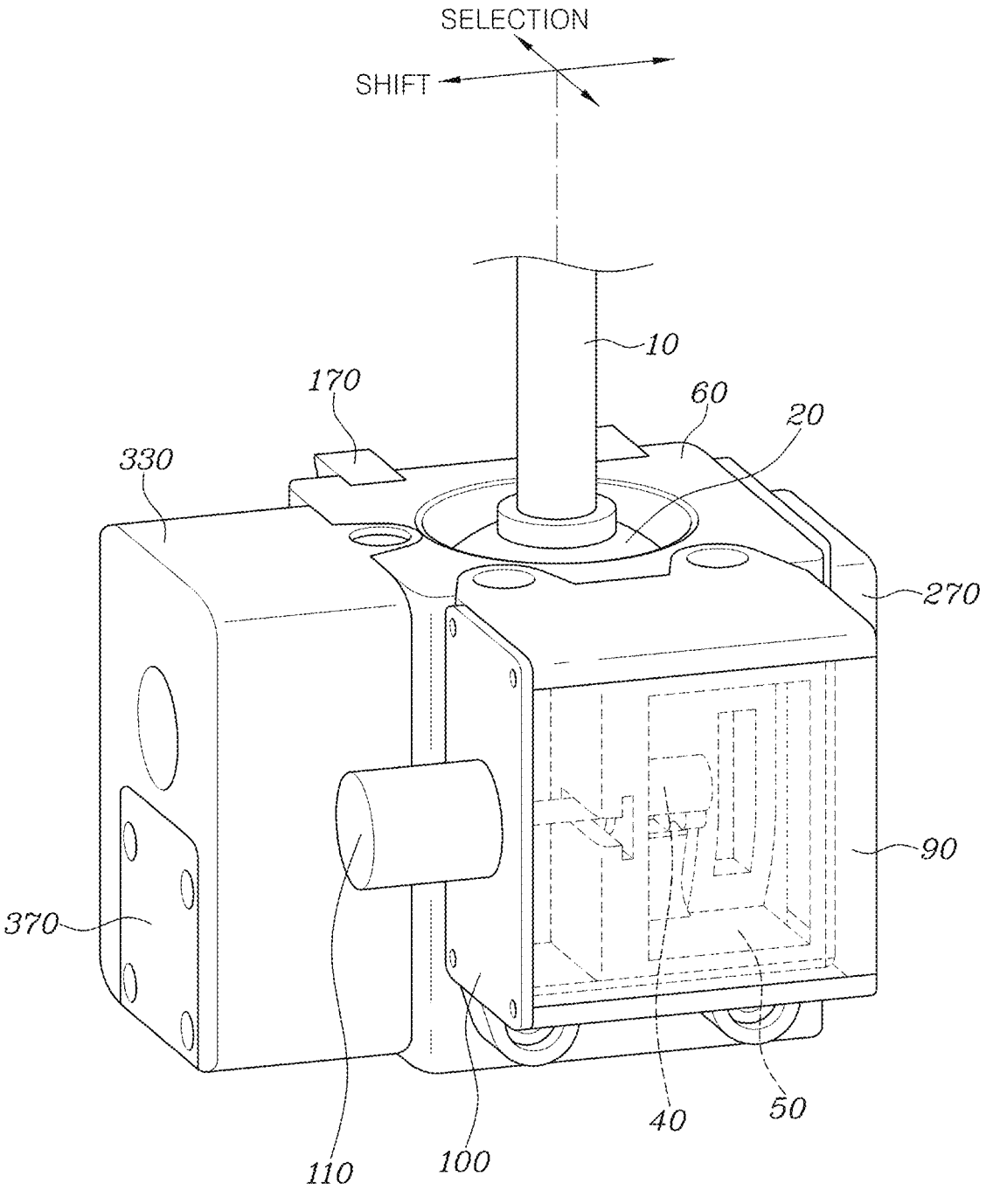
FIG. 31, FIG. 32, FIG. 33 and FIG. 34 are views for explaining a device for differently restricting shift direction strokes in the automatic shift mode and the manual shift mode according to an exemplary embodiment of the present disclosure.
Figure 32:
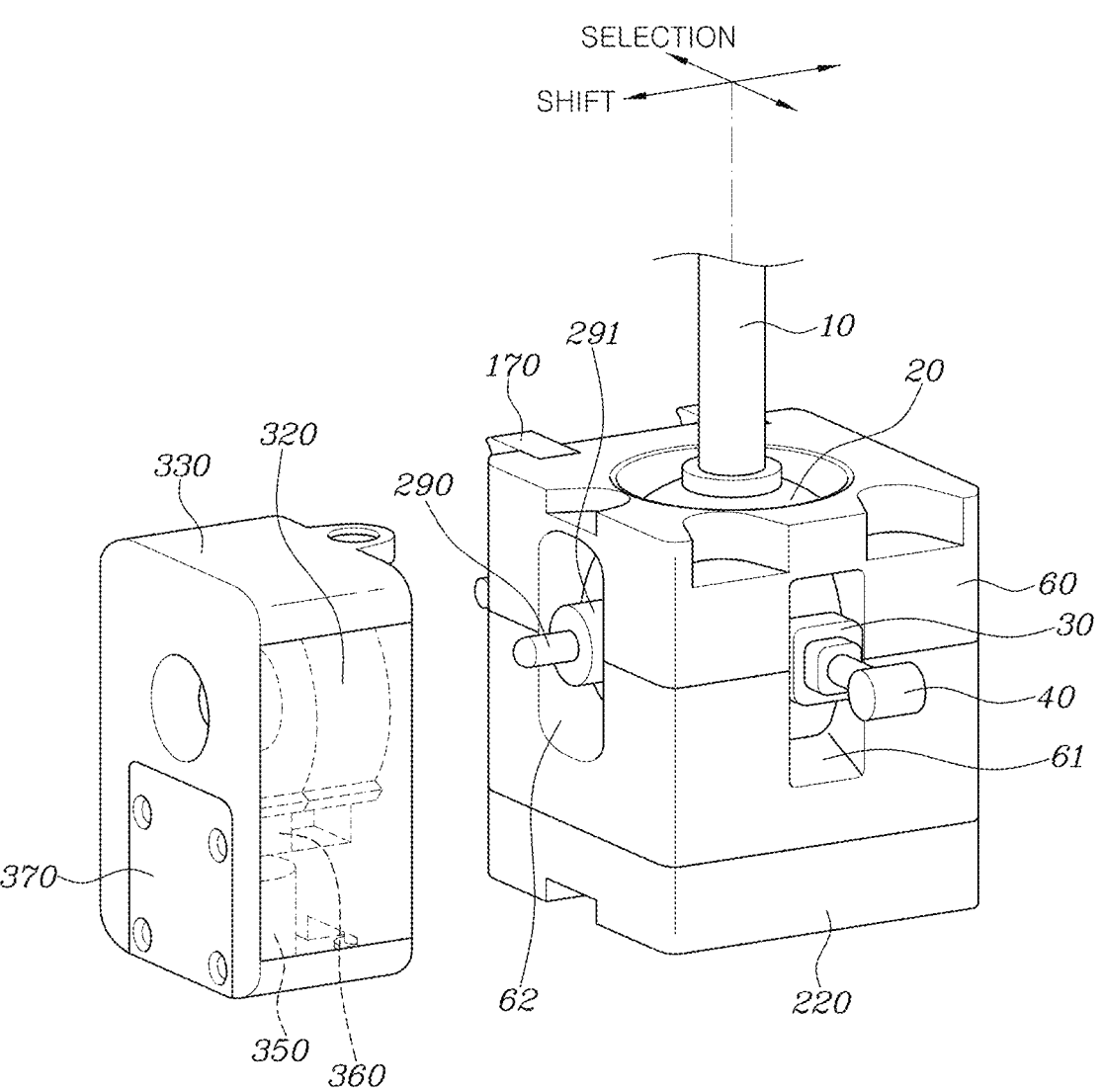
Figure 33:
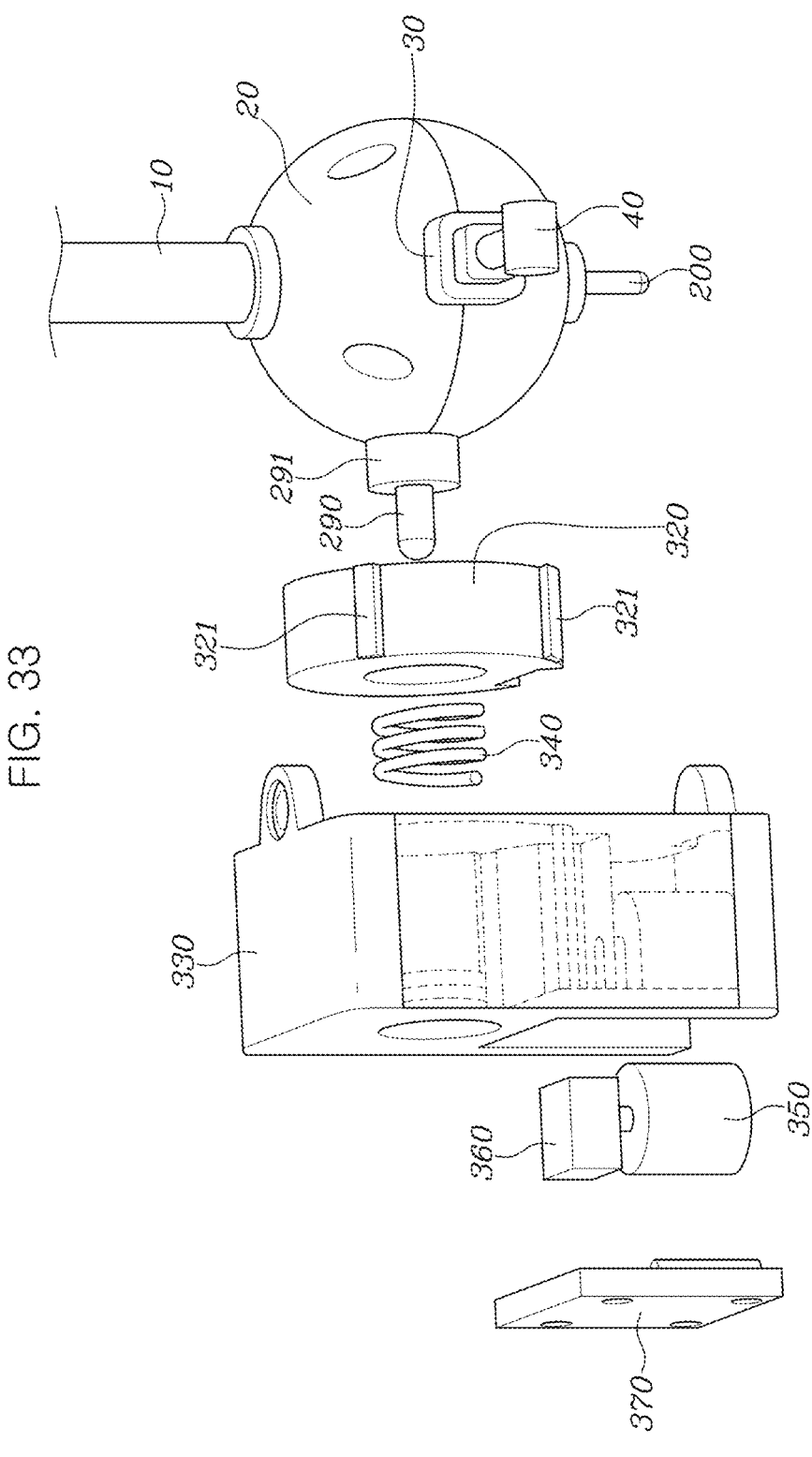

With reference to FIG. 25, the selection detent groove 160 may include a first groove 161, a second groove 162 positioned to be spaced apart from the first groove 161 in one direction, and a third groove 163 and a fourth groove 164 positioned to be spaced apart from the first groove 161 in the other direction.

The second groove 162, which is spaced apart from the first groove 161 in one direction, and the third groove 163 and the fourth groove 164, which are spaced apart from the first groove 161 in the other direction, may define movement paths each including a schematic arc shape.

That is, arc shapes may be formed so that based on a center portion of the ball cover 20, a radius to the first groove 161 is shortest, a radius to the second groove 162 and the third groove 163 is longer than a radius of the first groove 161, and a radius to the fourth groove 164 is longer than a radius of the radius of the third groove 163.

With reference to FIGS. 11 and 25, in the automatic shift mode in which the mode switching rod 40 is positioned in the first selection groove 51, the selection roller 140 may be positioned in the first groove 161 when the mode switching rod 40 is positioned at the initial position A1, and the selection roller 140 may be positioned in the third groove 163 when the mode switching rod 40 is positioned at the M position A2.

Furthermore, with reference to FIGS. 16 and 25, in the manual shift mode in which the mode switching rod 40 is positioned in the second selection groove 52, the selection roller 140 may be positioned in the first groove 161 when the mode switching rod 40 is positioned at the initial position B1, the selection roller 140 may be positioned in the third groove 163 when the mode switching rod 40 is positioned at the 1/2 stage selection position B3, the selection roller 140 may be positioned in the fourth groove 164 when the mode switching rod 40 is positioned at the R stage selection position B4, and the selection roller 140 may be positioned in the second groove 162 when the mode switching rod 40 is positioned at the 5/6 stage selection position B2.

The electronic shift operation apparatus according to an exemplary embodiment of the present disclosure may further include a second spring fixing pin 180 coupled to penetrate the middle point of the hinge shaft 30 based on the longitudinal direction, and a selection spring 190 including two opposite end portions connected to the second spring fixing pin 180 and the roller shaft 150 and configured to provide an elastic force of the roller shaft 150.

The second spring fixing pin 180 may be coupled to penetrate, in the shift direction, the middle point of the hinge shaft 30 based on the longitudinal direction. The first spring fixing pin 70 and the second spring fixing pin 180 may be spaced leftward and rightward apart from the middle point of the hinge shaft 30 based on the longitudinal direction and provided in parallel with the middle point of the hinge shaft 30 based on the longitudinal direction.

The selection spring 190 may be configured as a coil spring and provide a spring force that pulls the roller shaft 150 toward the inside of the hinge shaft 30. Therefore, the selection roller 140 may always be kept in contact with the selection detent groove 160 by the spring force of the selection spring 190.

When the selection roller 140 moves to the second groove 162, the third groove 163, or the fourth groove 164 as the ball cover 20 rotates in the selection direction in the state in which the selection roller 140 is positioned in the first groove 161, the selection spring 190 may generate an operating force while being stretched by a phase difference of the selection detent groove 160, and the guide pipe 130 may move along the hinge shaft 30 to the extent that the selection spring 190 is stretched so that a degree to which the guide pipe 130 protrudes from the hinge shaft 30 may increase.

The electronic shift operation apparatus according to an exemplary embodiment of the present disclosure may further include a pattern guide pin 200 fixedly coupled to the ball cover 20, protruding downward, and penetrating the ball cover bracket 60, and a pattern bracket 220 fixedly coupled to a bottom surface of the ball cover bracket 60 and include a pattern guide rail 210 configured to guide the movements of the pattern guide pin 200 in the selection direction and the shift direction.

The pattern guide pin 200 may be coupled to a center portion of a lower portion of the ball cover 20 and rotate integrally with the ball cover 20 when the ball cover 20 rotates in the selection direction and the shift direction.

A lower end portion of the pattern guide pin 200 may be inserted into the pattern guide rail 210 so that the pattern guide pin 200 may move along the pattern guide rail 210 when the ball cover 20 rotates in the selection direction and the shift direction.

With reference to FIG. 27A and FIG. 27B and FIG. 28A and FIG. 28B, the pattern guide rail 210 may include a selection rail 211 configured to guide the movement of the pattern guide pin 200 in the selection direction, and a shift rail 212 configured to guide the movement of the pattern guide pin 200 in the shift direction.

FIG. 27A and FIG. 27B and FIG. 28A and FIG. 28B illustrate states in which the pattern guide pin 200 is moved in the selection direction and the shift direction along the pattern guide rail 210 in the automatic shift mode and the manual shift mode.

Figures 11A, 11B:
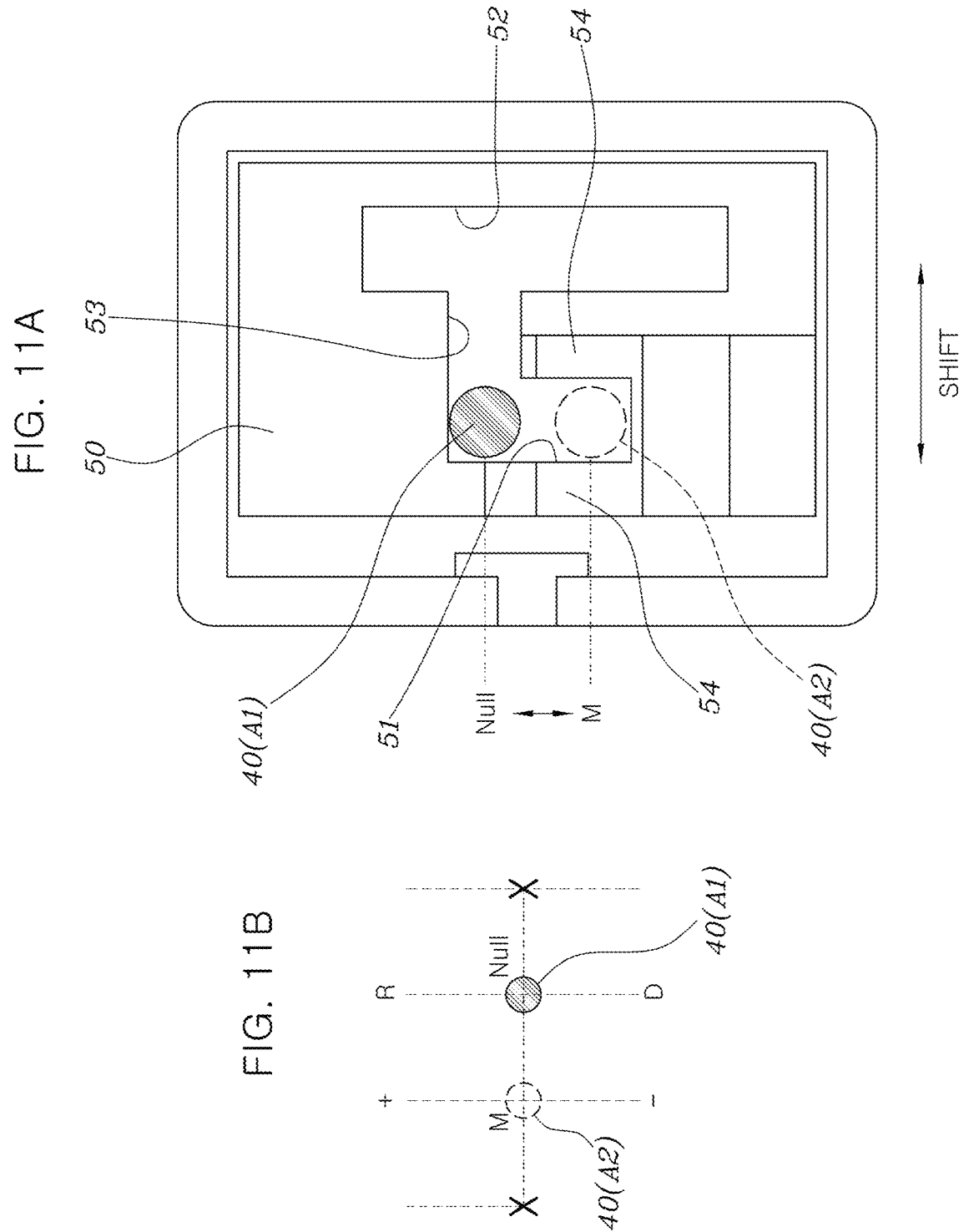

With reference to FIG. 11A and FIG. 11B, in the automatic shift mode, the mode switching rod 40 is positioned in the first selection groove 51, the mode switching rod 40 moves between the M position A2 and the initial position A1, which is the Null position, during the selection manipulation, and the mode switching rod 40 cannot perform the selection movement to the 5/6 stage selection position B2 and the R stage selection position B4 based on the manual shift mode.

Therefore, in the automatic shift mode, the movement of the pattern guide pin 200 in the selection direction is restricted to the initial position A1 and the M position A2.

Figures 16A, 16B:
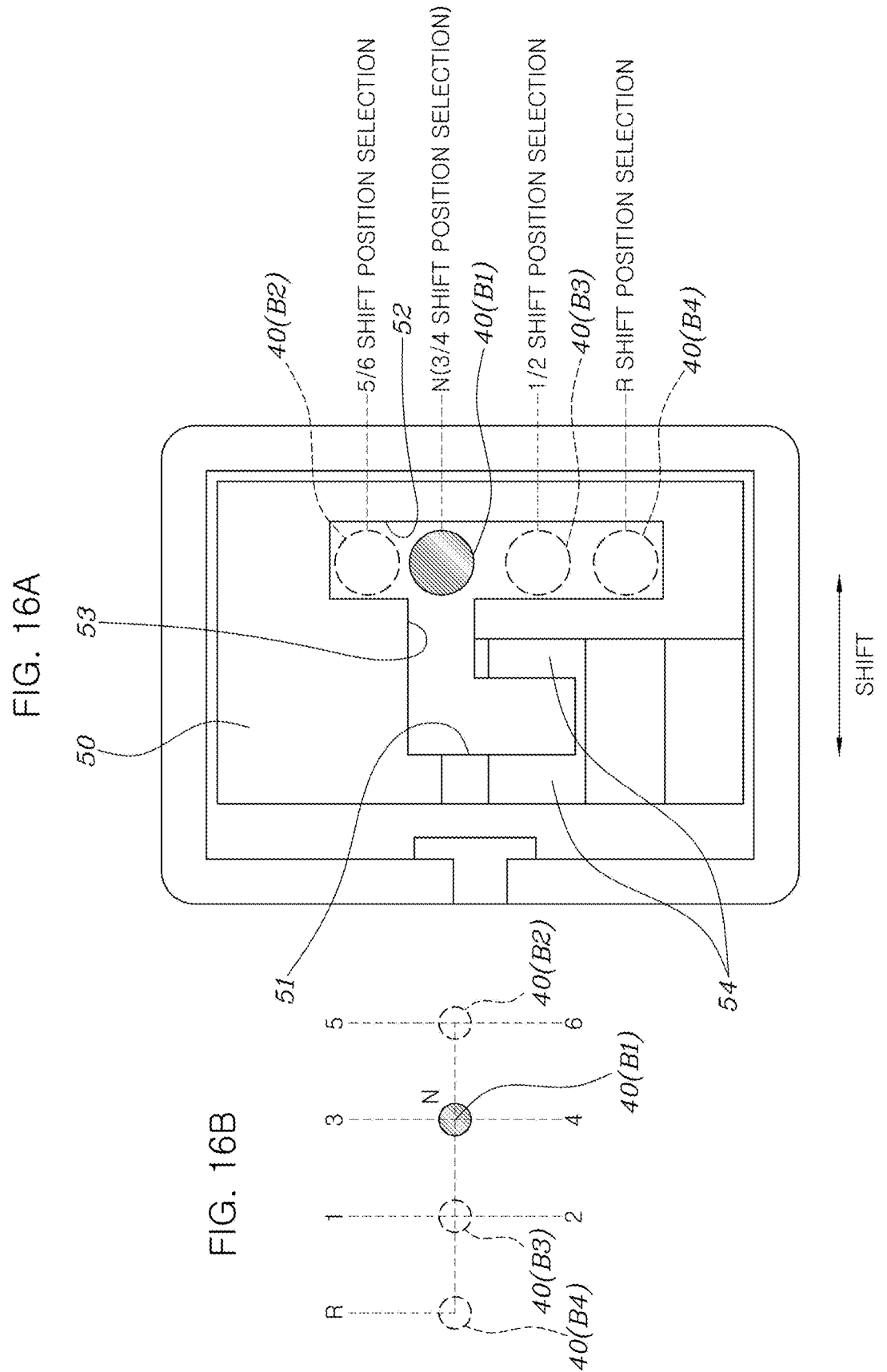
Figures 18A, 18B:
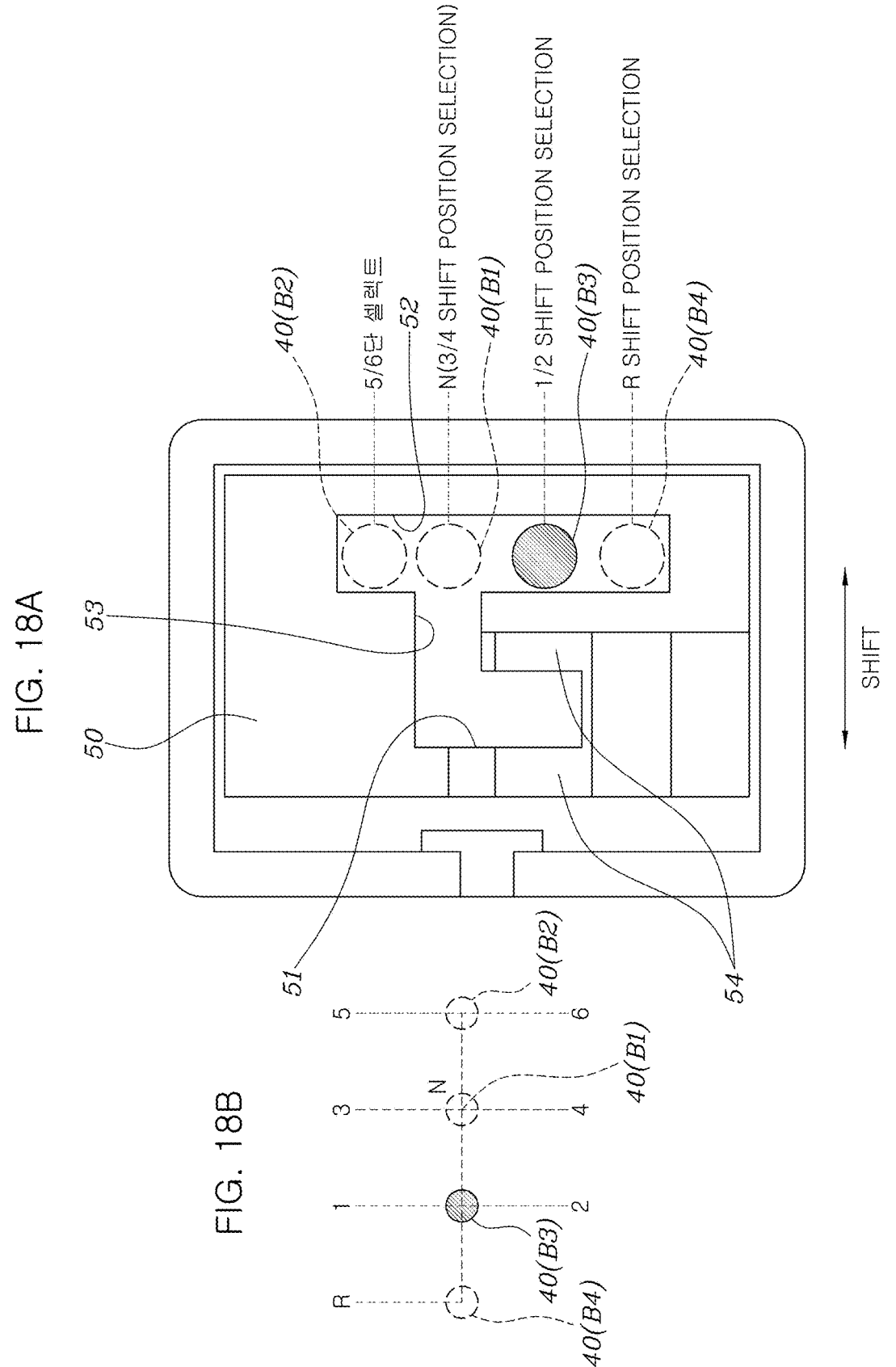
Figure 19:
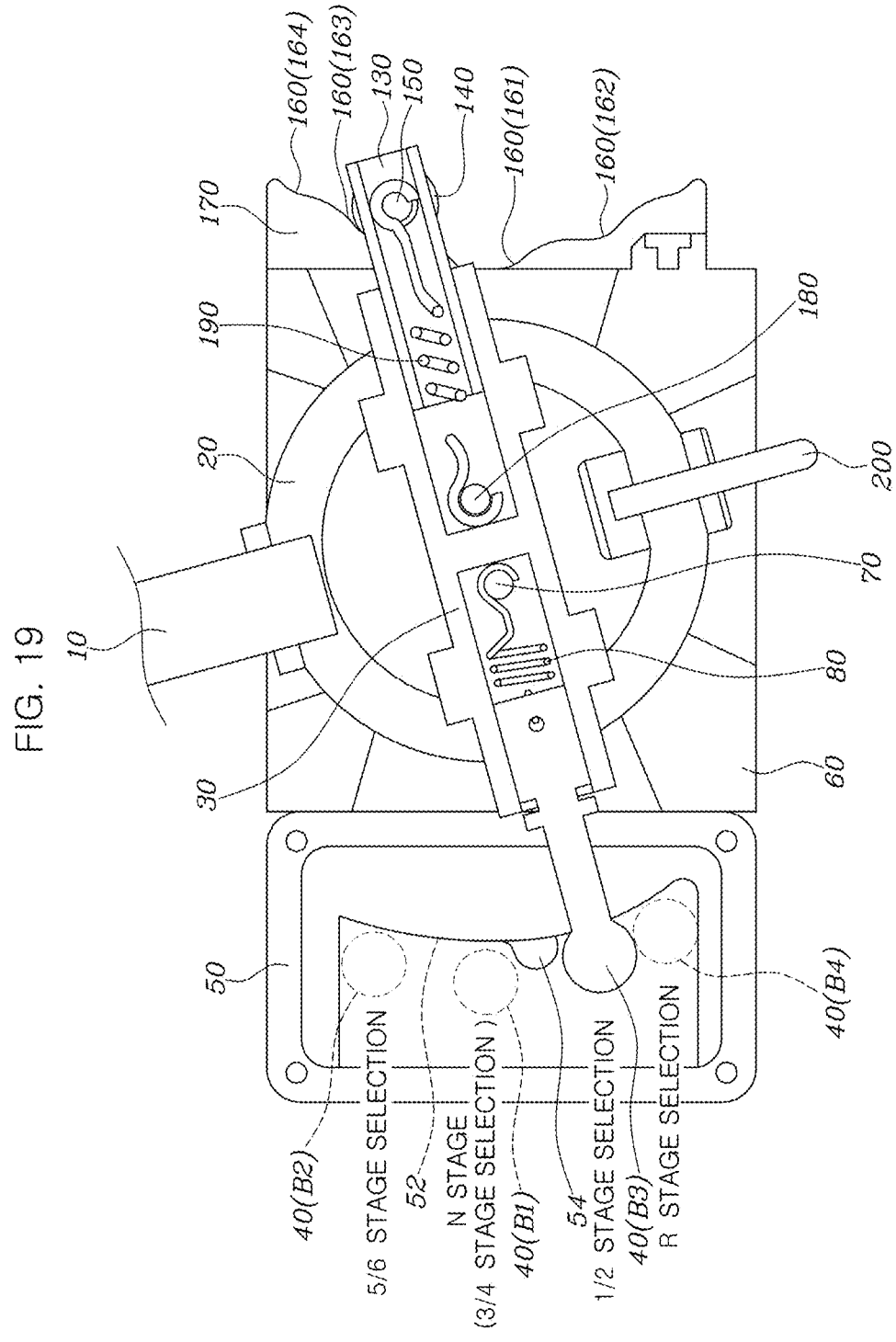
Figure 20:
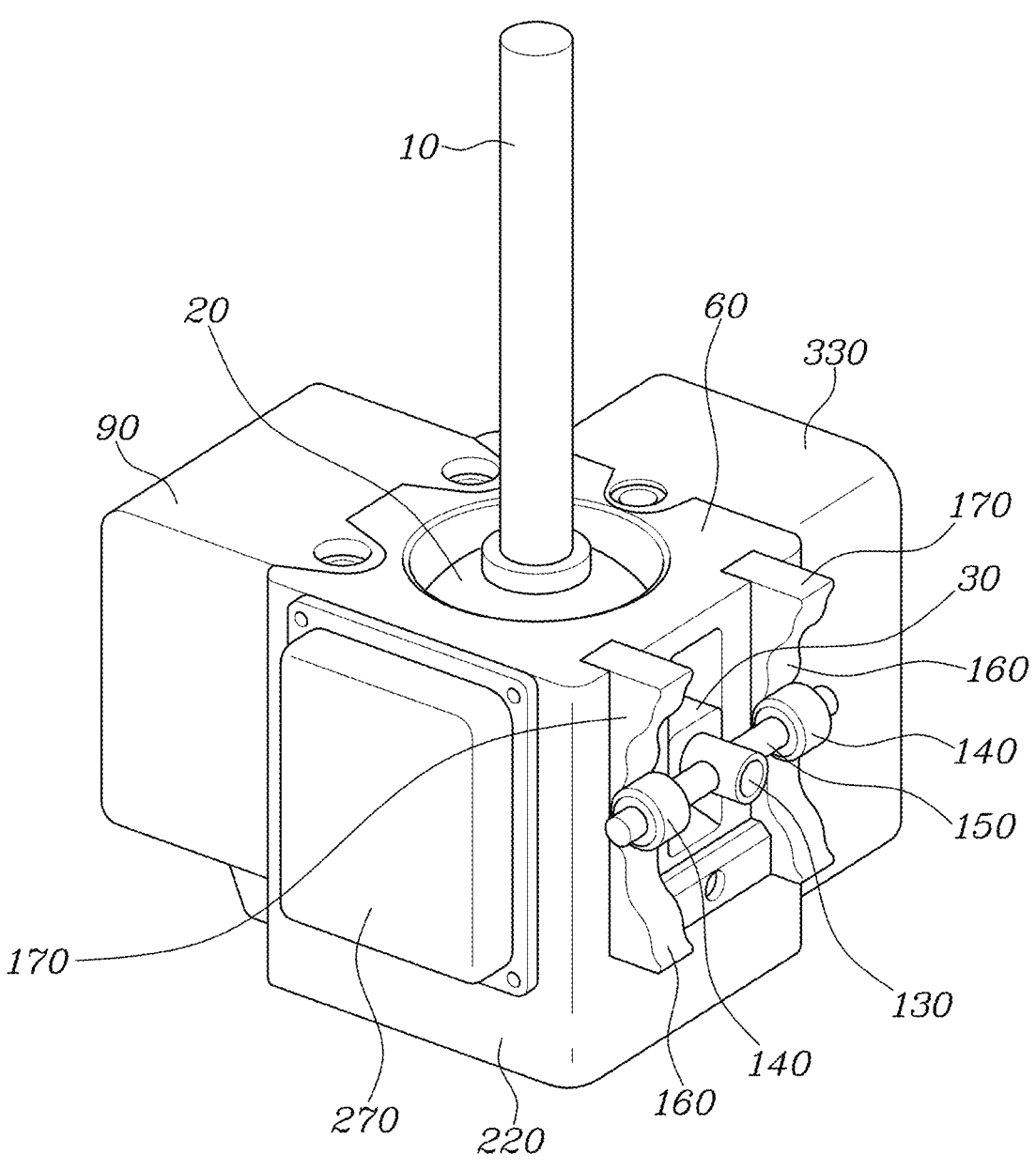
FIG. 20, FIG. 21, FIG. 22, FIG. 23, FIG. 24 and FIG. 25 are views for explaining a selection roller and a selection detent groove.
Figure 21:
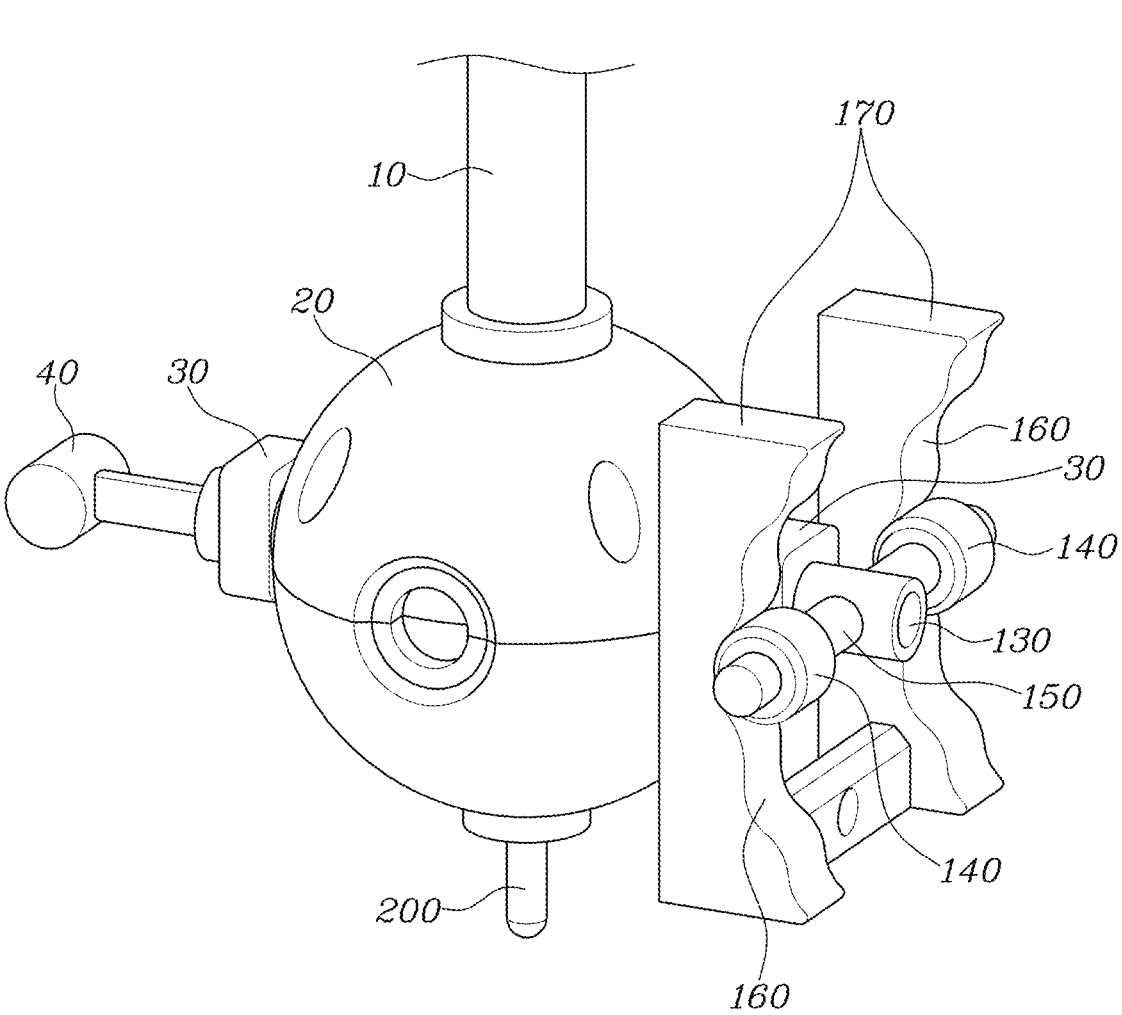
Figure 22:
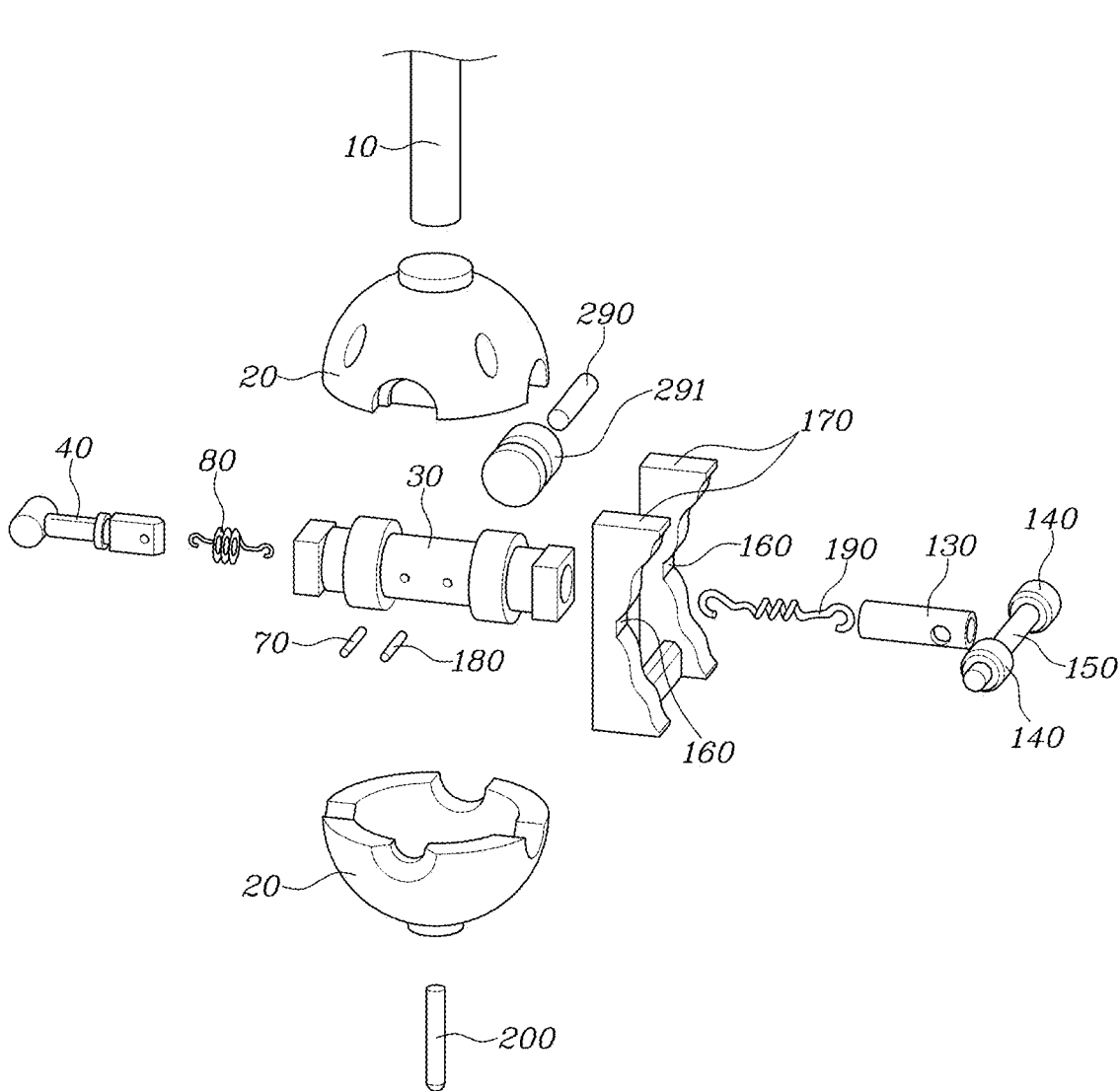
Figure 23:
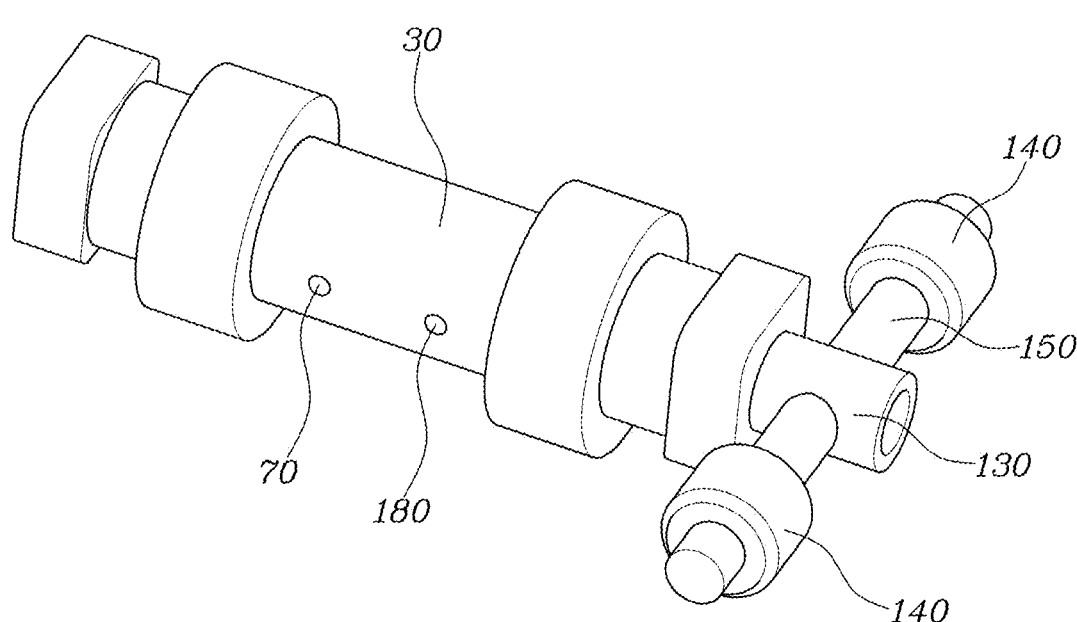
Figure 24:
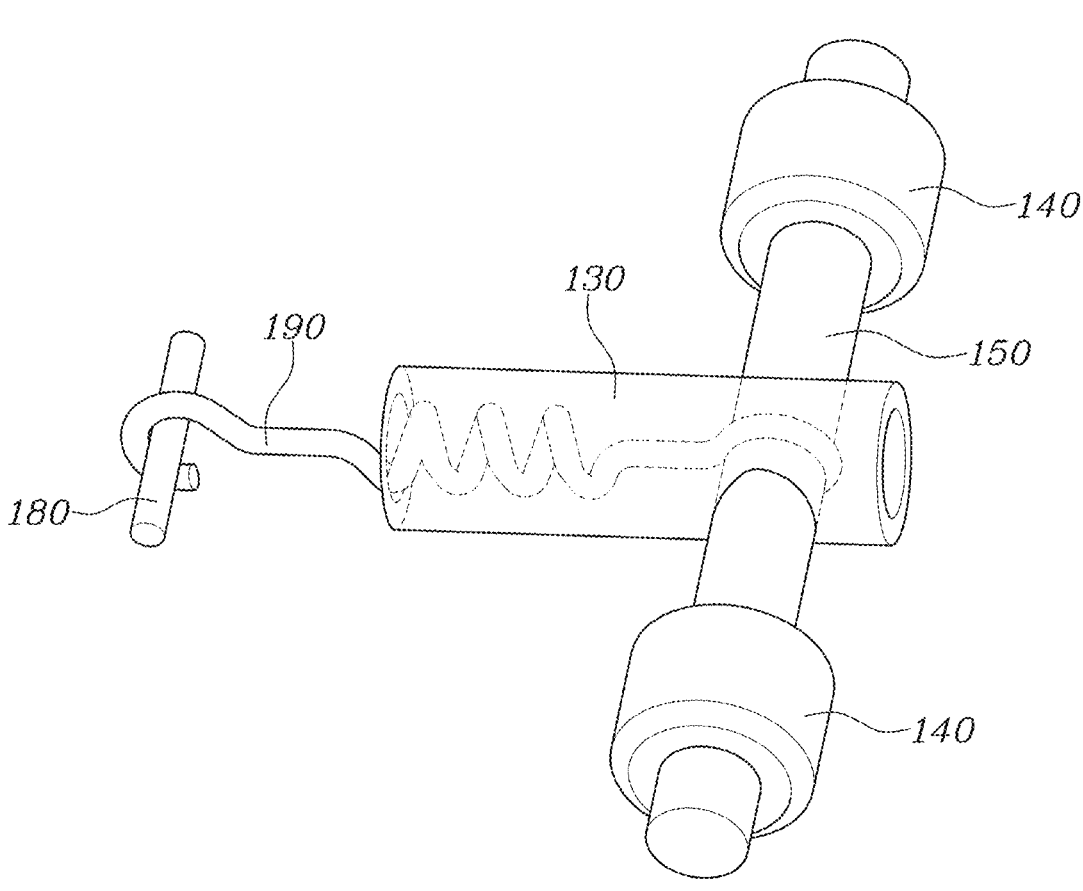

In contrast, with reference to FIG. 16A and FIG. 16B, in the manual shift mode, the mode switching rod 40 is positioned in the second selection groove 52, and during the selection manipulation, the mode switching rod 40 may move along all the selection routes from the initial position B1, which is the neutral stage (N stage), to the 5/6 stage selection position B2 in one direction and the 1/2 stage selection position B3 and the R stage selection position B4 in the other direction.

Therefore, in the manual shift mode, the pattern guide pin 200 may move in the selection direction along all the selection routes without being restricted.

The initial position A1 may correspond to the Null position in the automatic shift mode, the initial position B1 may correspond to the N stage, the neutral stage, or the 3/4 stage selection position in the manual shift mode, and the initial position A1 in the automatic shift mode and the initial position B1 in the manual shift mode may be the same position.

Furthermore, the M position A2 in the automatic shift mode may be the 1/2 stage selection position B3 in the manual shift mode.

According to an exemplary embodiment of the present disclosure, the shift direction strokes may be differently restricted in the automatic shift mode and the manual shift mode. This may be performed by the shift direction stroke restriction device to be described below.

The shift direction stroke is relatively shorter in the automatic shift mode than in the manual shift mode, which may improve the operation convenience.

On the other hand, the shift direction stroke is relatively longer in the manual shift mode than in the automatic shift mode, which may improve the recognition performance during the shift operation.

As described above, the shift direction stroke in the automatic shift mode and the shift direction stroke in the manual shift mode may be identical to the shift direction stroke during shift operations of an automatic transmission vehicle and a manual transmission vehicle in the related art, which may eliminate heterogeneity with the vehicle in the related art.

The electronic shift operation apparatus according to an exemplary embodiment of the present disclosure may further include a permanent magnet 230 fixedly coupled to the ball cover 20, and a printed circuit board (PCB) 240 fixed to the ball cover bracket 60 to face the permanent magnet 230 and configured to output a selected shift position by recognizing a magnetic flux signal in accordance with a change in position of the permanent magnet 230 when the ball cover 20 rotates in the selection direction and the shift direction.

The mode switching guide bracket 90 is coupled to one side surface of the ball cover bracket 60, the PCB 240 is fixedly coupled to a side surface of the ball cover bracket 60 spaced apart from the mode switching guide bracket 90 at a right angle, and the permanent magnet 230 is coupled to the ball cover 20 to face the PCB 240.

The PCB 240 includes a Hall sensor configured to detect the permanent magnet 230 so that the PCB 240 may recognize and output a selection position and a selected shift position signal when the position of the permanent magnet 230 is changed in accordance with the rotations of the ball cover 20 in the selection direction and the shift direction.

The electronic shift operation apparatus according to an exemplary embodiment of the present disclosure may further include a shifter controller 260 fixed to the ball cover bracket 60, configured to transmit a shift position signal, which is outputted from the PCB 240, to a vehicle controller 250, and configured to control an operation of the mode switching solenoid 110 by receiving a signal of the mode selection portion 120 which may select the automatic shift mode and the manual shift mode.

The shifter controller 260 may be positioned at one side of the PCB 240, the PCB 240 and the shifter controller 260 are electrically connected to receive signals, and the shifter controller 260 including the PCB 240 may be covered and protected by a controller cover 270.

The controller cover 270 may be fixedly coupled to the side surface of the ball cover bracket 60.

Figure 42:
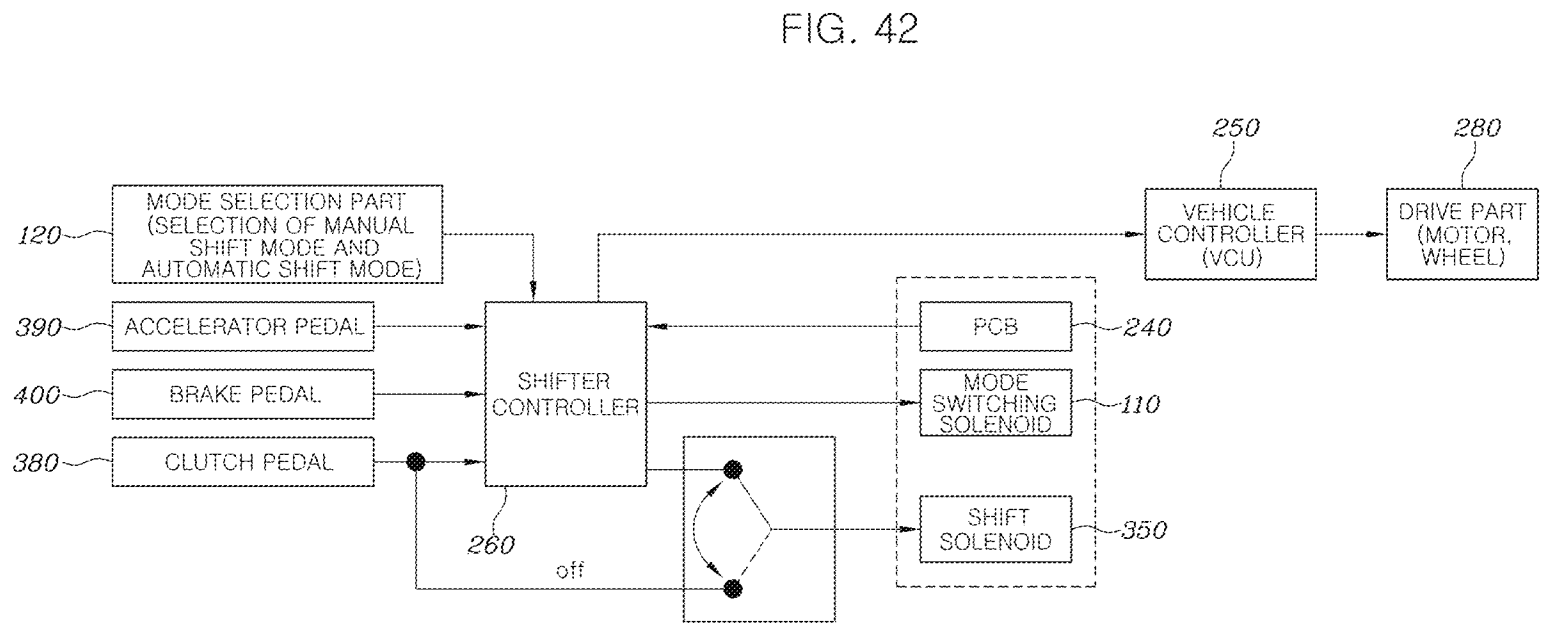

With reference to FIG. 42, the automatic shift mode signal or the manual shift mode signal, which is generated by the manipulation of the mode selection portion 120, is transmitted to the shifter controller 260, and the shifter controller 260 may be configured for controlling the operation of the mode switching solenoid 110 by use of the automatic shift mode signal or the manual shift mode signal.

Furthermore, the shift position signal, which is selected by a selection rotation and a shift rotation of the ball cover 20, may be outputted through the PCB 240 and then transmitted to the vehicle controller 250 through the shifter controller 260, and an operation of a vehicle drive portion 280 may be controlled by the vehicle controller 250.

The electronic shift operation apparatus according to an exemplary embodiment of the present disclosure may include the mode selection portion 120 configured to select the automatic shift mode or the manual shift mode, the mode switching rod 40 configured to be connected to the shift rod 10, and the mode switching guide 50 including the first selection groove 51 and the second selection groove 52 configured to guide the movement of the mode switching rod 40 in the selection direction, and the connection groove 53 configured to connect the first selection groove 51 and the second selection groove 52. When the automatic shift mode signal is generated or the manual shift mode signal is generated by the manipulation of the mode selection portion 120, the mode switching guide 50 is moved in the shift direction by operation of the mode switching solenoid 110. When the mode switching guide 50 moves in the shift direction, the mode switching guide 50 moves in the state in which the mode switching rod 40 is inserted into the connection groove 53 so that the mode switching rod 40 may be positioned in the first selection groove 51 or positioned in the second selection groove 52.

In the automatic shift mode, the mode switching rod 40 may be positioned in the first selection groove 51 and moved to the initial position A1 or the M position A2 along the first selection groove 51 by the manipulation of the shift rod 10 in the selection direction.

In the automatic shift mode, the initial position A1 may be the Null position.

Furthermore, in the manual shift mode, the mode switching rod 40 may be positioned in the second selection groove 52 and moved to any one of the initial position B1, the 5/6 stage selection position B2, the 1/2 stage selection position B3, and the R stage selection position B4 along the second selection groove 52 by the manipulation of the shift rod 10 in the selection direction.

In the manual shift mode, the initial position B1 may be the N stage, the neutral stage, and the 3/4 stage selection position.

Next, the stroke restriction device configured for differently restricting the shift direction strokes of the shift rod in accordance with the automatic shift mode and the manual shift mode will be described.

The electronic shift operation apparatus according to an exemplary embodiment of the present disclosure may include the mode selection portion 120 configured to select the automatic shift mode or the manual shift mode, and the shift rod 10 manipulated by the driver in the selection direction and the shift direction. The shift direction strokes of the shift rod 10 may be differently restricted in the automatic shift mode and the manual shift mode.

That is, the shift direction stroke may be restricted to a relatively shorter length in the automatic shift mode than in the manual shift mode, which may improve the operation convenience.

On the other hand, the shift direction stroke is restricted to be relatively longer in the manual shift mode than in the automatic shift mode, which may improve the recognition performance during the shift operation.

As described above, the shift direction stroke in the automatic shift mode and the shift direction stroke in the manual shift mode may be identical to the shift direction stroke during shift operations of an automatic transmission vehicle and a manual transmission vehicle generally, which may eliminate heterogeneity with the vehicle in the related art.

To implement the present configuration, the electronic shift operation apparatus according to an exemplary embodiment of the present disclosure may include the ball cover 20 coupled to the shift rod 10 and configured to rotate in the selection direction and the shift direction when the driver manipulates the shift rod 10, a shift detent pin 290 coupled to the ball cover 20 and configured to rotate together with the ball cover 20 when the shift rod 10 is manipulated in the shift direction, and a shift detent 320 including a shift detent groove 310 configured to be in contact with the shift detent pin 290. When the shift rod 10 is manipulated in the shift direction, the shift detent pin 290 may move along the shift detent groove 310.

The shift detent pin 290 may be fixedly coupled to a position on the ball cover 20 directed in the shift direction.

In more detail, the permanent magnet 230 may be fixedly coupled to one side of the ball cover 20 directed in the shift direction, and the shift detent pin 290 may be fixedly coupled to the other side directed in the shift direction.

The permanent magnet 230 and the shift detent pin 290 may be coupled to the ball cover 20 to be directed in opposite directions.

The shift detent pin 290 may include a boss portion 291, and the boss portion 291 of the shift detent pin 290 may be fixedly coupled to the ball cover 20.

The shift detent 320 may be positioned at one side of the shift detent pin 290 based on the shift direction. The shift detent groove 310 may be formed in one surface of the shift detent 320, and an end portion of the shift detent pin 290 may include a structure which is always in contact with the shift detent groove 310.

When the ball cover 20 rotates in the shift direction as the driver manipulates the shift rod 10, the shift detent pin 290 may move along the shift detent groove 310 in the state in which the shift detent pin 290 is in contact with the shift detent groove 310.

The stroke at which the shift detent pin 290 moves along the shift detent groove 310 may be relatively shorter in the automatic shift mode than in the manual shift mode and relatively longer in the manual shift mode than in the automatic shift mode.

According to an exemplary embodiment of the present disclosure, a second side groove 62 may be formed in one surface of the ball cover bracket 60 based on the shift direction, and the boss portion 291 of the shift detent pin 290 may be inserted and provided into the second side groove 62. When the shift rod 10 is manipulated in the shift direction, the boss portion 291 of the shift detent pin 290 comes into contact with one end portion or the other end portion of the second side groove 62, and a full stroke in the shift direction may be restricted.

When the ball cover 20 is rotated in the shift direction by the manipulation of the shift rod 10, the ball cover 20, the shift detent pin 290, and the boss portion 291 may rotate together in the shift direction, and the second side groove 62 may extend upward and downward from the side surface of the ball cover bracket 60, in the illustrated state, to guide the rotation of the boss portion 291 in the shift direction.

The rotation in the shift direction may be restrained when the boss portion 291 of the shift detent pin 290 comes into contact with an upper or lower end portion of the second side groove 62 as the ball cover 20 rotates in the shift direction.

The electronic shift operation apparatus according to an exemplary embodiment of the present disclosure may further include a shift detent bracket 330 fixedly coupled to one side of the ball cover bracket 60 based on the shift direction, the shift detent 320 being inserted into the shift detent bracket 330 and provided to be movable in the shift direction, a shift spring 340 including two opposite end portions connected to the shift detent bracket 330 and the shift detent 320 and configured to provide an elastic force to the movement of the shift detent 320, a shift solenoid 350 fixedly coupled to the shift detent bracket 330 and configured to operate by receiving the automatic shift mode signal or the manual shift mode signal, and a stroke limiter 360 coupled to the shift solenoid 350 and configured to move away from the shift detent 320 or toward the shift detent 320 when the shift solenoid 350 operates, the stroke limiter 360 being configured to differently restrict the shift direction movement strokes of the shift detent 320 based on a moved position.

The shift detent bracket 330 may be fixedly coupled to one side surface of the ball cover bracket 60 in which the second side groove 62 is formed. The shift detent 320 may be inserted into the shift detent bracket 330 and provided and structured to be movable in the shift direction.

When the ball cover 20 rotates in the shift direction as the driver manipulates the shift rod 10, the shift detent pin 290 may move along the shift detent groove 310 in the state in which the shift detent pin 290 is in contact with the shift detent groove 310. The shift detent 320 may move in the shift direction in the state in which the shift detent 320 is inserted into the shift detent bracket 330 by a phase difference of the shift detent groove 310 when the shift detent pin 290 moves.

The shift spring 340 may be configured as a coil spring. The two opposite end portions of the shift spring 340 may be provided to be supported by the shift detent 320 and the shift detent bracket 330, and the shift spring 340 may provide a spring force that moves the shift detent 320 toward the ball cover 20.

The shift solenoid 350 may be fixedly coupled to the shift detent bracket 330, and the stroke limiter 360 may be coupled to the shift solenoid 350 so that the stroke limiter 360 may move upward or downward when the shift solenoid 350 operates.

A solenoid cover 370 may be coupled to the shift detent bracket 330, and the shift solenoid 350 and the stroke limiter 360 may be covered and protected by the solenoid cover 370.

When the driver manipulates the mode selection portion 120, the automatic shift mode signal or the manual shift mode signal may be generated. The automatic shift mode signal or the manual shift mode signal may be transmitted to the shifter controller 260. The shifter controller 260 may be configured for controlling the operation of the shift solenoid 350 by use of the automatic shift mode signal or the manual shift mode signal and an operating signal of a clutch pedal 380. The stroke limiter 360 may be moved upward or downward by operation of the shift solenoid 350.

When the automatic shift mode signal is generated, the stroke limiter 360 may be fixed in the state in which the stroke limiter 360 is moved to the upper side at which the shift detent 320 is present. When the manual shift mode signal and the signal of the clutch pedal 380 are generated together, the stroke limiter 360 may be fixed in the state in which the stroke limiter 360 is moved to the lower side distant from the shift detent 320. When the manual shift mode signal is generated and the operating signal of the clutch pedal 380 is not generated, the stroke limiter 360 may be fixed in the state in which the stroke limiter 360 is moved to the upper side thereof.

The shifter controller 260 may be configured for controlling the operation of the mode switching solenoid 110 by use of the automatic shift mode signal or the manual shift mode signal generated by the manipulation of the mode selection portion 120.

Furthermore, the shifter controller 260 may be configured for controlling the operation of the shift solenoid 350 by use of the automatic shift mode signal or the manual shift mode signal generated by the manipulation of the mode selection portion 120.

When the automatic shift mode signal is generated by the manipulation of the mode selection portion 120 in a vehicle (e.g., a 2-pedal vehicle) provided with no clutch pedal, the shifter controller 260 may be configured for controlling the stroke limiter 360 so that the stroke limiter 360 is fixed in the state in which the stroke limiter 360 is moved to the upper side at which the shift detent 320 is present. When the manual shift mode signal is generated by the manipulation of the mode selection portion 120, the shifter controller 260 may be configured for controlling the stroke limiter 360 so that the stroke limiter 360 is fixed in the state in which the stroke limiter 360 is moved to the lower side distant from the shift detent 320.

A plurality of guide protrusions 321 and a plurality of guide grooves 331 for guiding the movement of the shift detent 320 in the shift direction may be formed in the shift detent 320 and the shift detent bracket 330 and coupled to one another.

The plurality of guide protrusions 321 may be formed on an external peripheral surface of the shift detent 320 and spaced apart from one another. The guide grooves 331, which are equal in number to the guide protrusions 321, may be formed in an internal peripheral surface of the shift detent bracket 330 and provided at portions matched with the guide protrusions 321.

The guide protrusion 321 and the guide groove 331 may extend in the shift direction in which the shift detent 320 moves.

Figure 34:
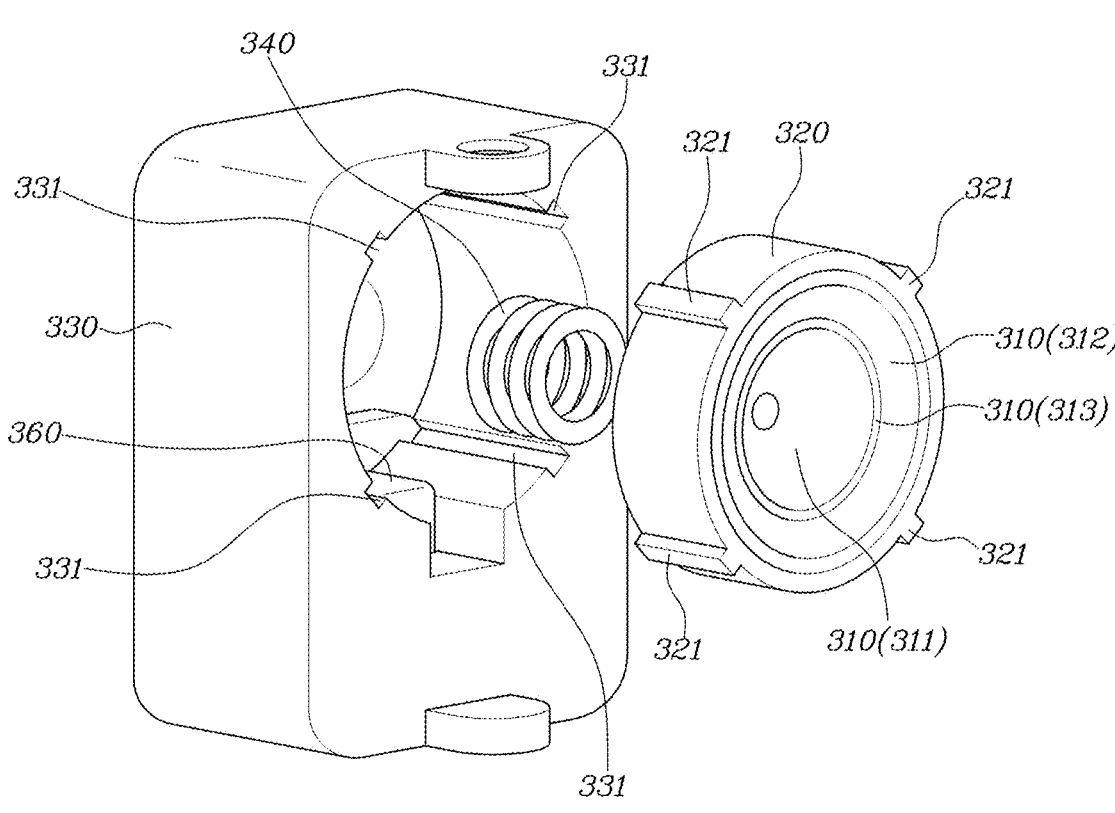

With reference to FIGS. 34 to 35, the shift detent groove 310 may include an internal groove 311 formed as a concave groove in a center portion of one surface of the shift detent 320, an external groove 312 formed as a concave groove outside the internal groove 311 and connected to the internal groove 311 in a circumferential direction, and a protrusion portion 313 formed between the internal groove 311 and the external groove 313 to connect the internal groove 311 and the external groove 312, the protrusion portion 313 including a cross-section protruding from the internal groove 311 and the external groove 312 and connected to the internal groove 311 and the external groove 312 in the circumferential direction.

With reference to FIG. 35A and FIG. 35B, FIG. 36A and FIG. 36B, and FIG. 37A and FIG. 37B, a detent groove 322 is formed in one side edge portion of a bottom surface of the shift detent 320, one side of the upper end portion of the stroke limiter 360 is inserted into the detent groove 322 in the automatic shift mode situation. In the automatic shift mode situation, when the shift detent 320 is moved in the shift direction by the manipulation of the shift rod 10 in the shift direction, the movement of the shift detent 320 in the shift direction may be restricted at a time point at which a sidewall of the detent groove 322 comes into contact with one side surface of the stroke limiter 360.

When the automatic shift mode signal is generated by the manipulation of the mode selection portion 120, the shifter controller 260 may be configured for controlling the operation of the shift solenoid 350 so that the stroke limiter 360 is in the state of being inserted into the detent groove 322.

Figures 35A, 35B:
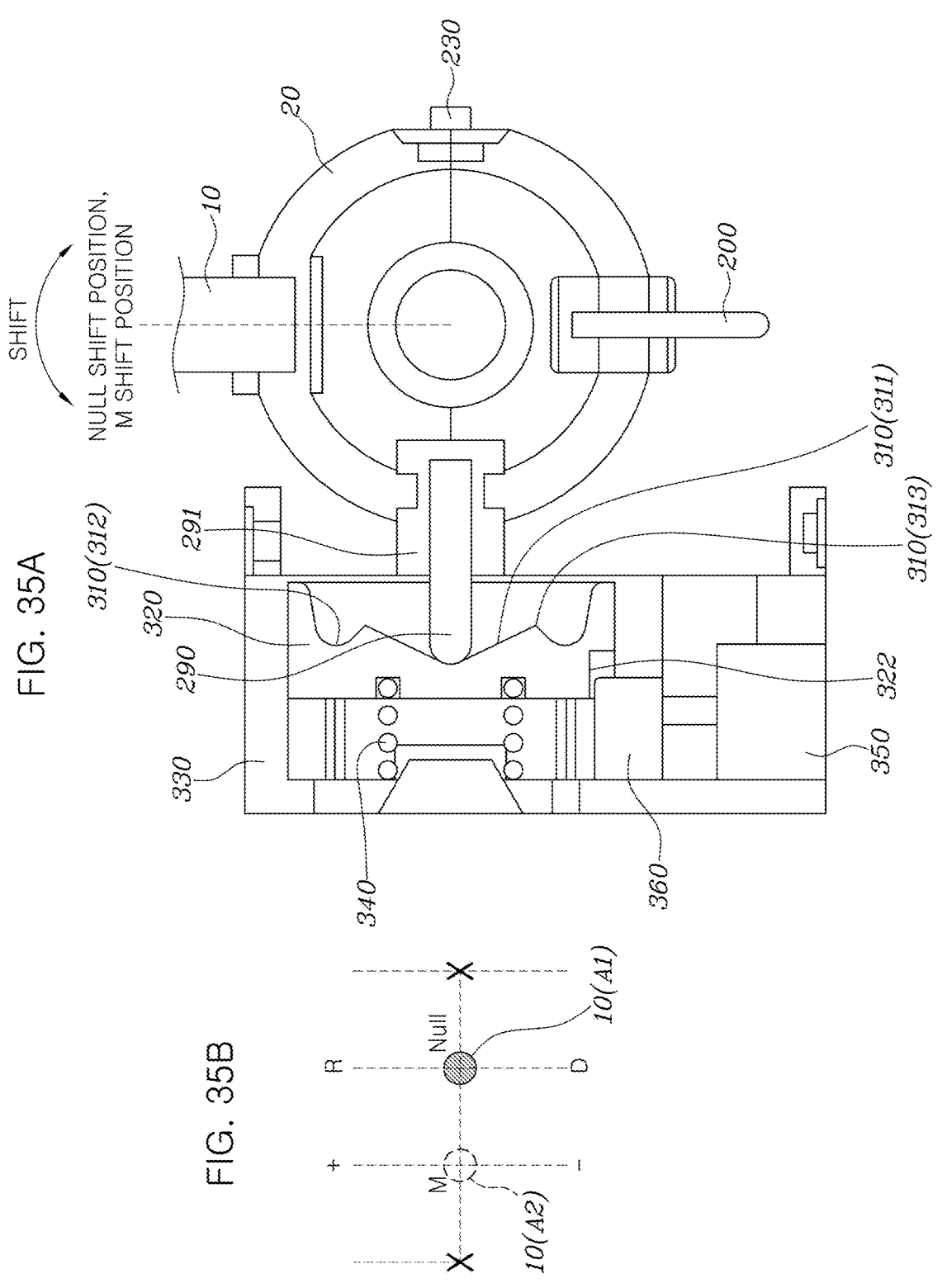
FIG. 35A and FIG. 35B, FIG. 36A and FIG. 36B and FIG. 37A and FIG. 37B are views for explaining shift direction strokes in an automatic shift mode situation.
Figures 36A, 36B:
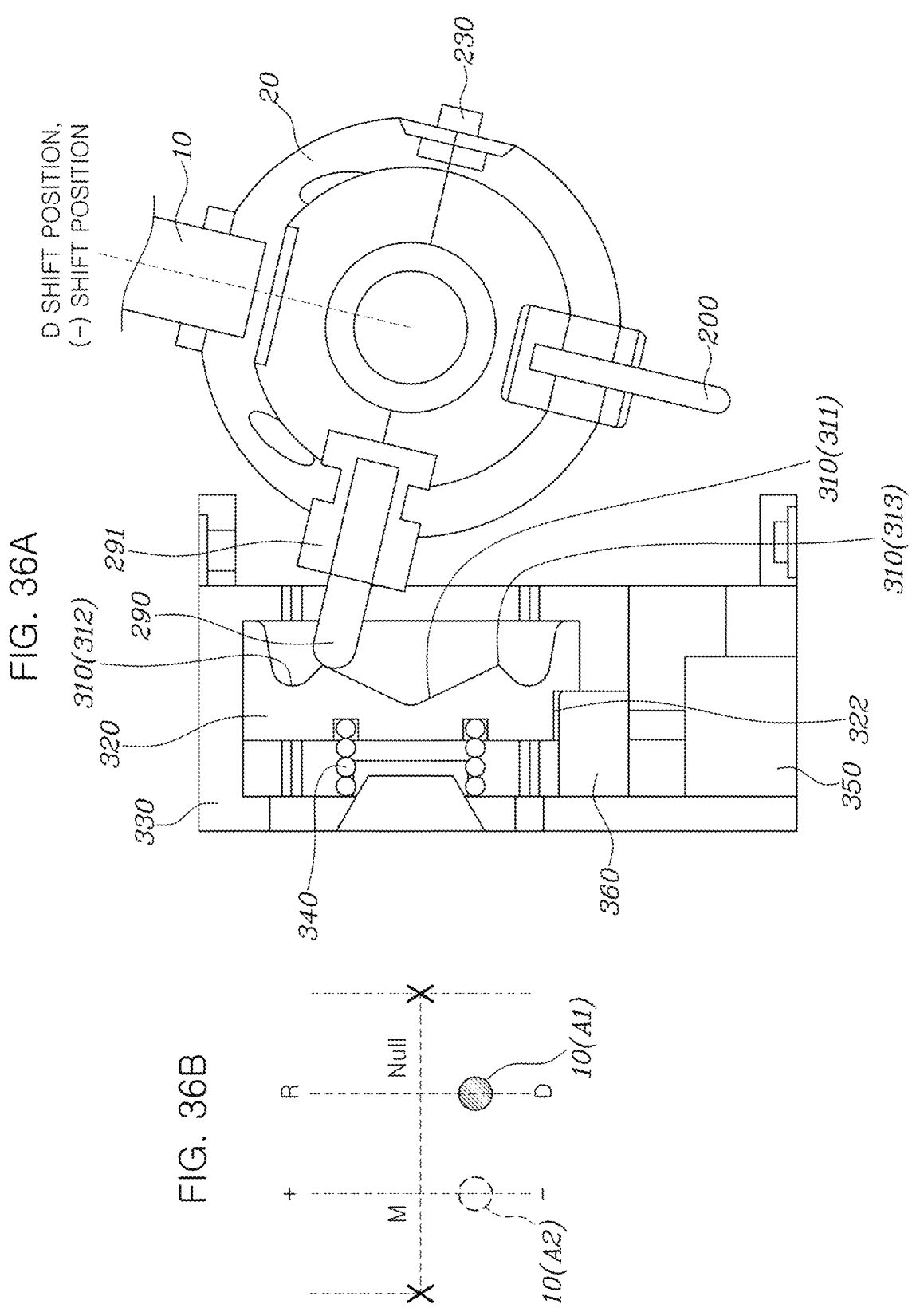
Figures 37A, 37B:
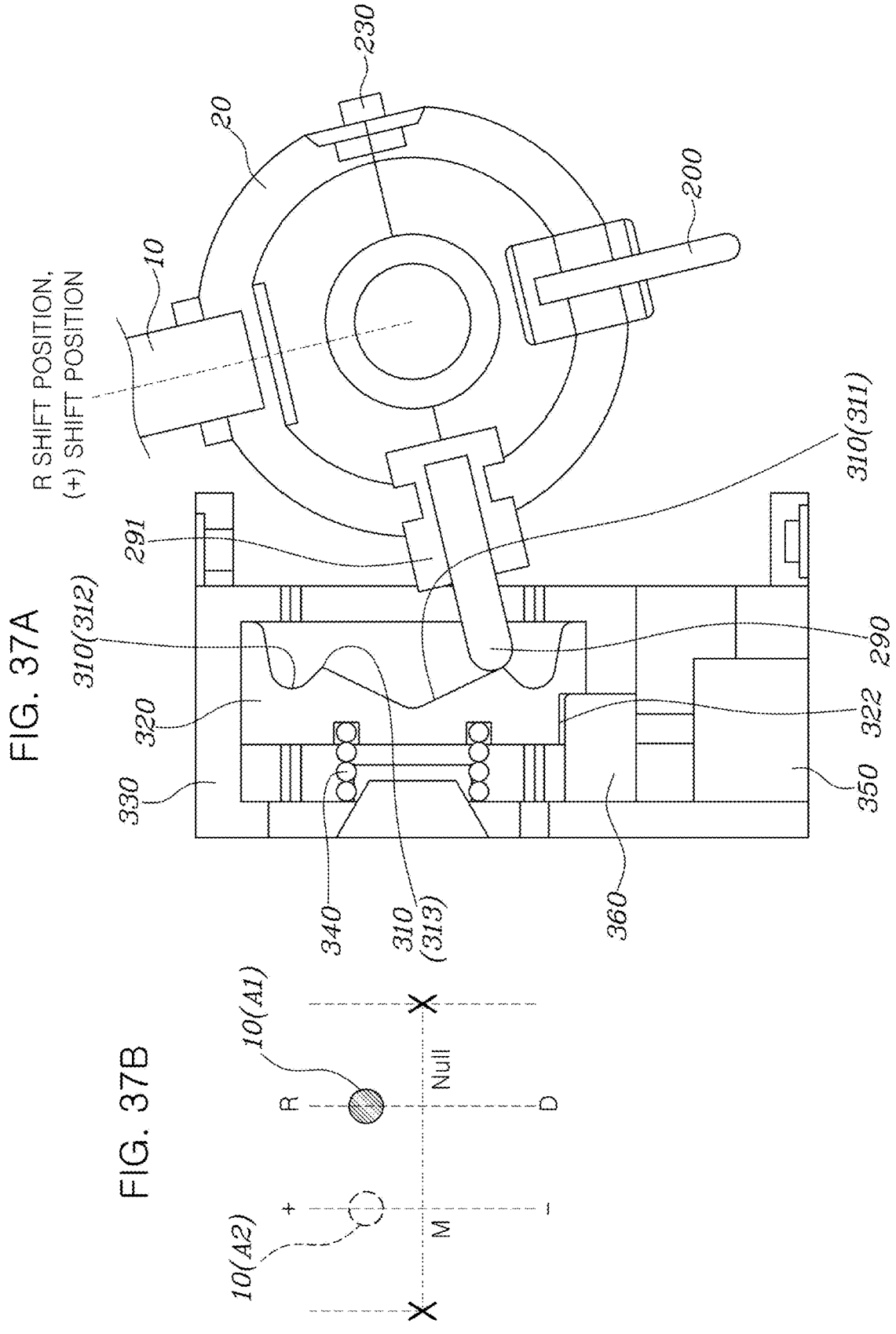

FIG. 35A and FIG. 35B illustrates a state in which the shift detent pin 290 is positioned in the internal groove 311 in the automatic shift mode situation, and FIGS. 36 to 37 illustrate states in which the shift rod 10 is rotated in the shift direction from the state in FIG. 35A and FIG. 35B.

As illustrated in FIG. 35A and FIG. 35B, when the shift detent pin 290 is positioned in the internal groove 311 in the automatic shift mode situation, the position of the shift rod 10 may be fixed at the initial position (Null position) A1 or the M (Manual) position A2.

FIG. 36A and FIG. 36B and FIG. 37A and FIG. 37B illustrate states in which the shift rod 10 is rotated clockwise and counterclockwise in the shift direction from the state in FIG. 35A and FIG. 35B.

When the ball cover 20 is rotated by the rotation of the shift rod 10 in the shift direction, the shift detent pin 290 moves from the internal groove 311 toward the external groove 312 in the state in which the shift detent pin 290 is in contact with the shift detent groove 310, and the shift detent 320 is moved leftward by the movement of the shift detent pin 290. In the instant case, the shift spring 340 is compressed.

At the moment when the sidewall of the detent groove 322 comes into contact with one side surface of the stroke limiter 360 when the shift detent 320 moves leftward, the movement of the shift detent 320 in the shift direction is restricted. In the instant case, the shift detent pin 290 is positioned on a protrusion portion 313 of the shift detent groove 310.

When the shift detent pin 290 is positioned on the protrusion portion 313, the shift rod 10 may move toward any one shift position among a D stage, a (−) stage (downshift), an R stage, and a (+) stage (upshift).

That is, when the shift rod 10 moves toward any one shift position among the D stage, the (−) stage, the R stage, and the (+) stage, the shift detent pin 290 may move toward the protrusion portion 313.

Furthermore, when the operating force is released in the state in which the shift rod 10 is moved to any one shift position among the D stage, the (−) stage, the R stage, and the (+) stage, the shift detent pin 290 may be returned to the internal groove 311 by the spring force, and the shift rod 10 may be returned to the initial position A1 or the M position A2.

With reference to FIG. 38A and FIG. 38B, FIG. 39A and FIG. 39B and FIG. 40A and FIG. 40B, in the manual shift mode situation, when the stroke limiter 360 is lowered by operation of the shift solenoid 350, the stroke limiter 360 may be withdrawn and spaced apart from the detent groove 322. In the manual shift mode situation, when the shift detent 320 is moved in the shift direction by the manipulation of the shift rod 10 in the shift direction, the shift detent 320 may move without coming into contact with the stroke limiter 360.

That is, when the stroke limiter 360 is lowered and departs from the movement path of the shift detent 320 based on the shift direction, the shift detent 320 does not come into contact with the stroke limiter 360 when the shift detent 320 moves in the shift direction. Therefore, the shift detent 320 may move a maximum distance in the shift direction.

When the manual shift mode signal is generated by the manipulation of the mode selection portion 120, the shifter controller 260 may be configured for controlling the operation of the shift solenoid 350 so that the stroke limiter 360 is withdrawn and spaced apart from the detent groove 322.

Figures 38A, 38B:
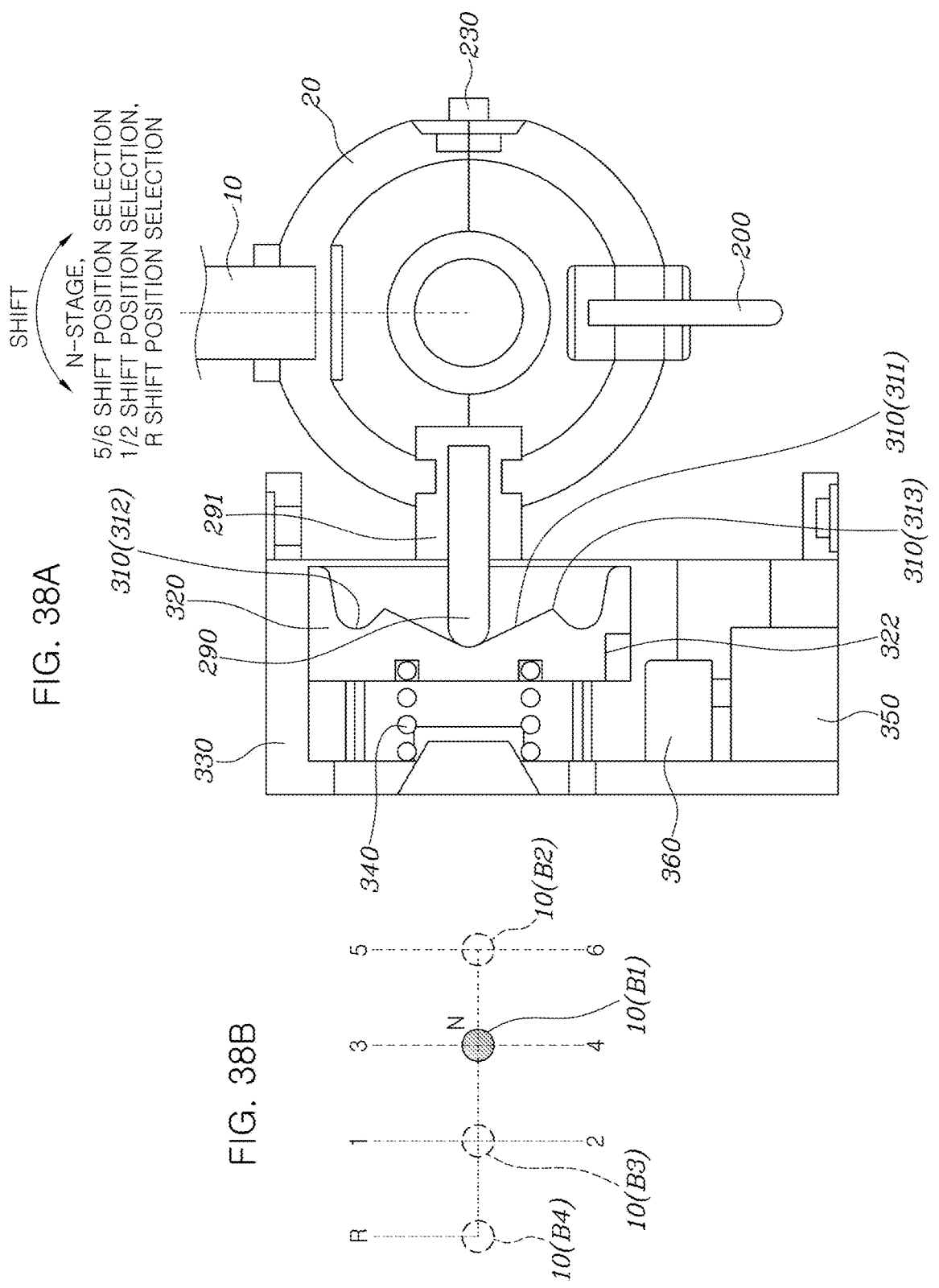
FIG. 38A and FIG. 38B, FIG. 39A and FIG. 39B and FIG. 40A and FIG. 40B are views for explaining shift direction strokes when a clutch pedal operates in a manual shift mode situation.
Figures 39A, 39B:
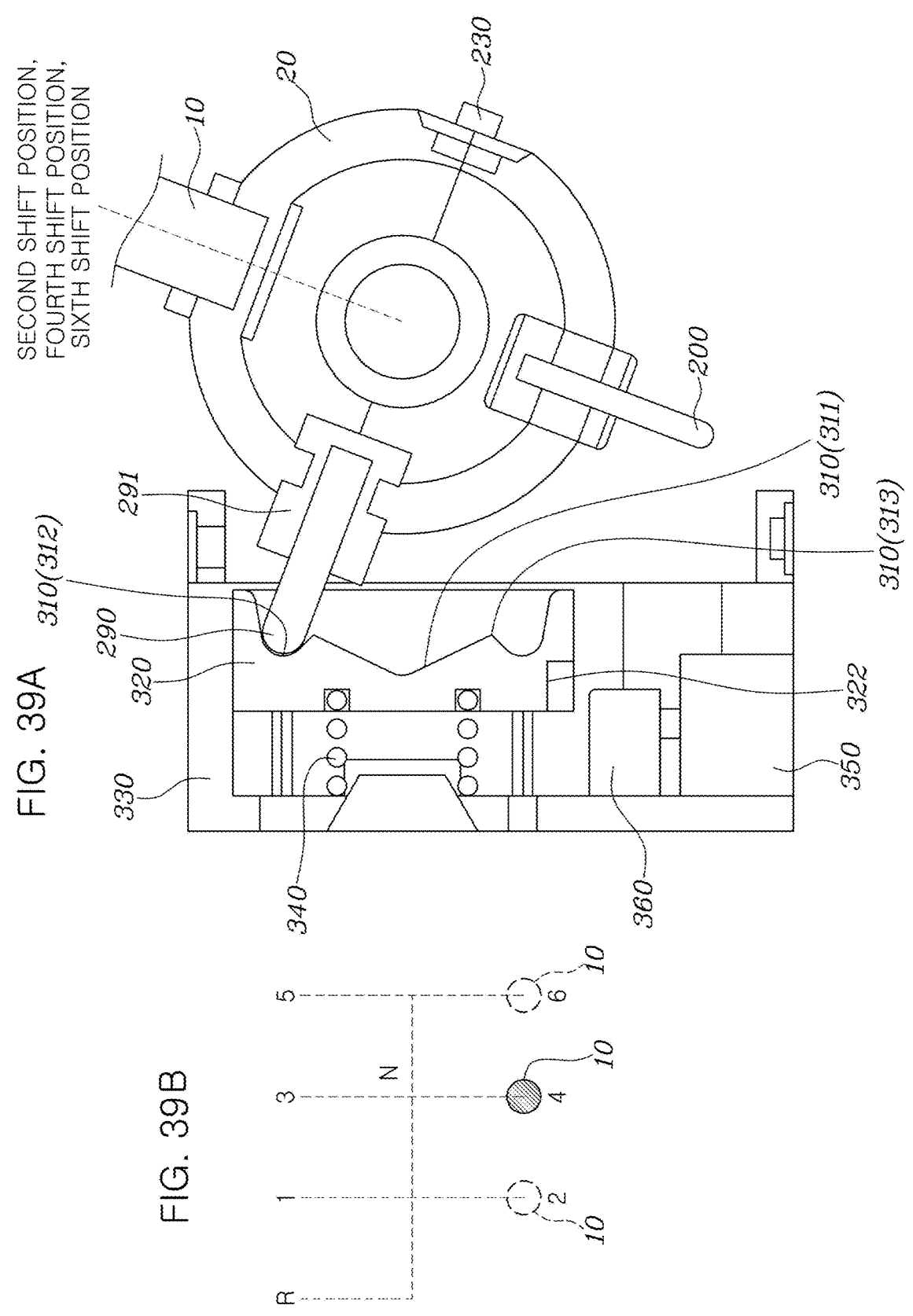
Figures 40A, 40B:
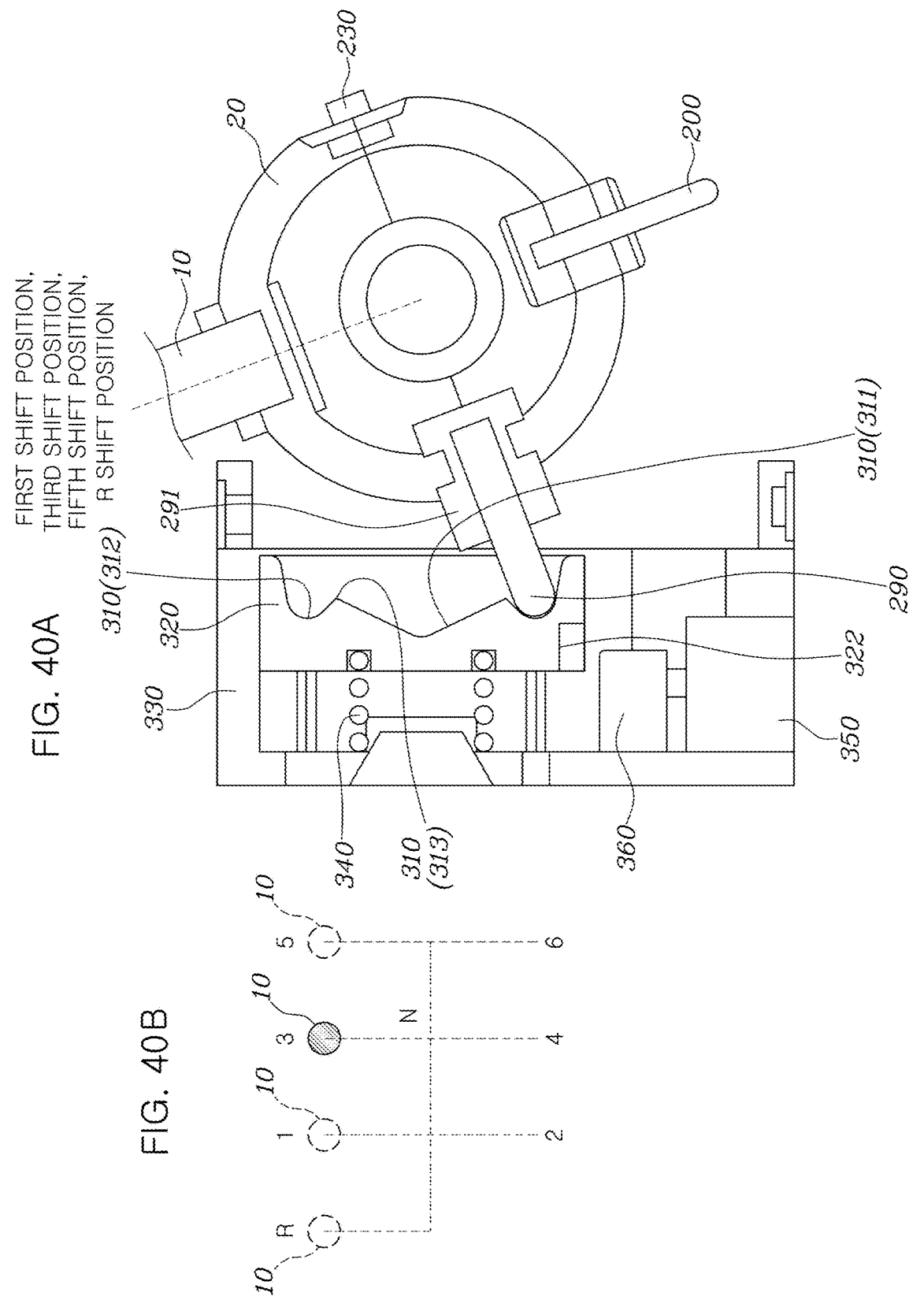

FIG. 38A and FIG. 38B illustrates a state in which the shift detent pin 290 is positioned in the internal groove 311 in the manual shift mode situation, and FIG. 39A, FIG. 38B, FIG. 40A and FIG. 40B illustrate states in which the shift rod 10 is rotated in the shift direction from the state in FIG. 38A and FIG. 38B.

As illustrated in FIG. 38A and FIG. 38B, when the shift detent pin 290 is positioned in the internal groove 311 in the manual shift mode situation, the shift rod 10 may be positioned at any one of the initial position (the N stage, the neutral stage, and the 3/4 stage selection position) B1, the 5/6 stage selection position B2, the 1/2 stage selection position B3, and the R stage selection position B4.

When the operating force of the shift rod 10 is released in the state in which the shift detent pin 290 is positioned at any one of the 5/6 stage selection position B2, the 1/2 stage selection position B3, and the R stage selection position B4, the shift rod 10 may be returned to the initial position B1 by the spring force.

FIG. 39A and FIG. 39B and FIG. 40A and FIG. 40B illustrate states in which the shift rod 10 is rotated clockwise and counterclockwise in the shift direction from the state in FIG. 38A and FIG. 38B.

When the ball cover 20 is rotated by the rotation of the shift rod 10 in the shift direction, the shift detent pin 290 moves from the internal groove 311 toward the external groove 312 in the state in which the shift detent pin 290 is in contact with the shift detent groove 310, and the shift detent 320 is moved leftward by the movement of the shift detent pin 290. In the instant case, the shift spring 340 is compressed.

With the leftward movement of the shift detent 320, the shift detent pin 290 passes over the protrusion portion 313, and the shift detent pin 290 is inserted into the external groove 312 and then fixed in position in the external groove 312.

When the shift detent pin 290 is positioned in the external groove 312, the shift rod 10 may be positioned to be fixed at any one shift position among a first stage, a second stage, a third stage, a fourth stage, a fifth stage, a sixth stage, and an R stage.

Figures 41A, 41B:
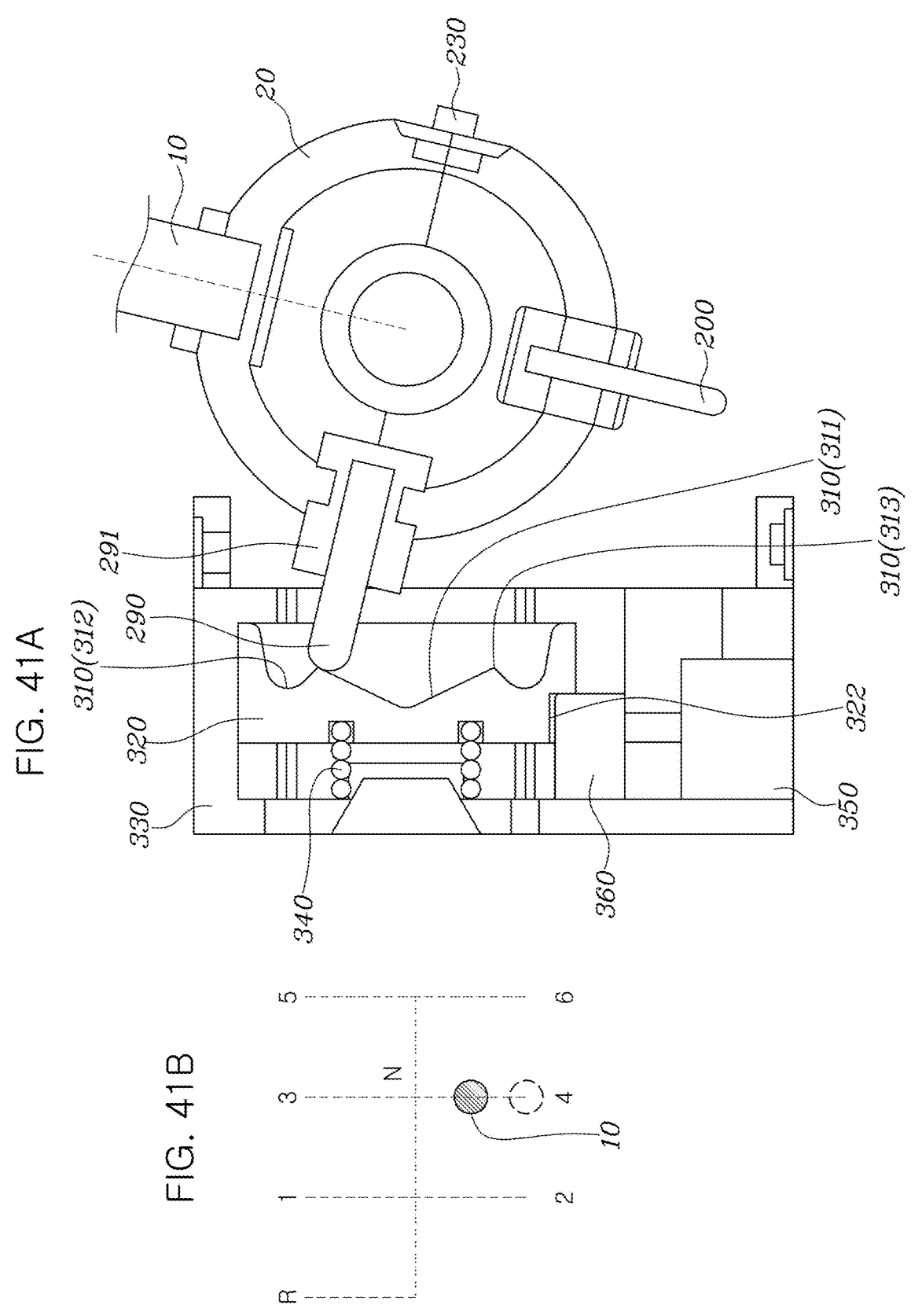
FIG. 41A and FIG. 41B is a view for explaining a shift direction stroke when the clutch pedal does not operate in the manual shift mode situation.

FIG. 41A and FIG. 41B illustrates a situation in which a signal of the manual shift mode is generated by the manipulation of the mode selection portion 120, but the operating signal of the clutch pedal 380 is not generated because the driver does not manipulate the clutch pedal 380.

In the instant case, the shifter controller 260 is configured to control the operation of the shift solenoid 350 so that the stroke limiter 360 is in the state of being inserted into the detent groove 322.

Therefore, when the shift detent 320 is moved in the shift direction by the manipulation of the shift rod 10 in the shift direction, the sidewall of the detent groove 322 comes into contact with one side surface of the stroke limiter 360 so that the movement of the shift detent 320 in the shift direction is restricted, and the operation for the manual shift is not performed any further.

That is, when the driver manipulates the shift rod 10 in the shift direction in the state in which the manual shift mode signal is generated and the operating signal of the clutch pedal 380 is not generated, the movement of the shift detent 320 in the shift direction is allowed until the sidewall of the detent groove 322 comes into contact with one side surface of the stroke limiter 360. When the sidewall of the detent groove 322 comes into contact with one side surface of the stroke limiter 360, the movement of the shift detent 320 in the shift direction is restricted by the stroke limiter 360.

As described above, in the state in which the movement of the shift detent 320 in the shift direction is restricted by the stroke limiter 360, the shift detent pin 290 is positioned on the protrusion portion 313 and the movement of the shift detent pin 290 toward the external groove 312 which outputs the shift position signal, is restricted. Therefore, the shift position signal is not outputted, which may prevent an erroneous operation.

Furthermore, when the operating force of the shift rod 10 is released in the state in which the shift detent pin 290 is positioned on the protrusion portion 313, the shift detent pin 290 is returned to the internal groove 311 by the spring force, and the shift rod 10 is returned to the initial position B1.

Hereinafter, the system of the shift operation device according to an exemplary embodiment of the present disclosure will be described.

The electronic shift operation apparatus according to an exemplary embodiment of the present disclosure may include the shift rod 10 operable in the selection direction along one selection rail 211 and operable in the shift direction along a plurality of shift rails 212 connected to the selection rail 211, and the mode selection portion 120 configured for selecting the automatic shift mode or the manual shift mode. The mode may be switched to the automatic shift mode in which the automatic shift manipulation is enabled or the manual shift mode in which the manual shift manipulation is enabled in accordance with the input of the mode selection portion 120. When the shift rod 10 is manipulated in the selection direction along the selection rail 211, the movable route of the shift rod 10 may vary depending on the automatic shift mode and the manual shift mode. When the shift rod 10 is manipulated in the shift direction along the shift rail 212, the shift direction stroke of the shift rod 10 may vary depending on the automatic shift mode and the manual shift mode.

Furthermore, the electronic shift operation apparatus according to an exemplary embodiment of the present disclosure may further include the mode switching solenoid 110 configured to operate to switch the mode to the automatic shift mode or the manual shift mode, and the shifter controller 260 configured to control the operation of the mode switching solenoid 110 by receiving the signal of the mode selection portion 120.

The shifter controller 260 may be configured for controlling the operation of the mode switching solenoid 110 so that the movement of the shift rod 10 in the selection direction is restricted to the selection position positioned at the edge portion of the selection rail 211 in the automatic shift mode.

With reference to FIG. 11A and FIG. 11B, in the automatic shift mode, when the shift rod 10 is manipulated in the selection direction, the selection movement of the shift rod 10 may be restricted to the 5/6 stage selection position and the R stage selection position in the manual shift mode.

The shifter controller 260 may be configured for controlling the operation of the mode switching solenoid 110 so that a selection operating force when the shift rod 10 is manipulated in the selection direction in the automatic shift mode is higher than a selection operating force when the shift rod 10 is manipulated in the selection direction in the manual shift mode.

That is, in the automatic shift mode, when the shift rod 10 is configured to perform the selection manipulation from the initial position A1 to the M position A2, the operating force is generated as the mode switching rod 40 climbs over the catching projection 54, the selection operating force in the automatic shift mode is higher than the selection operating force in the manual shift mode by the catching projection 54. Therefore, it is possible to improve the driver's recognition performance.

Figure 12:
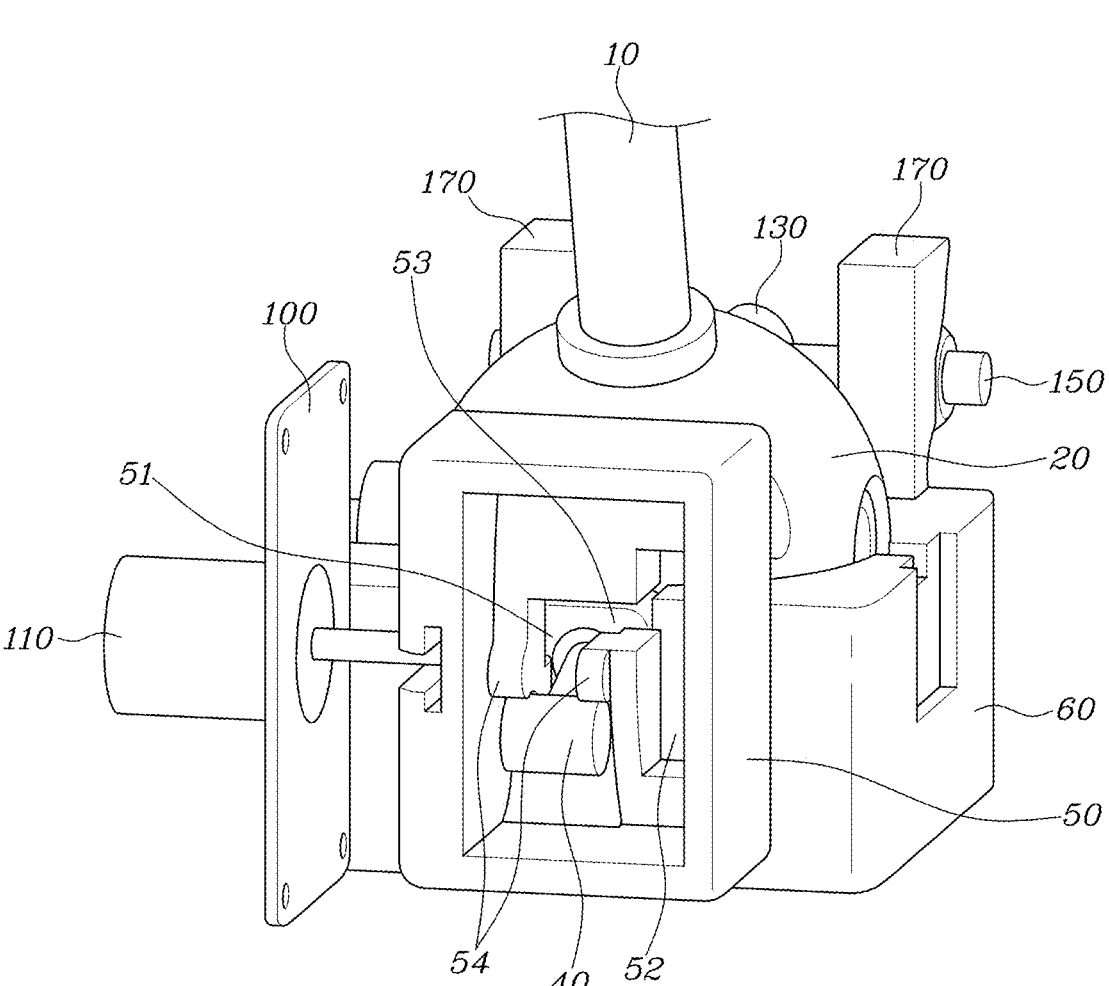
Figure 13:
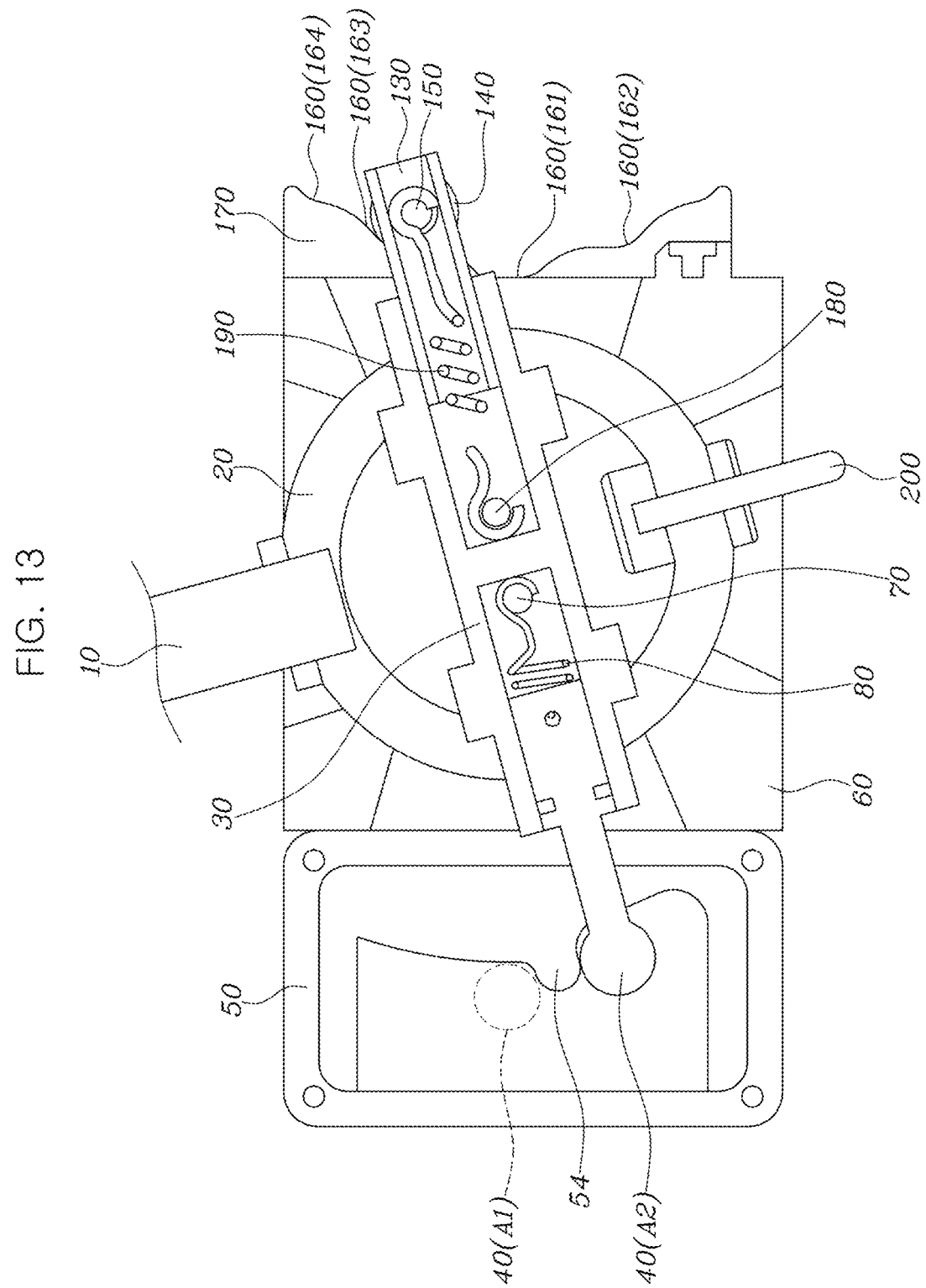
Figures 14A, 14B:
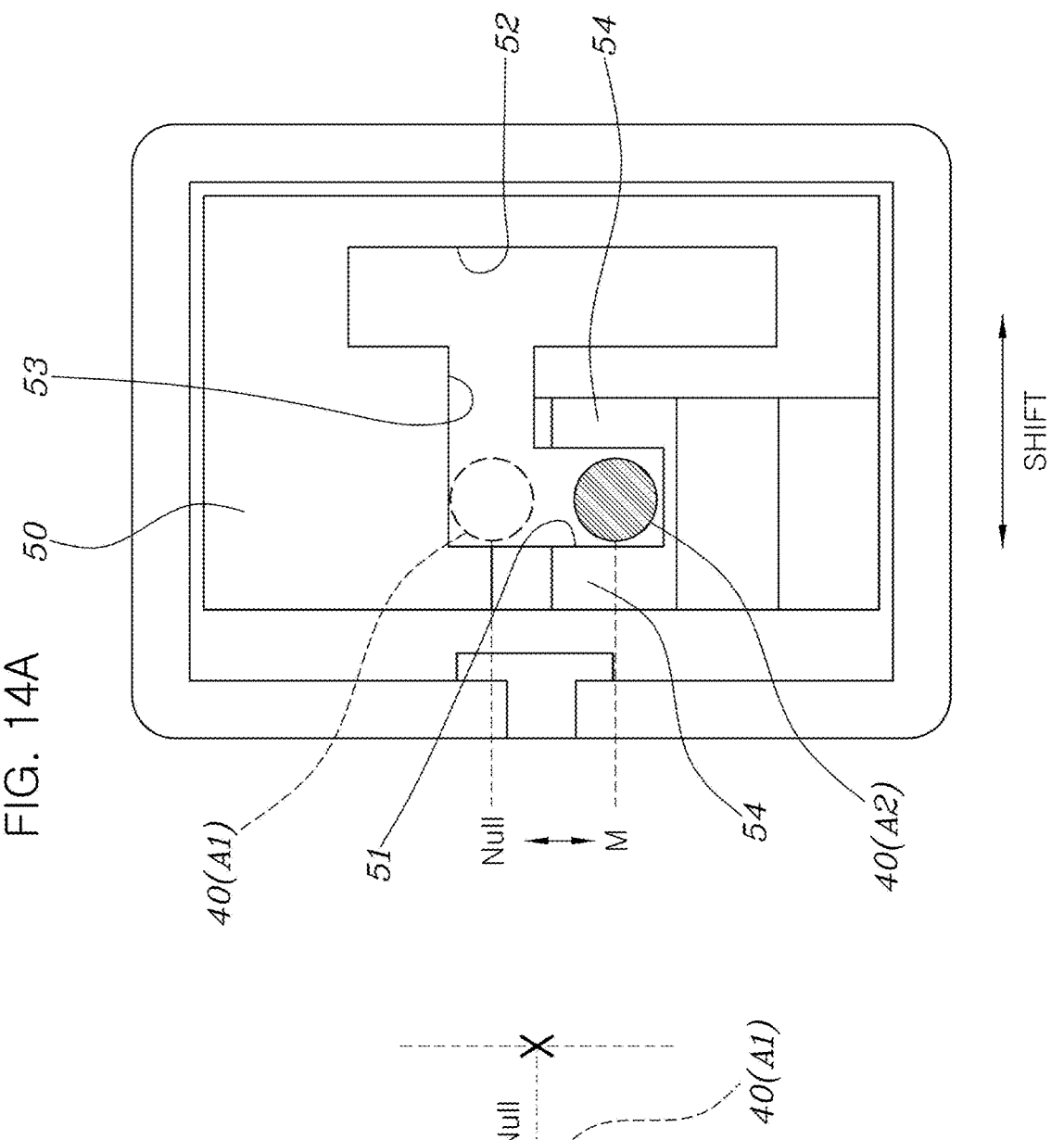
Figure 15:
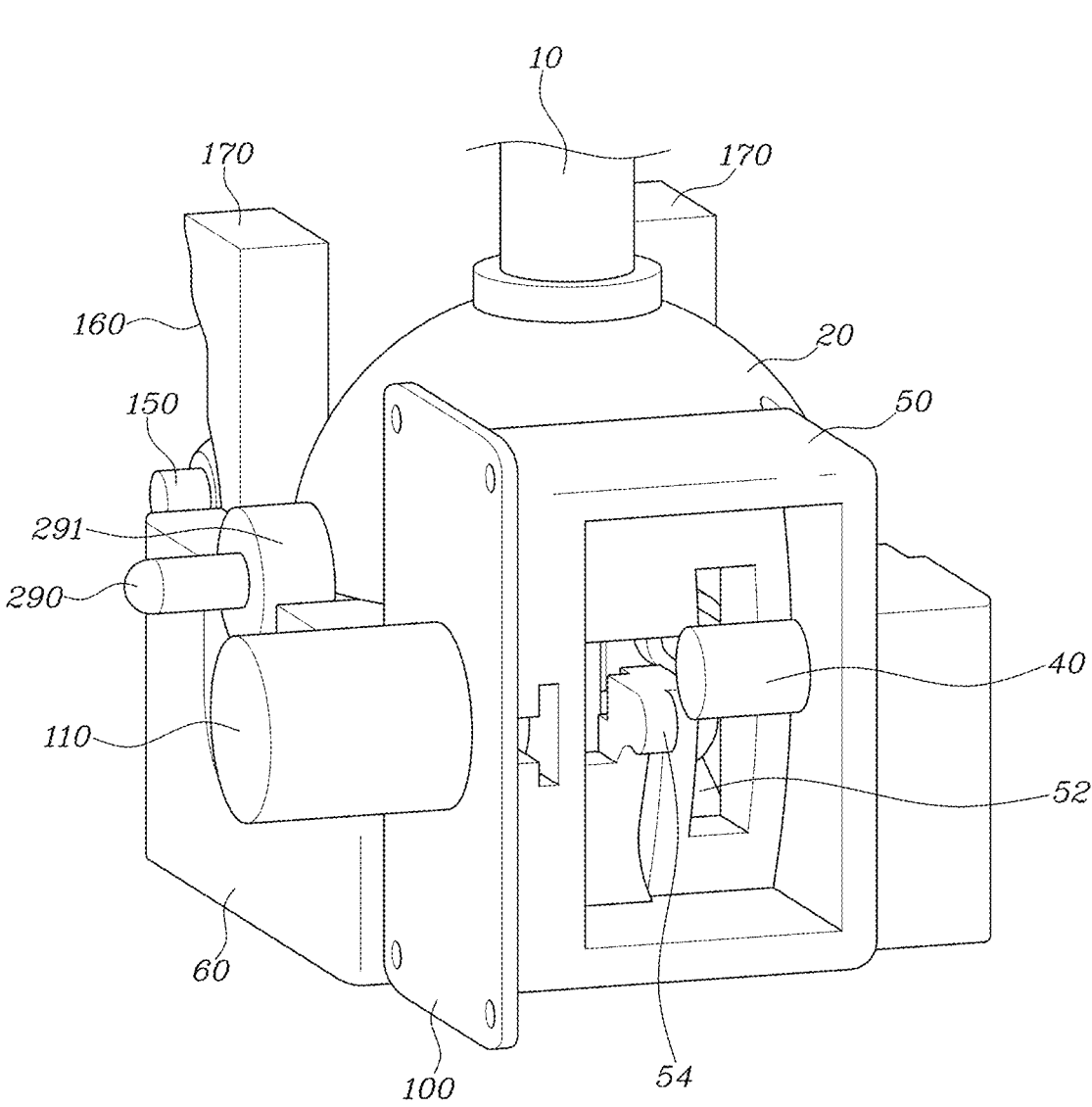

With reference to FIG. 12 and FIG. 14A and FIG. 14B, in the automatic shift mode, when the mode switching rod 40 is positioned at the M position A2 by the selection manipulation of the shift rod 10, the position of the mode switching rod 40 is fixed at the M position A2 by the catching projection 54, and the motion of the shift rod 10 may be stopped.

The electronic shift operation apparatus according to an exemplary embodiment of the present disclosure may further include the shift solenoid 350 configured to be operated by being controlled by the shifter controller 260 and operate to differently restrict the shift direction strokes of the shift rod 10 in accordance with the automatic shift mode and the manual shift mode.

The shifter controller 260 may be configured for controlling the operation of the shift solenoid 350 to restrict the shift direction stroke of the shift rod 10 to be relatively shorter in the automatic shift mode than in the manual shift mode.

With reference to FIG. 27A and FIG. 27B and FIG. 28A and FIG. 28B, the shift direction stroke of the shift rod 10 may be restricted to be relatively shorter in the automatic shift mode than in the manual shift mode and restricted to be relatively longer in the manual shift mode than in the automatic shift mode.

According to an exemplary embodiment of the present disclosure, in the automatic shift mode, the end portion of the shift rail 212 is defined as a non-fixed end portion, the shift rod 10 positioned at the initial position A1 or the M position A2 is manipulated in the shift direction, and then the operating force is eliminated so that the shift rod 10 may be returned to the initial position A1 or the M position A2 by the spring force.

In the automatic shift mode, the initial position A1 may be the Null position.

Furthermore, in the manual shift mode, the shift rod 10 performs the selection manipulation to the 5/6 stage selection position B2, the 1/2 stage selection position B3, or the R stage selection position B4, and then the operating force is eliminated so that the shift rod 10 may be returned to the initial position B1.

In the manual shift mode, the initial position B1 may be the N stage, the neutral stage, and the 3/4 stage selection position.

In the manual shift mode, the end portion of the shift rail 212 is defined as a fixed end portion, the shift rod 10 is manipulated in the shift direction, and then the operating force is eliminated so that the shift rod 10 may be fixed at any one shift position among the first stage, the second stage, the third stage, the fourth stage, the fifth stage, the sixth stage, and the R stage.

According to an exemplary embodiment of the present disclosure, when the clutch pedal 380 is operated by a driver, a clutch pedal sensor (not shown) may detect a signal of this operation and then the shifter controller 260 may receive the operating signal of the clutch pedal 380. When the automatic shift mode signal is inputted by the manipulation of the mode selection portion 120, the shifter controller 260 may be configured for controlling the operation of the shift solenoid 350 so that the movement of the shift rod 10 in the shift direction is allowed to the target shift position (the D stage, the R stage, the (+) stage, or the (−) stage) regardless of the operating signal of the clutch pedal 380.

Furthermore, the shifter controller 260 may be configured for controlling the operation of the shift solenoid 350 so that the movement of the shift rod 10 in the shift direction is allowed to the target shift position (the first stage, the second stage, the third stage, the fourth stage, the fifth stage, the sixth stage, or the R stage) only in the state in which the manual shift mode signal is inputted by the manipulation of the mode selection portion 120.

Furthermore, when the manual shift mode signal is inputted to the shifter controller 260 by the manipulation of the mode selection portion 120 and the operating signal of the clutch pedal 380 is not inputted, the shifter controller 260 may be configured for controlling the operation of the shift solenoid 350 to restrict the movement of the shift rod 10 in the shift direction so that the shift rod 10 cannot move to the target shift position (the first stage, the second stage, the third stage, the fourth stage, the fifth stage, the sixth stage, or the R stage).

When the automatic shift mode signal is generated by the manipulation of the mode selection portion 120 in a vehicle (e.g., a 2-pedal vehicle) provided with no clutch pedal, the shifter controller 260 may be configured for controlling the stroke limiter 360 so that the stroke limiter 360 is fixed in the state in which the stroke limiter 360 is moved to the upper side at which the shift detent 320 is present. When the manual shift mode signal is generated by the manipulation of the mode selection portion 120, the shifter controller 260 may be configured for controlling the stroke limiter 360 so that the stroke limiter 360 is fixed in the state in which stroke limiter 360 is moved to the lower side distant from the shift detent 320.

In the manual shift mode, the shifter controller 260 may be configured for controlling the operation of the mode switching solenoid 110 so that the shift rod 10 moves to the plurality of selection positions positioned along the selection rail 211 by the manipulation of the shift rod 10 in the selection direction. In the automatic shift mode, the shifter controller 260 may be configured for controlling the operation of the mode switching solenoid 110 to restrict the movement of the shift rod 10 to any at least one of the plurality of selection positions positioned along the selection rail 211.

In the automatic shift mode, the route along which the shift rod 10 may be moved along the selection rail 211 by operation of the mode switching solenoid 110 may be restricted to be relatively shorter than the route along which the shift rod 10 may be moved along the selection rail 211 in the manual shift mode.

In the manual shift mode, the plurality of selection positions may include the initial position B1 at which the shift rod 10 is returned by the spring force when the operating force of the shift rod 10 in the selection direction is released, the 5/6 stage selection position B2 positioned in one direction along the selection rail 211 from the initial position B1 so that the fifth stage or the sixth stage may be selected by the manipulation of the shift rod 10 in the shift direction, the 1/2 stage selection position B3 positioned in the other direction along the selection rail 211 from the initial position B1 so that the first stage or the second stage may be selected by the manipulation of the shift rod 10 in the shift direction, and the R stage selection position B4 positioned at the edge portion in the other direction along the selection rail 211 from the initial position B1 so that the R stage may be selected by the manipulation of the shift rod 10 in the shift direction. The initial position B1 may be the 3/4 stage selection position B1 at which the third stage or the fourth stage may be selected by the manipulation of the shift rod 10 in the shift direction.

In the automatic shift mode, one of the two selection positions may be alternatively selected by the manipulation of the shift rod 10 in the selection direction. The two selection positions may include the initial position A1 at which the R stage or the D stage may be selected by the manipulation of the shift rod 10 in the shift direction, and the M position A2 positioned in the other direction along the selection rail 211 from the initial position A1 so that the (+) stage (upshift) or the (−) stage (downshift) may be selected by the manipulation of the shift rod 10 in the shift direction.

In the automatic shift mode, the initial position A1 is a position identical to the initial position B1 in the manual shift mode, and the M position A2 in the automatic shift mode may be a position identical to the 1/2 stage selection position B3 in the manual shift mode.

In the automatic shift mode, the selection position of the shift rod 10 is fixed so that the motion in the selection direction is stopped at the M position A2, and the shift rod 10 does not return to the initial position A1 even though the operating force is eliminated at the M position A2.

The electronic shift operation apparatus according to an exemplary embodiment of the present disclosure may further include the PCB 240 configured to detect and output a shift position selected by the manipulation of the shift rod 10 in the selection direction and in the shift direction, and a shifter controller 240 may transmit the shift position signal, which is outputted from the PCB 240, to the vehicle controller 250, and a drive portion 280 may be operated by receiving the signal of the vehicle controller 250.

Furthermore, the shifter controller 240 may receive revolutions per minute (rpm) information of the vehicle through the signals of an accelerator pedal 390 and a brake pedal 400.

As described above, the electronic shift operation apparatus according to an exemplary embodiment of the present disclosure may switch the mode of the shift operation to the automatic shift or the manual shift based on a driver's intention. Therefore, it is possible to eliminate simplicity of the shift operation, which may provide enjoyment to the driver and improve marketability.

Furthermore, the electronic shift operation apparatus according to an exemplary embodiment of the present disclosure may restrict the shift direction strokes of the shift rod 10 to different lengths in accordance with the automatic shift mode and the manual shift mode, improving the convenience of the manipulation and improve the recognition performance during the shift operation.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic shift operation apparatus comprising:
a shift rod configured to be operable in a selection direction along a selection rail and operable in a shift direction along a plurality of shift rails connected to the selection rail;
a mode selection portion configured for selecting an automatic shift mode or a manual shift mode;

a mode switching solenoid configured to operate to switch a mode to the automatic shift mode or the manual shift mode; and a shifter controller operatively connected to the mode selection portion and the mode switching solenoid and configured to control an operation of the mode switching solenoid by receiving a signal of the mode selection portion, wherein the mode is switched to the automatic shift mode in which an automatic shift manipulation is enabled or the manual shift mode in which a manual shift manipulation is enabled in accordance with an input of the mode selection portion, wherein in response that the shift rod is manipulated in the selection direction along the selection rail, a movable route of the shift rod varies depending on the automatic shift mode and the manual shift mode, wherein in response that the shift rod is manipulated in the shift direction along the shift rail, a shift direction stroke of the shift rod varies depending on the automatic shift mode and the manual shift mode, and wherein the shifter controller is configured to control the operation of the mode switching solenoid so that a selection operating force in response that the shift rod is manipulated in the selection direction in the automatic shift mode is higher than a selection operating force in response that the shift rod is manipulated in the selection direction in the manual shift mode.

2. The electronic shift operation apparatus of claim 1, wherein the shifter controller is configured to control the operation of the mode switching solenoid so that movement of the shift rod in the selection direction is restricted to a selection position positioned at an edge portion of the selection rail in the automatic shift mode.

3. An electronic shift operation apparatus comprising:

a shift rod configured to be operable in a selection direction along a selection rail and operable in a shift direction along a plurality of shift rails connected to the selection rail;

a mode selection portion configured for selecting an automatic shift mode or a manual shift mode;

a mode switching solenoid configured to operate to switch a mode to the automatic shift mode or the manual shift mode; and a shifter controller operatively connected to the mode selection portion and the mode switching solenoid and configured to control an operation of the mode switching solenoid by receiving a signal of the mode selection portion, wherein the mode is switched to the automatic shift mode in which an automatic shift manipulation is enabled or the manual shift mode in which a manual shift manipulation is enabled in accordance with an input of the mode selection portion, wherein in response that the shift rod is manipulated in the selection direction along the selection rail, a movable route of the shift rod varies depending on the automatic shift mode and the manual shift mode, wherein in response that the shift rod is manipulated in the shift direction along the shift rail, a shift direction stroke of the shift rod varies depending on the automatic shift mode and the manual shift mode, wherein the shifter controller is configured to control the operation of the mode switching solenoid so that movement of the shift rod in the selection direction is restricted to a selection position positioned at an edge portion of the selection rail in the automatic shift mode, and wherein in the automatic shift mode, in response that the shift rod is manipulated in the selection direction, the selection movement of the shift rod is restricted to a 5/6 stage selection position and a Reverse (R) stage selection position in the manual shift mode.

4. The electronic shift operation apparatus of claim 1, further including a shift solenoid operatively connected to the shifter controller and configured to be operated by being controlled by the shifter controller and operate to differently restrict shift direction strokes of the shift rod in accordance with the automatic shift mode and the manual shift mode.

5. The electronic shift operation apparatus of claim 4, wherein the shifter controller is configured to control the operation of the shift solenoid so that the shift direction stroke of the shift rod in the automatic shift mode is relatively shorter than the shift direction stroke of the shift rod in the manual shift mode.

6. The electronic shift operation apparatus of claim 1, wherein in the manual shift mode, an end portion of the shift rail is defined as a fixed end portion, the shift rod is manipulated in the shift direction, and then an operating force is eliminated so that the shift rod is fixed at any one shift position among a first stage, a second stage, a third stage, a fourth stage, a fifth stage, a sixth stage, and an R stage.

7. An electronic shift operation apparatus comprising:

a shift rod configured to be operable in a selection direction along a selection rail and operable in a shift direction along a plurality of shift rails connected to the selection rail;

a mode selection portion configured for selecting an automatic shift mode or a manual shift mode;

a mode switching solenoid configured to operate to switch a mode to the automatic shift mode or the manual shift mode;

a shifter controller operatively connected to the mode selection portion and the mode switching solenoid and configured to control an operation of the mode switching solenoid by receiving a signal of the mode selection portion; and a shift solenoid operatively connected to the shifter controller and configured to be operated by being controlled by the shifter controller and operate to differently restrict shift direction strokes of the shift rod in accordance with the automatic shift mode and the manual shift mode, wherein the mode is switched to the automatic shift mode in which an automatic shift manipulation is enabled or the manual shift mode in which a manual shift manipulation is enabled in accordance with an input of the mode selection portion, wherein in response that the shift rod is manipulated in the selection direction along the selection rail, a movable route of the shift rod varies depending on the automatic shift mode and the manual shift mode, wherein in response that the shift rod is manipulated in the shift direction along the shift rail, a shift direction stroke of the shift rod varies depending on the automatic shift mode and the manual shift mode, wherein the shifter controller is configured to receive an operating signal of a clutch pedal, and wherein in response that the automatic shift mode signal is inputted in accordance with a manipulation of the mode selection portion, the shifter controller is configured to control the operation of the shift solenoid so that the movement of the shift rod in the shift direction is allowed to a target shift position regardless of the operating signal of the clutch pedal.

8. The electronic shift operation apparatus of claim 4, wherein the shifter controller is configured to receive an operating signal of a clutch pedal, and wherein the shifter controller is configured to control the operation of the shift solenoid so that the movement of the shift rod in the shift direction is allowed to a target shift position only in a state in which both a manual shift mode signal in accordance with a manipulation of the mode selection portion and the operating signal of the clutch pedal are inputted.

9. The electronic shift operation apparatus of claim 4, wherein the shifter controller is configured to receive an operating signal of a clutch pedal, and wherein in response that a manual shift mode signal is inputted to the shifter controller in accordance with a manipulation of the mode selection portion and the operating signal of the clutch pedal is not inputted, the shifter controller is configured to control the operation of the shift solenoid to restrict the movement of the shift rod in the shift direction to prevent the shift rod from moving to a target shift position.

10. The electronic shift operation apparatus of claim 1, further including:

a printed circuit board (PCB), configured to detect and output a shift position selected in accordance with the manipulation of the shift rod in the selection direction and in the shift direction, wherein the shifter controller is configured for transmitting a shift position signal, which is outputted from the PCB, to the vehicle controller, and a drive portion operatively connected to the vehicle controller is operated by receiving the signal of the vehicle controller.

11. The electronic shift operation apparatus of claim 1, wherein in the manual shift mode, the shifter controller is configured to control the operation of the mode switching solenoid so that the shift rod moves to a plurality of selection positions positioned along the selection rail in accordance with a manipulation of the shift rod in the selection direction, and wherein in the automatic shift mode, the shifter controller is configured to control the operation of the mode switching solenoid to restrict the movement of the shift rod to any at least one of the plurality of selection positions positioned along the selection rail.

12. The electronic shift operation apparatus of claim 1, wherein in the automatic shift mode, a route along which the shift rod is movable along the selection rail by operation of the mode switching solenoid is restricted to be relatively shorter than a route along which the shift rod is movable along the selection rail in the manual shift mode.

13. The electronic shift operation apparatus of claim 11, wherein in the manual shift mode, the plurality of selection positions includes:

an initial position at which the shift rod is returned by a spring force in response that an operating force of the shift rod in the selection direction is released;

a 5/6 stage selection position positioned in a first direction along the selection rail from the initial position so that a fifth stage or a sixth stage is selected in accordance with the manipulation of the shift rod in the shift direction;

a 1/2 stage selection position positioned in a second direction along the selection rail from the initial position so that a first stage or a second stage is selected in accordance with the manipulation of the shift rod in the shift direction; and an R stage selection position positioned at an edge portion in the second direction along the selection rail from the initial position so that an R stage is selected in accordance with the manipulation of the shift rod in the shift direction, and wherein the initial position is a 3/4 stage selection position at which a third stage or a fourth stage is selected in accordance with the manipulation of the shift rod in the shift direction.

14. The electronic shift operation apparatus of claim 13, wherein in the manual shift mode, the shift rod performs a selection manipulation to the 5/6 stage selection position, the 1/2 stage selection position, or the R stage selection position, and then the operating force is eliminated so that the shift rod is returned to the initial position.

15. The electronic shift operation apparatus of claim 13, wherein in the automatic shift mode, one of two selection positions is alternatively selected in accordance with the manipulation of the shift rod in the selection direction, and wherein the two selection positions include:

an initial position at which an R stage or a D stage is selected in accordance with the manipulation of the shift rod in the shift direction; and an M position positioned in the second direction along the selection rail from the initial position so that a (+) stage or a (−) stage is selected in accordance with the manipulation of the shift rod in the shift direction.

16. The electronic shift operation apparatus of claim 15, wherein the initial position in the automatic shift mode is a selection position identical to the initial position in the manual shift mode, and the M position in the automatic shift mode is a selection position identical to the 1/2 stage selection position in the manual shift mode.

17. The electronic shift operation apparatus of claim 15, wherein the selection position of the shift rod is fixed so that a motion in the selection direction is stopped at the M position, and the shift rod does not return to the initial position in the automatic shift mode even though an operating force is eliminated at the M position.

18. The electronic shift operation apparatus of claim 15, wherein in the automatic shift mode, an end portion of the shift rail is defined as a non-fixed end portion, the shift rod positioned at the initial position in the automatic shift mode or the M position is manipulated in the shift direction, and then an operating force is eliminated so that the shift rod is returned to the initial position in the automatic shift mode or the M position.

\* \* \* \* \*